US008425991B2

(12) United States Patent
Nimura et al.

(10) Patent No.: US 8,425,991 B2
(45) Date of Patent: *Apr. 23, 2013

(54) CELLULOSE ACYLATE FILM, POLARIZING PLATE AND LIQUID CRYSTAL DISPLAY

(75) Inventors: Shigeaki Nimura, Minami-ashigara (JP); Yosuke Nishiura, Minami-ashigara (JP); Takako Nishiura, legal representative, Odawara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 527 days.

This patent is subject to a terminal disclaimer.

(21) Appl. No.: 11/886,907

(22) PCT Filed: Mar. 22, 2006

(86) PCT No.: PCT/JP2006/306375
§ 371 (c)(1),
(2), (4) Date: Aug. 18, 2009

(87) PCT Pub. No.: WO2006/101242
PCT Pub. Date: Sep. 28, 2006

(65) Prior Publication Data
US 2010/0143613 A1 Jun. 10, 2010

(30) Foreign Application Priority Data
Mar. 22, 2005 (JP) ................ 2005-082649

(51) Int. Cl.
C09K 19/00 (2006.01)
C08L 1/00 (2006.01)
C09D 101/00 (2006.01)
C09D 4/00 (2006.01)
C09D 201/00 (2006.01)
C09J 101/00 (2006.01)
C09J 4/00 (2006.01)
C09J 201/00 (2006.01)

(52) U.S. Cl.
USPC ............... 428/1.31; 106/168.01; 106/170.27

(58) Field of Classification Search ............... 428/1.31; 106/168.01, 170.27
See application file for complete search history.

(56) References Cited

U.S. PATENT DOCUMENTS

| 5,245,456 A * | 9/1993 | Yoshimi et al. ............... 349/118 |
| 6,630,973 B1 * | 10/2003 | Matsuoka et al. ............ 349/117 |
| 6,881,457 B2 | 4/2005 | Tasaka et al. |
| 7,105,213 B2 | 9/2006 | Tasaka et al. |
| 7,582,339 B2 * | 9/2009 | Kim et al. ............ 428/1.3 |
| 7,695,780 B2 * | 4/2010 | Ohgaru et al. ............ 428/1.31 |
| 2002/0034596 A1 * | 3/2002 | Yano et al. ............ 428/1.31 |
| 2003/0003246 A1 * | 1/2003 | Negoro et al. ............ 428/1.2 |
| 2003/0020208 A1 * | 1/2003 | Tasaka et al. ............ 264/217 |
| 2003/0057595 A1 * | 3/2003 | Tsujimoto ............ 264/217 |
| 2004/0080693 A1 * | 4/2004 | Kuzuhara et al. ............ 349/117 |
| 2004/0096594 A1 * | 5/2004 | Takeuchi et al. ............ 428/1.2 |
| 2004/0124557 A1 * | 7/2004 | Yamada ............ 264/239 |
| 2004/0161551 A1 | 8/2004 | Tasaka et al. |
| 2004/0241344 A1 * | 12/2004 | Kawanishi et al. ............ 428/1.1 |
| 2005/0024561 A1 * | 2/2005 | Elman et al. ............ 349/117 |
| 2005/0110186 A1 * | 5/2005 | Tsujimoto ............ 264/216 |
| 2005/0112299 A1 * | 5/2005 | Shimizu et al. ............ 428/1.31 |
| 2005/0140881 A1 * | 6/2005 | Nimura et al. ............ 349/117 |
| 2005/0142304 A1 * | 6/2005 | Kawanishi et al. ............ 428/1.31 |
| 2005/0163942 A1 | 7/2005 | Tasaka et al. |
| 2005/0179842 A1 * | 8/2005 | Ichihashi ............ 349/117 |
| 2005/0200780 A1 * | 9/2005 | Ito et al. ............ 349/118 |
| 2005/0206810 A1 * | 9/2005 | Sasaki et al. ............ 349/96 |
| 2005/0208231 A1 * | 9/2005 | Nimura et al. ............ 428/1.3 |
| 2005/0271834 A1 * | 12/2005 | Michihata ............ 428/1.31 |
| 2006/0051526 A1 * | 3/2006 | Fukagawa et al. ............ 428/1.31 |
| 2006/0061717 A1 * | 3/2006 | Ichihashi ............ 349/117 |
| 2006/0062934 A1 * | 3/2006 | Hayashi et al. ............ 428/1.31 |
| 2006/0066804 A1 * | 3/2006 | Tasaka ............ 349/179 |
| 2006/0132688 A1 * | 6/2006 | Yoda et al. ............ 349/119 |
| 2006/0144291 A1 * | 7/2006 | Takeuchi et al. ............ 106/170.48 |
| 2006/0202366 A1 * | 9/2006 | Murakami et al. ............ 264/1.7 |
| 2006/0203163 A1 * | 9/2006 | Tasaka ............ 349/117 |
| 2006/0215079 A1 * | 9/2006 | Suzuki et al. ............ 349/96 |
| 2006/0221275 A1 * | 10/2006 | Matsufuji ............ 349/96 |
| 2006/0246232 A1 * | 11/2006 | Kubo et al. ............ 428/1.31 |
| 2007/0059458 A1 * | 3/2007 | Nishiura et al. ............ 428/1.31 |
| 2007/0196592 A1 * | 8/2007 | Ono ............ 428/1.1 |
| 2007/0236631 A1 * | 10/2007 | Ohtani et al. ............ 349/96 |
| 2007/0292635 A1 * | 12/2007 | Nishiura et al. ............ 428/1.31 |
| 2008/0024703 A1 * | 1/2008 | Ichihashi ............ 349/119 |
| 2008/0062355 A1 * | 3/2008 | Sata et al. ............ 349/96 |
| 2008/0111954 A1 * | 5/2008 | Hashimoto et al. ............ 349/96 |
| 2008/0138541 A1 * | 6/2008 | Moto et al. ............ 428/1.1 |

(Continued)

FOREIGN PATENT DOCUMENTS

| JP | 2002-22945 A | 1/2002 |
| JP | 2002-62430 A | 2/2002 |
| JP | 2002-277632 A | 9/2002 |
| JP | 2003-073485 A | 3/2003 |
| JP | 2003-114333 A | 4/2003 |
| JP | 2004-272234 A | 9/2004 |

OTHER PUBLICATIONS

Machine translation of JP 2003-073485, 2011.*
Office Action from Japanese Patent Office issued in Applicant's corresponding Japanese Patent Application No. 2005-082649 dated Aug. 31, 2010, with English Translation.
Office Action from Japanese Patent Office issued in corresponding Japanese Patent Application No. 2005-082649 dated Nov. 24, 2010, with an English translation.

(Continued)

Primary Examiner — Liam Heincer
(74) Attorney, Agent, or Firm — Buchanan Ingersoll & Rooney PC

(57) ABSTRACT

A cellulose acylate film satisfying the following formulae:

50 nm<Re<400 nm

−200 nm≦Rth≦50 nm

|Nz|≦10 wherein Nz represents (Rth/Re)+0.5. The film has an excellent optical compensation performance and a high productivity.

14 Claims, No Drawings

U.S. PATENT DOCUMENTS

| | | | |
|---|---|---|---|
| 2008/0218672 A1* | 9/2008 | Ichihashi et al. | 349/118 |
| 2008/0254236 A1* | 10/2008 | Kawanishi et al. | 428/1.1 |
| 2008/0254237 A1* | 10/2008 | Omatsu et al. | 428/1.31 |
| 2009/0021671 A1* | 1/2009 | Fukagawa et al. | 349/96 |
| 2009/0073535 A1* | 3/2009 | Sekine | 359/240 |
| 2009/0122243 A1* | 5/2009 | Sugiyama et al. | 349/118 |
| 2009/0135356 A1* | 5/2009 | Ando | 349/137 |
| 2010/0245730 A1* | 9/2010 | Nimura et al. | 349/96 |

OTHER PUBLICATIONS

PCT/ISA/210, 2006.

PCT/ISA/237, 2006.

Office Action from Japanese Patent Office issued in corresponding Japanese Patent Application No. 2011-011787 mailed Oct. 2, 2012, with a partial English translation.

* cited by examiner

CELLULOSE ACYLATE FILM, POLARIZING PLATE AND LIQUID CRYSTAL DISPLAY

TECHNICAL FIELD

The present invention relates to a cellulose acylate film for optical applications, a polarizing plate using the same as an optical compensation sheet, and a liquid crystal display provided with the polarizing plate.

BACKGROUND ART

Since a liquid crystal display has such various advantages as operation with low voltage and low power consumption, and capability of miniaturization and thickness reduction, it is widely used for such applications as a monitor of a personal computer or a portable device and a television. As for such liquid crystal display, various modes have been proposed according to an alignment state of liquid crystal molecules in a liquid crystal cell and, conventionally, TN mode, in which such alignment state is formed that molecules are twisted at about 90° from the downside substrate to the upside substrate, has been the mainstream.

In general, a liquid crystal display is constituted of a liquid crystal cell, an optical compensation sheet and a polarizer. The optical compensation sheet is used for the purpose of eliminating image coloring and widening a view angle. As the optical compensation sheet, a stretched birefringent film or a film manufactured by coating liquid crystal on a transparent film is used. For example, JP-A-5-157911 discloses such technique that an optical compensation sheet, which is manufactured by coating discotic liquid crystal on a triacetylcellulose film and aligning and fixing the same, is applied to a liquid crystal cell of TN mode to widen the view angle.

However, a liquid crystal display for an application of television which has a large screen and is assumed to be seen from various angles is strictly required of view angle dependence, and even the manner described above can not have satisfied the requirement. Therefore, liquid crystal displays different from TN mode such as IPS (In-Plane Switching) mode, OCB (Optically Compensatory Bend) mode, and VA (Vertically Aligned) mode are studied.

Incidentally, a cellulose acylate film has such characteristic that it has a high optical isotropy (a low retardation) compared with other polymer films. Accordingly, for some applications where optical isotropy is required, for example, as a polarizing plate, a cellulose acylate film is used.

On the other hand, as an optical compensation sheet (retardation film) for a liquid crystal display, adversely, optical anisotropy (a high retardation) is required.

Therefore, in the technical field of optical materials, it has been a general axiom that a synthetic polymer film is used when a polymer film is required of optical anisotropy, and a cellulose acylate film is used when a polymer film is required of optical isotropy.

AS for a film required of optical anisotropy, for example, as a compensation film of a liquid crystal display, a film having such properties as 50 nm<Re<400 nm, −200 nm<Rth<50 nm and |Nz|<10. With regard to this, there is such example that a film of |Nz|=0.5 and the like is manufactured using a heat-shrinkable film to be used as an optical compensation film (JP-A-5-157911). However, in the method, the process is complicated and, in addition, increase in line speed is difficult because of practice of sufficient heat shrinkage, and a large amount of thermally shrunk film generates, thereby resulting in low productivity and large environmental load. Further, there is such problem that retardation in plane and thickness directions of the resultant film varies largely depending of locations.

On the other hand, as for a cellulose acylate film, an example is disclosed (Japanese Patent No. 3459779), in which cellulose triacetate having substitution degree of 2.92 is stretched to manufacture a film of Re=−50 nm and Rth=−35 nm. However, since the film has a low absolute value of Re, a change in view angle properties can not be suppressed sufficiently.

DISCLOSURE OF THE INVENTION

While considering the above-mentioned problems of prior arts, an object of the present invention is to provide a film that has an excellent optical compensation performance and a high productivity. In addition, another object of the invention is to provide a liquid crystal display having a small change in view angle properties, and a polarizing plate for producing the display.

The present inventor made hard studies and, as the result, found that the invention having the following constitution can attain the above-described objects.

(1) A cellulose acylate film satisfying the following formulae:

$$50 \text{ nm} < Re < 400 \text{ nm}$$

$$-200 \text{ nm} \leq Rth \leq 50 \text{ nm}$$

$$|Nz| \leq 10$$

wherein Re represents retardation of the cellulose acylate film in the plane direction, Rth represents retardation of the cellulose acylate film in the thickness direction, and Nz represents (Rth/Re)+0.5.

(2) The cellulose acylate film described in (1) wherein cellulose acylate contained in the film has a substitution degree of 2.85-3.00.

(3) The cellulose acylate film described in (1) or (2) wherein the film contains a rod-shaped compound or a discotic compound.

(4) The cellulose acylate film described in any one of (1) to (3), wherein the film has a width of 0.5-3 m.

(5) The cellulose acylate film described in any one of (1) to (4), wherein the film has a thickness of 40-200 μm.

(6) The cellulose acylate film described in any one of (1) to (5) wherein the slow axis in the film plane crosses orthogonally to a machine direction. The machine direction here means a conveying direction in the film-forming step.

(7) A polarizing plate composed of a polarizing film and two films disposed on both surfaces thereof, wherein at least one of the films consists of the cellulose acylate film described in any one of (1) to (6).

(8) A liquid crystal display comprising the polarizing plate described in (7).

(9) The liquid crystal display which is an IPS mode liquid crystal display.

(10) A method for producing a cellulose acylate film comprising casting a solution containing cellulose acylate having a substitution degree of 2.85-3.00 and at least one kind of rod-shaped compounds and discotic compounds on a substrate, and striping and stretching the formed film.

(11) The method for producing a cellulose acylate film described in (10) wherein a film-forming rate is 5-300 m/min.

The cellulose acylate film of the invention is a film having excellent developing property of in-plane retardation (Re) and small retardation in thickness direction (Rth). According to the production method of the invention, the cellulose acylate film can be produced easily with a high productivity. Further, the polarizing plate of the invention employing the cellulose acylate film as a protective film of polarizer can give a liquid crystal display showing a little change in view angle properties.

DISCLOSURE OF THE INVENTION

Hereinafter, more detailed description will be given about the invention. In this connection, when a numerical value represents a physical property value, characteristic value or the like in the present specification, description of "numerical value 1"–" numerical value 2" represents the meaning of from not less than "numerical value 1" to not more than "numerical value 2." In addition, in the specification, description of "(meth)acryloyl" represents the meaning of "at least either acryloyl or methacryloyl." "(Meth)acrylate," "(meth) acrylic acid" and the like also represent the similar meaning. Further, when a hydrogen atom is substituted by an atom other than a hydrogen atom, the atom other than a hydrogen atom is treated as a substituent for the sake of convenience.

First, the optical cellulose acylate film of the invention will be described.

Cellulose Acylate Film

The cellulose acylate film of the invention includes a film containing a cellulose acylate compound and a film containing a compound having an ester-substituted cellulose skeleton obtained by introducing a functional group biologically or chemically to cellulose as a starting material. Among these, a cellulose acylate film is more preferred.

Cellulose acylate is an ester of cellulose and an acid. As for the acid for constituting the ester, an organic acid is preferred, carboxylic acid is more preferred, an aliphatic acid having 2-22 carbon atoms is further preferred, a lower aliphatic acid having 2-4 carbon atoms is furthermore preferred, and acetic acid is most preferred.

Cellulose acylate is an ester of cellulose and a carboxylic acid. In cellulose acylate, all or a part of hydrogen atoms of hydroxyl groups existing at 2-, 3- and 6-sites of a glucose unit constituting cellulose is substituted by an acyl group. Examples of the acyl group include an acetyl group, a propionyl group, a butanoyl group, an isobutanoyl group, a tert-butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, a cyclohexanecarbonyl group, an oleoyl group, a benzoyl group, a naphthylcarbonyl group and a cinnamoyl group. An acetyl group, a propionyl group, a butanoyl group, a dodecanoyl group, an octadecanoyl group, a tert-butanoyl group, an oleoyl group, a benzoyl group, a naphthylcarbonyl group and a cinnamoyl group are preferred, an acetyl group, a propionyl group and a butanoyl group are more preferred, and an acetyl group is most preferred.

Cellulose acylate may be an ester of cellulose and plural acids. Cellulose acylate may have been substituted by plural acyl groups.

Cellulose acylate preferably has negative intrinsic birefringence. By having negative intrinsic birefringence, such specific effect is expressed that Rth reduces through stretching. A cellulose acylate having a large substitution degree has negative intrinsic birefringence.

As for the substitution degree of cellulose acylate, 2.85 or more is preferred, 2.88-3.00 is more preferred, 2.92-3.00 is further preferred, and 2.93-3.00 is most preferred. In the specification, "substitution degree" means the sum of percentage of substituted hydrogen atoms in respective hydroxyl groups at 2-, 3- and 6-sites of cellulose (100% substitution is substitution degree 1).

A fundamental principle of a method for synthesizing cellulose acylate is described in Migita Nobuhiko et al., "Mokuzai Kagaku (Wood Chemistry)" PP. 180-190 (KYORITSU SHUPPAN CO., LTD. 1968). The representative method for synthesizing cellulose acylate is a liquid phase acetylation method through carboxylic acid anhydride—acetic acid—a sulfuric acid catalyst. Specifically, a cellulose raw material as cotton linter or wood pulp is pre-treated with an appropriate amount of acetic acid, which is then thrown into a pre-chilled mixed liquid for carboxylation to form an ester, thereby synthesizing complete cellulose acylate (the sum of the 2-, 3- and 6-sites acyl substitution degree is approximately 3.00). The above-mentioned mixed liquid for carboxylation typically contains acetic acid as a solvent, carboxylic acid anhydride as an esterification agent and sulfuric acid as a catalyst. The carboxylic acid anhydride is commonly used in a stoichiometrically excess amount compared with the sum of the amount of cellulose to be reacted with the anhydride and moisture existing in the system.

After the end of the acylation reaction, an aqueous solution of a neutralizing agent (for example, carbonate, acetate or oxide of calcium, magnesium, iron, aluminum or zinc) is added in order to hydrolysis of excess carboxylic acid anhydride and neutralization of a part of the esterification catalyst remaining in the system. Next, the obtained complete cellulose acylate is saponified and ripened by maintaining it at 50-90° C. in the presence of a small amount of acetylation reaction catalyst (in general, remaining sulfuric acid) to change it to a cellulose acylate having a designed acyl substitution degree and polymerization degree. At the time point when a designed cellulose acylate has been obtained, the catalyst remaining in the system is completely neutralized using such neutralizing agent as described above, or, without the neutralization, the cellulose acylate solution is thrown into water or diluted sulfuric acid (or water or diluted sulfuric acid is thrown into the cellulose acylate solution) to separate cellulose acylate, which is washed and subjected to a stabilizing treatment to give cellulose acylate.

The polymerization degree of cellulose acylate is, in viscosity-average polymerization degree, preferably 200-700, more preferably 250-550, further preferably 250-400, most preferably 250-350. The viscosity-average polymerization degree can be measured according to a limiting viscosity method by Uda et al. (Uda Kazuo, Saito Hideo, Sen-i Gakkai Shi (JOURNAL OF THE SOCIETY OF FIBER SCIENCE AND TECHNOLOGY) vol. 18, No. 1 pp 105-120, 1962). A method for measuring viscosity-average polymerization degree is also described in JP-A-9-95538.

A cellulose acylate containing a small amount of lower molecular weight components has a high average molecular weight (polymerization degree), however it has a lower viscosity compared with usual cellulose acylate. A cellulose acylate containing a small amount of lower molecular weight components can be obtained by removing lower molecular weight components from synthesized cellulose acylate by a usual method. Lower molecular weight components, can be removed by washing cellulose acylate with a suitable organic solvent. In addition, a cellulose acylate containing a small amount of lower molecular weight components can also be synthesized. In order to produce a cellulose acylate containing a small amount of lower molecular weight components, the amount of sulfuric acid catalyst in acetylation reaction is preferably adjusted to be 0.5-25 parts by mass relative to 100 parts by mass of cellulose. Adjustment of the sulfuric acid catalyst amount within the aforementioned range makes it possible to synthesize cellulose acylate that is also preferable with respect to molecular weight distribution (having uniform molecular weight distribution).

As for raw cotton and synthesis method of cellulose acylate, there is description also in pp 7-12 of KOKAI-GIHO (Disclosure of Techniques) (Kogi No. 2001-1745, published on Mar. 15, 2001 by Japan Institute of Invention and Innovation).

Cellulose Acylate Film

As for a cellulose acylate film, a film, in which polymer component constituting the film substantially consists of cellulose acylate, is preferred. The term "substantially" means 55% by mass or more (preferably 70% by mass or more, more preferably 80% by mass or more, and further preferably 90% by mass or more) of the polymer component. Two or more types of cellulose acylates may be used simultaneously in a cellulose acylate film.

A cellulose acylate film is preferably produced by a solution casting method that uses a cellulose acylate solution.

Conditions of Cellulose Acylate

As for raw material of the cellulose acylate solution, use of cellulose acylate particles is preferred. Preferably 90% by mass or more of particles to be used have particle sizes of 0.5-5 mm. Further, preferably 50% by mass or more of particles to be used have particle sizes of 1-4 mm. Cellulose acylate particles preferably have a shape bordering on a sphere. Moisture content of cellulose acylate used for preparing the cellulose acylate solution is preferably 2% by mass or less, more preferably 1% by mass or less, most preferably 0.7% by mass or less. In general, cellulose acylate has 2.5-5% by mass of moisture content. Accordingly, use of cellulose acylate after drying the same is preferred.

In order to form a solution, cellulose acylate is dissolved in an organic solvent.

In the invention, as an organic solvent, both of chlorine-containing solvents containing a chlorine-containing organic solvent as a primary solvent and chlorine-free solvents not containing a chlorine containing organic solvent can be used.

Chlorine-containing Solvent

Upon manufacturing a solution of the cellulose acylate of the invention, a chlorine-containing organic solvent is used preferably as a primary solvent. In the invention, kind of the chlorine-containing organic solvent is not particularly limited as long as the purpose of dissolving, casting and film-forming the cellulose acylate can be achieved. Preferable examples of the chlorine-containing organic solvent are dichloromethane and chloroform. Particularly, dichloromethane is preferred. Further, mixing an organic solvent other than a chlorine-containing organic solvent results in no particular problem. In this case, use of at least 50% by mass of dichloromethane is required relative to the total amount of organic solvents. Hereinafter, description will be given about other organic solvents that may be used simultaneously with a chlorine-containing organic solvent in the invention. Examples of other preferable organic solvents include the solvent selected from esters, ketones, ethers, alcohols and hydrocarbons having 3-12 carbon atoms. These esters, ketones, ethers and alcohols may have a cyclic structure. Compounds having two or more of any functional groups of ester, ketone and ether (that is, —O—, —CO— or —COO—) may also be used as a solvent, that is, they may have other functional group such as, for example, an alcoholic hydroxyl group at the same time. In the case of a solvent having two or more kinds of functional groups, number of carbon atoms thereof is sufficient when it falls in the range defined for a compound having any one kind of functional group. Examples of esters having 3-12 carbon atoms include ethyl formate, propyl formate, pentyl formate, methylacetate, ethylacetate, pentyl acetate and the like. Examples of ketones having 3-12 carbon atoms include acetone, methylethylketone, diethylketone, diisobutylketone, cyclopentanone, cyclohexanone, methylcyclohexanone and the like. Examples of ethers having 3-12 carbon atoms include diisopropylether, dimethoxymethane, dimethoxyethane, 1,4-dioxane, 1,3-dioxolan, tetrahydrofuran, anisole, phenetol and the like. Examples of the organic solvent having two or more kids of functional groups include 2-ethoxyethylacetate, 2-methoxyethanol, 2-buthoxyethanol and the like.

An alcohol that can be used in combination with the chlorine-containing organic solvent may be of straight chain, branched chain or cycle. Among them, an alcohol based on a saturated aliphatic hydrocarbon is preferred. A hydroxyl group of the alcohol may be any of primary to tertiary. Examples of the alcohol include methanol, ethanol, 1-propanol, 2-propanol, 1-butanol, 2-butanol, tert-butanol, 1-pentanol, 2-methyl-2-butanol and cyclohexanol. In addition, as an alcohol, fluorine-containing alcohols may be used. For example, 2-fluoroethanol, 2,2,2-trifluoroethanol, 2,2,3,3-tetrafluoro-1-propanol and the like can be mentioned. Further, the hydrocarbon may be of strait chain, branched chain or cycle. Either an aromatic hydrocarbon or an aliphatic hydrocarbon is usable. The aliphatic hydrocarbon may be saturated or unsaturated. Examples of the hydrocarbon include cyclohexane, hexane, benzene, toluene and xylene.

Examples of combination of a chlorine-containing organic solvent and other organic solvent include combinations of following compositions. However, the composition usable in the invention is not limited to these.

dichloromethane/methanol/ethanol/butanol (80/10/5/5, parts by mass), dichloromethane/acetone/methanol/propanol (80/10/5/5, parts by mass), dichloromethane/methanol/butanol/cyclohexane (80/10/5/5, parts by mass), dichloromethane/methylethylketone/methanol/butanol (80/10/5/5, parts by mass), dichloromethane/acetone/methylethylketone/ethanol/isopropanol (75/10/10/5/7, parts by mass), dichloromethane/cyclopentanone/methanol/isopropanol (80/10/5/8, parts by mass), dichloromethane/methylacetate/butanol (80/10/10, parts by mass), dichloromethane/cyclohexanone/methanol/hexane (70/20/5/5, parts by mass), dichloromethane/methylethylketone/acetone/methanol/ethanol (50/20/20/5/5, parts by mass), dichloromethane/1,3-dioxolan/methanol/ethanol (70/20/5/5, parts by mass), dichloromethane/dioxane/acetone/methanol/ethanol (60/20/10/5/5, parts by mass), dichloromethane/acetone/cyclopentanone/ethanol/isobutanol/cyclohexane (65/10/10/5/5/5, parts by mass), dichloromethane/methylethylketone/acetone/methanol/ethanol (70/10/10/5/5, parts by mass), dichloromethane/acetone/ethylacetate/ethanol/butanol/hexane (65/10/10/5/5/5, parts by mass), dichloromethane/acetomethylacetate/methanol/ethanol (65/20/10/5, parts by mass), dichloromethane/cyclopentanone/ethanol/butanol (65/20/10/5, parts by mass), dichloromethane/methanol (85/15, parts by mass).

Chlorine-free Solvent

Next, description will be given about chlorine-free organic solvents that are preferably used on manufacturing a solution of the cellulose acylate of the invention. In the invention, the chlorine-free organic solvent is not particularly limited as long as the purpose of dissolving, casting and film-forming the cellulose acylate can be achieved. As for the chlorine-free organic solvent used in the invention, a solvent selected from esters, ketones and ethers having 3-12 carbon atoms is preferred. These esters, ketones and ethers may have a cyclic structure. Compounds having two or more of any functional groups of ester, ketone and ether (that is, —O—, —CO— or —COO—) may also be used as a primary solvent, that is, they may have other functional group such as, for example, an alcoholic hydroxyl group. In the case of a primary solvent having two or more kinds of functional groups, number of carbon atoms thereof is sufficient when it falls in the range defined for a compound having any one kind of functional group. Examples of esters having 3-12 carbon atoms include ethyl formate, propyl formate, pentyl formate, methylacetate, ethylacetate and pentyl acetate. Examples of ketones having 3-12 carbon atoms include acetone, methylethylketone, diethylketone, diisobutylketone, cyclopentanone, cyclohexanone and methylcyclohexanone. Examples of ethers having 3-12 carbon atoms include diisopropylether, dimethoxymethane, dimethoxyethane, 1,4-dioxane, 1,3-dioxolan, tetrahydrofuran, anisole and phenetol. Examples of the organic solvent having two or more kids of functional groups include 2-ethoxyethylacetate, 2-methoxyethanol and 2-buthoxyethanol.

The foregoing chlorine-free organic solvents used for the cellulose acylate are selected on the basis of the above-described various viewpoints, and preferably as follows. That is, as for the chlorine-free organic solvent, a mixed solvent containing the aforementioned chlorine-free organic solvent as a primary solvent is preferred. Among them, a mixed solvent of three or more kinds of solvents differing from one another, wherein a first solvent is at least one kind selected from methylacetate, ethylacetate, methylformate, ethylformate, acetone, dioxolan, dioxane and a mixture thereof, a second solvent is selected from ketones and acetoacetic acid esters having 4-7 carbon atoms, and a third solvent is selected from alcohols and hydrocarbons having 1-10 carbon atoms and, more preferably, from alcohols having 1-8 carbon atoms, is preferred. In this connection, when the first solvent is a mixed liquid of two or more kinds of solvents, no second solvent may be contained. The first solvent is, more preferably, methylacetate, acetone, methylformate, ethylformate, or a mixture thereof. The second solvent is, preferably, methylethylketone, cyclopentanone, cyclohexanone or acetylmethylacetate, or a mixture thereof may be usable.

An alcohol as the third solvent may be of straight chain, branched chain or cycle. Among them, one based on a saturated aliphatic hydrocarbon is preferred. A hydroxyl group of the alcohol may be any of primary to tertiary. Examples of the alcohol include methanol, ethanol, 1-propanol, 2-propanol, 1-butanol, 2-butanol, tert-butanol, 1-pentanol, 2-methyl-2-butanol and cyclohexanol. In addition, as the alcohol, fluorine-containing alcohol may be usable, including, for example, 2-fluoroethanol, 2,2,2-trifluoroethanol and 2,2,3,3-tetrafluoro-1-propanol. Further, hydrocarbon may be of straight chain, branched chain, or cycle. Either an aromatic hydrocarbon or an aliphatic hydrocarbon is usable. The aliphatic hydrocarbon may be saturated or unsaturated. Examples of the hydrocarbon include cyclohexane, hexane, benzene, toluene and xylene. These alcohols and hydrocarbons as the third solvent may be usable separately or as a mixture of two or more kinds thereof, and not particularly restricted. Specific preferable compounds of the third solvents include methanol, ethanol, 1-propanol, 2-propanol, 1-butanol, 2-butanol and cyclohexanol as alcohols, cyclohexane and hexane, and in particular, methanol, ethanol, 1-propanol, 2-propanol and 1-butanol.

On the basis of the total amount of the mixed solvent, the mixing ratio of the foregoing three kinds of solvents is that preferably the first solvent is contained in 20-95% by mass, the second solvent in 2-60% by mass and further the third solvent in 2-30% by mass, more preferably the first solvent is contained in 30-90% by mass, the second solvent in 3-50% by mass, and the third alcohol in 3-25% by mass. Furthermore, particularly preferably the first solvent is contained in 30-90% by mass, the second solvent in 3-30% by mass, and the third solvent is alcohol and contained in 3-15% by mass. About the chlorine-free organic solvent used in the invention is described in more detail in pp 12-16 of KOKAI-GIHO (Disclosure of Techniques) (Kogi No. 2001-1745, published on Mar. 15, 2001 by Japan Institute of Invention and Innovation).

Preferable compositions of the chlorine-free organic solvent in the invention is listed below. However, usable compositions in the invention are not restricted to these.

methylacetate/acetone/methanol/ethanol/butanol (75/10/5/5/5, parts by mass),
methylacetate/acetone/methanol/ethanol/propanol (75/10/5/5/5, parts by mass),
methylacetate/acetone/methanol/butanol/cyclohexane (75/10/5/5/5, parts by mass),
methylacetate/acetone/ethanol/butanol (81/8/7/4, parts by mass),
methylacetate/acetone/ethanol/butanol (82/10/4/4, parts by mass),
methylacetate/acetone/ethanol/butanol (80/10/4/6, parts by mass),
methylacetate/methylethylketone/methanol/butanol (80/10/5/5, parts by mass),
methylacetate/acetone/methylethylketone/ethanol/isopropanol (75/10/10/5/7, parts by mass),
methylacetate/cyclopentanone/methanol/isopropanol (80/10/5/8, parts by mass),
methylacetate/acetone/butanol (85/5/5, parts by mass),
methylacetate/cyclopentanone/acetone/methanol/butanol (60/15/15/5/6, parts by mass),
methylacetate/cyclohexanone/methanol/hexane (70/20/5/5, parts by mass),
methylacetate/methylethylketone/acetone/methanol/ethanol (50/20/20/5/5, parts by mass),
methylacetate/1,3-dioxolan/methanol/ethanol (70/20/5/5, parts by mass),
methylacetate/dioxane/acetone/methanol/ethanol (60/20/10/5/5, parts by mass),
methylacetate/acetone/cyclopentanone/ethanol/isobutanol/cyclohexane (65/10/10/5/5/5, parts by mass),
methylformate/methylethylketone/acetone/methanol/ethanol (50/20/20/5/5, parts by mass),
methylformate/acetone/ethylacetate/ethanol/butanol/hexane (65/10/10/5/5/5, parts by mass),
acetone/acetomethylacetate/methanol/ethanol (65/20/10/5, parts by mass),
acetone/cyclopentanone/ethanol/butanol (65/20/10/5, parts by mass),
acetone/1,3-dioxolan/ethanol/butanol (65/20/10/5, parts by mass),
1,3-dioxolan/cyclohexanone/methylethylketone/methanol/butanol (55/20/10/5/5/5, parts by mass)

Further, cellulose acylate solutions prepared by following methods may also be used:

a method in which a cellulose acylate solution is manufactured using methylacetate/acetone/ethanol/butanol (81/8/7/4, parts by mass) and then filtered and concentrated followed by additional addition of 2 parts by mass of butanol;

a method in which a cellulose acylate solution is manufactured using methylacetate/acetone/ethanol/butanol (84/10/4/2, parts by mass) and then filtered and concentrated followed by additional addition of 4 parts by mass of butanol; and a method in which a cellulose acylate solution is manufactured using methylacetate/acetone/ethanol (84/10/6, parts by mass) and then filtered and concentrated followed by additional addition of 5 parts by mass of butanol.

In the cellulose acylate solution (dope) for use in the invention, dichloromethane may be incorporated in a amount of 10% by mass or less of the total amount of the organic solvents to the above-described chlorine-free organic solvent of the invention.

Properties of the Cellulose Acylate Solution

As for the cellulose acylate solution, a solution manufactured by dissolving cellulose acylate in the aforementioned organic solvent in 10-30% by mass is preferred, in 13-27% by mass is more preferred, and in 15-25% by mass is particularly preferred, from the viewpoint of aptitude for film-forming and casting. In order to adjust the concentration of the cellulose acylate solution, cellulose acylate may be dissolved so that the solution has a designed concentration, or dissolved in a lower concentration (for example, 9-14% by mass) in advance and then concentrated in a concentration step described later to form a solution having a designed higher concentration. Or, in advance, a cellulose acylate solution having a higher concentration is prepared, to which various additives are added to give a cellulose acylate solution having a designed lower concentration. Either method has no particular problem only when it can give the cellulose acylate solution having the concentration of the invention.

In the invention, a molecular weight of cellulose acylate association body in a diluted solution, which has been prepared by diluting an cellulose acylate solution with an organic solvent having the same composition to become of 0.1-5% by mass, is preferably 150,000-15,000,000, more preferably 180,000-9,000,000.

The association molecular weight can be obtained by a static light scattering method. On this occasion, it is preferred to dissolve cellulose acylate so that an inertial square radius obtained at the same time will become 10-200 nm. The more preferred inertial square radius is 20-200 nm. Furthermore, it is preferred to dissolve cellulose acylate so that the second virial coefficient will become $-2\times10^{-4}$-$+4\times10^{-4}$, and more preferred to dissolve it so that the second virial coefficient will become $-2\times10^{-4}$-$+2\times10^{-4}$.

Here, respective definitions of the association molecular weight, the inertial square radius and the second virial coefficient in the invention will be described. These are measured according to a method described below using a static light scattering method. As a matter of convenience of an apparatus, the measurement is performed using a sample in a diluted region, but these measured values reflect behavior of the dope of the invention in a high concentration region.

First, cellulose acylate is dissolved in a solvent used for a dope to prepare solutions of 0.1% by mass, 0.2% by mass, 0.3% by mass and 0.4% by mass, respectively. Here, cellulose acylate to be used is dried in advance at 120° C. for 2 hours, which is weighed at 25° C. and relative humidity of 10% in order to prevent moisture absorbent. The dissolution is performed according to the method employed at dissolving the dope (ordinary temperature dissolving method, cooling dissolving method, high-temperature dissolving method). Subsequently, these solutions and solvents are filtered on a 0.2 μm Teflon filter (Teflon: registered trade mark). Then the filtered solution is subjected to measurement of static light scattering using a light scattering measurement apparatus (DLS-700, manufactured by OTSUKA ELECTRONICS CO., LTD.) at 25° C. from 30° to 140° at 10° intervals. The resultant data are analyzed by the BERRY plot method. In this connection, as for values necessary for the analysis, a refraction index used was a value of the solvent obtained using the Abbe refraction system, and concentration gradient (dn/dc) of the refraction index was measured using a differential refractometer (DRM-1021, manufactured by OTSUKA ELECTRONICS CO., LTD.) while using the solvent and the solution used for measuring light scattering.

Preparation of Solution

For preparing the cellulose acylate solution (dope), use of a high-temperature dissolving method or a cooling dissolving method is preferred, and a combination thereof is also usable. Preparation methods of a cellulose acylate solution are described in respective gazettes of JP-A-58-127737, JP-A-61-106628, JP-A-2-276830, JP-A-4-259511, JP-A-5-163301, JP-A-9-95544, JP-A-10-45950, JP-A-10-95854, JP-A-11-71463, JP-A-11-302388, JP-A-11-322946, JP-A-11-322947, JP-A-11-323017, JP-A-2000-53784, JP-A-2000-273184 and JP-A-2000-273239. A method for preparing a cellulose acylate is also described in p 25 of KOKAI-GIHO (Disclosure of Techniques) (Kogi No. 2001-1745, published on Mar. 15, 2001 by Japan Institute of Invention and Innovation).

In this connection, when heating temperatures in the high-temperature dissolving method are higher than the boiling point of an organic solvent used, heating is performed under pressure.

As for a cooling step of the mixture of cellulose acylate and a solvent, cooling temperatures are not particularly restricted, but −100° C.−−10° C. is preferred, −100° C.−−30° C. is more preferred, and −100° C.−−50° C. is particularly preferred.

Cellulose Acylate Raw Cotton

As for cellulose as cellulose acylate raw material used in the invention, there are cotton linter and wood pulp (broad leaf pulp, conifer pulp) and the like. Cellulose acylate obtained from any of these raw cellulose is usable, and use of a mixture thereof may also be possible. Examples of cellulose usable as raw cellulose include those described in detail, for example, in "Plastic Zairyo Koza (Plastic Material Course) (17) Cellulose-based Resins" (Marusawa, Uda, published by THE NIKKAN KOGYO SHIMBUN LTD. 1970) and pp 7-8 of KOKAI-GIHO (Disclosure of Techniques) (Kogi No. 2001-1745, published on Mar. 15, 2001 by Japan Institute of Invention and Innovation). Thus, there is no particular restriction for the cellulose acylate film of the invention.

Additives

Examples of the additive that can be used for the aforementioned cellulose acylate solution include a plasticizer, an ultraviolet absorber, a degradation inhibitor, an Re-developing agent, an Rth-lowering agent, a wavelength dispersion-adjusting agent, fine particles, a stripping accelerator and an infrared absorber. In the invention, use of an Re-developing agent is preferred. Further, use of one or more kinds of a plasticizer, an ultraviolet absorber and a stripping accelerator is preferred.

They may be a solid material or an oily material. That is, they are not particularly restricted in the melting point or boiling point thereof. For example, use of a mixture of an ultraviolet absorber having a melting point of 20° C. or less and an ultraviolet absorber having a melting point of 20° C. or more, or, in the same way, use of a mixture of plasticizers is possible. For example, JP-A-2001-151901 describes such use.

As for an ultraviolet absorber, any kind can be selected according to the purpose, including a salicylic acid ester-based, a benzophenone-based, a benzotriazole-based, benzoate-based, a cyanoacrylate-based and a nickel complex-based absorbers. Preferable examples are a benzophenone-based, a benzotriazole-based and a salicylic acid ester-based absorbers. Examples of the benzophenone-based ultraviolet absorber include 2,4-dihydroxybenzophenone, 2-hydroxy-4-acetoxybenzophenone, 2-hydroxy-4-methoxybenzophenone, 2,2'-di-hydroxy-4-methoxybenzophenone, 2,2'-di-hydroxy-4,4'-methoxybenzophenone, 2-hydroxy-4-n-octoxybenzophenone, 2-hydroxy-4-dodecyloxybenzophenone and 2-hydroxy-4-(2-hydroxy-3-methacryloxy)propoxybenzophenone. Examples of the benzotriazole-based ultraviolet absorber include 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-amylphenyl)benzotriazole, 2(2'-hydroxy-3',5'-di-tert-butylphenyl)-5-chlorobenzotriazole, and 2(2'-hydroxy-5'-tert-octylphenyl)benzotriazole. Examples of the salicylic acid ester-based ultraviolet absorber include phenyl salicylate, p-octylphenyl salicylate and p-tert-butylphenyl salicylate. Among these exemplified ultraviolet absorbers, 2-hydroxy-4-methoxybenzophenone, 2,2'-di-hydroxy-4,4'-methoxybenzophenone, 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-amylphenyl)benzotriazole and 2(2'-hydroxy-3',5'-di-tert-butylphenyl)-5-chlorobenzotriazole are particularly preferred.

As for the ultraviolet absorber, combined use of plural absorbers having different absorption wave lengths is preferred because a high blocking effect can be obtained over a wide range of wavelengths. An preferable ultraviolet absorber for use in a liquid crystal is one that is excellent in absorption performance of ultraviolet of 370 nm or less in wavelength from the viewpoint of inhibiting degradation of the liquid crystal, and has little absorption of visible light of 400 nm or more in wavelength from the viewpoint of liquid crystal display property. Particularly preferable ultraviolet absorbers are aforementioned benzotriazole-based compounds, benzophenone-based compounds and salicylic acid ester-based compounds. Among these, benzotriazole-based compounds are preferred because they give little unnecessary coloring to cellulose acylate.

In addition, such compounds as described in respective gazettes of JP-A-60-235852, JP-A-3-199201, JP-A-5-1907073, JP-A-5-194789, JP-A-5-271471, JP-A-6-107854, JP-A-6-118233, JP-A-6-148430, JP-A-7-11056, JP-A-7-11055, JP-A-7-11056, JP-A-8-29619, JP-A-8-239509 and JP-A-2000-204173 can also used as the ultraviolet absorber.

Addition amount of the ultraviolet absorber is, from the viewpoint of the addition effect and suppression of bleed out of the ultraviolet absorber to film surface, preferably 0.001-5% by mass, more preferably 0.01-1% by mass relative to the amount of cellulose acylate.

The ultraviolet absorber may be added simultaneously at dissolving cellulose acylate, or added to a dope after the dissolution. Particularly, such embodiment that an ultraviolet absorber solution is added to a dope just before casting by using a static mixer or the like is preferred since it allows spectral absorption property to be adjusted easily.

The aforementioned degradation inhibitor inhibits degradation and decomposition of cellulose triacetate and the like. Example of the degradation inhibitor include such compounds as butylamine, hindered amine compounds (JP-A-8-325537), guanidine compounds (JP-A-5-271471), benzotriazole-based ultraviolet absorbers (JP-A-6-235819) and benzophenone-based ultraviolet absorbers (JP-A-6-118233).

As the plasticizer, phosphoric acid esters and carboxylic acid esters are preferred. Specific preferable examples of the plasticizer include triphenyl phosphate (TPP), tricresyl phosphate (TCP), cresyldiphenyl phosphate, octyldiphenyl phosphate, diphenylbiphenyl phosphate, trioctyl phosphate, tributyl phosphate, dimethyl phthalate (DMP), diethyl phthalate (DEP), dibutyl phthalate (DBP), dioctyl phthalate (DOP), diphenyl phthalate (DPP), diethylhexyl phthalate (DEHP), o-acetyltriethyl citrate (OACTE), o-acetyltributyl citrate (OACTB), acetyltriethyl citrate, acetyltributyl citrate, butyl oleate, methylacetyl ricinoleate, dibutyl sebacate, triacetin, tributyrin, butylphthalylbutyl glycolate, etylphthalylethyl glycolate, methylphthalylethyl glycolate and butylphthalylbutyl glycolate. In addition, preferable examples of the plasticizer include (di)pentaerythritol esters, glycerol esters and diglycerol esters.

Examples of the aforementioned stripping accelerator include ethylesters of citric acid. As for the infrared absorber, it is described, for example, in JP-A-2001-194522.

These additives may be added at any step of dope-manufacturing process, or added by arranging an additional step for adding the additive as the final manufacturing step of the dope-manufacturing process. An addition amount of respective elements is not particularly restricted as long as function is developed. When the cellulose acylate film has plural layers, kinds or addition amounts of the additives in each layer may be different from one another. These techniques are described, for example, in JP-A-2001-151902 and the like, but these are techniques that have been known conventionally. Further, as additives, those minutely described in pp 16—of KOKAI-GIHO (Disclosure of Techniques) (Kogi No. 2001-1745, published on Mar. 15, 2001 by Japan Institute of Invention and Innovation) may be arbitrarily used.

Re-developing Agent

In the invention, in order to make a preferred retardation develop, use of an Re-developing agent is preferred.

As for the Re-developing agent usable in the invention, an Re-developing agent composed of a rod-shaped or discotic compound can be mentioned.

As the above-described rod-shaped or discotic compound, compound having at least two aromatic rings can be used.

The addition amount of an Re-developing agent composed of a rod-shaped compound is preferably 0.1-30 parts by mass, more preferably 0.5-20 parts by mass relative to 100 parts by mass of a polymer component containing cellulose acylate.

The range of amount of a discotic Re-developing agent is preferably 0.05-20 parts by mass, more preferably 0.1-10 parts by mass, further preferably 0.2-5 parts by mass, most preferably 0.5-2 parts by mass relative to 100 parts by mass of the polymer component containing cellulose acylate.

Two or more kinds of Re-developing agents may be used simultaneously.

The aforementioned Re-developing agent composed of a rod-shaped or discotic compound preferably has the maximum absorption in the wave length range of 250-400 nm, and preferably has no substantial absorption in the visible light region.

Description will be given about the discotic compound. As the discotic compound, a compound having at least two aromatic rings can be employed.

In the specification, an "aromatic ring" includes an aromatic heteroring, in addition to an aromatic hydrocarbon ring.

The aromatic hydrocarbon ring is particularly preferably a 6-membered ring (that is, benzene ring).

Generally, the aromatic heteroring is an unsaturated heteroring. The aromatic heteroring is preferably a 5-membered ring, 6-membered ring or a 7-membered ring, more preferably a 5-membered ring or a 6-membered ring. Generally, the aromatic heteroring has the largest number of double bonds. As hetero atoms, a nitrogen atom, an oxygen atom and a sulfur atom are preferred, and a nitrogen atom is particularly preferred. Examples of the aromatic heteroring include a furan ring, a thiophene ring, a pyrrole ring, an oxazole ring, an iso-oxazole ring, a thiazole ring, an iso-thiazole ring, an imidazole ring, a pyrazole ring, a furazane ring, a triazole ring, a pyran ring, a pyridine ring, a pyridazine ring, a pyrimidine ring, a pyrazine ring and a 1,3,5-triazine ring.

As the aromatic ring, a benzene ring, a furan ring, a thiophene ring, a pyrrole ring, an oxazole ring, a thiazole ring, an imidazole ring, a triazole ring, a pyridine ring, a pyrimidine ring, a pyrazine ring and a 1,3,5-triazine ring are used preferably, and, in particular, a 1,3,5-triazine ring is preferably used. Specifically, compounds, for example, disclosed in JP-A-2001-166144 are used preferably as a discotic compound.

Number of aromatic rings included in the discotic compound is preferably 2-20, more preferably 2-12, furthermore preferably 2-8, most preferably 2-6.

Bond relation of two aromatic rings can be classified into following cases (since an aromatic ring, a spiro bond can not be formed): (a) formation of a condensed ring, (b) formation of a direct bond by a single bond, and (c) formation of a bond via a linking group. The bond relation may be any one of (a)-(c).

Examples of the (a) condensed ring (a condensed ring of two or more of aromatic rings) include an indene ring, a naphthalene ring, an azulene ring, a fluorene ring, a phenanthrene ring, an anthracene ring, an acenaphthylene ring, an biphenylene ring, a naphthacene ring, a pyrene ring, an indole ring, an iso-indole ring, a benzofuran ring, a benzothiophene ring, an indolizine ring, a benzoxazole ring, a benzothiazole ring, a benzoimidazole ring, a benzotriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxthine ring, a phenoxazine ring and a thianthrene ring. A naphthalene ring, an azulene ring, an indole ring, a benzoxazole ring, a benzothiazole ring, a benzoimidazole ring, benzotriazole ring and a quinoline ring are preferred.

The single bond of (b) is preferably a carbon-carbon bond between two aromatic rings. Two aromatic rings may be bonded by two or more of single bonds to form an aliphatic ring or a non-aromatic heteroring between the two aromatic rings.

The linking group of (c) also bonds, preferably, to carbon atoms of the two aromatic rings. The linking group is preferably an alkylene group, an alkenylene group, an alkynylene group, —CO—, —O—, —NH—, —S— or combinations thereof. Examples of the linking group composed of the combination are shown below. In this connection, the relation of right and left in the following examples of linking group may be reversed.

c1: —CO—O—
c2: —CO—NH—
c3: -alkylene-O—
c4: —NH—CO—NH—
c5: —NH-00-β
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene
c12: —O-alkylene-00-O-alkylene-O—CO-alkylene-O—
c13: —O—CO-alkylene-CO—O—
c14: —NH—CO-alkenylene-
c15: —O—CO-alkenylene- The aromatic ring and the linking group may have a substituent.

Examples of the substituent include a halogen atom (F, Cl, Br, I), a hydroxyl group, a carboxyl group, a cyano group, an amino group, a nitro group, a sulfo group, a carbamoyl group, a sulfamoyl group, an ureide group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amide group, an aliphatic sulfoneamide group, an aliphatic-substituted amino group, an aliphatic-substituted carbamoyl group, an aliphatic-substituted sulfamoyl group, an aliphatic-substituted ureide group and a non-aromatic heterocyclic group.

Number of carbon atoms of the alkyl group is preferably 1-8. A chain alkyl group is preferred to a cyclic alkyl group, and a strait-chain alkyl group is particularly preferred. The alkyl group may further have a substituent (for example, a hydroxyl group, a carboxyl group, an alkoxy group, an alkyl-substituted amino group). Examples of the alkyl group (including the substituted alkyl group) include a methyl group, an ethyl group, a n-butyl group, a n-hexyl group, a 2-hydroxyethyl group, a 4-carboxybutyl group, a 2-methoxyethyl group and 2-diethylaminoethyl group.

Number of carbon atoms of the alkenyl group is preferably 2-8. A chain alkenyl group is preferred to a cyclic alkenyl group, and a straight-chain alkenyl group is particularly preferred. The alkenyl group may further have a substituent. Examples of the alkenyl group include a vinyl group, an aryl group and a 1-hexenyl group.

Number of carbon atoms of the alkynyl group is preferably 2-8. A chain alkynyl group is preferred to a cyclic alkynyl group, and a straight-chain alkynyl group is particularly preferred. The alkynyl group may further have a substituent. Examples of the alkynyl group include an ethynyl group, a 1-butynyl group and a 1-hexynyl group.

Number of carbon atoms of the aliphatic acyl group is preferably 1-10. Examples of the aliphatic acyl group include an acetyl group, a propanoyl group and a butanoyl group.

Number of carbon atoms of the aliphatic acyloxy group is preferably 1-10. Example of the aliphatic acyloxy group include an acetoxy group.

Number of carbon atoms of the alkoxy group is preferably 1-8. The alkoxy group may further have an substituent (for example, an alkoxy group). Examples of the alkoxy group (including a substituted alkoxy group) include a methoxy group, an ethoxy group, a butoxy group and a methoxyethoxy group.

Number of carbon atoms of the alkoxycarbonyl group is preferably 2-10. Examples of the alkoxycarbonyl group include a methoxycarbonyl group and an ethoxycarbonyl group.

Number of carbon atoms of the alkoxycarbonylamino group is preferably 2-10. Examples of the alkoxycarbonylamino group include a methoxycarbonylamino group and an ethoxycarbonylamino group.

Number of carbon atoms of the alkylthio group is preferably 1-12. Examples of the alkylthio group include a methylthio group, an ethylthio group and an octylthio group.

Number of carbon atoms of the alkylsulfonyl group is preferably 1-8. Examples of the alkylsulfonyl group include a methanesulfonyl group and an ethanesulfonyl group.

Number of carbon atoms of the aliphatic amide group is preferably 1-10. Example of the aliphatic amide group includes an acetamide group.

Number of carbon atoms of the aliphatic sulfonamido group is preferably 1-8. Examples of the aliphatic sulfonamido group include a methane sulfonamido group, a butane sulfonamido group and a n-octane sulfonamido group.

Number of carbon atoms of the aliphatic-substituted amino group is preferably 1-10. Examples of the aliphatic-substituted amino group include a dimethylamino group, a diethylamino group and a 2-carboxyethylamino group.

Number of carbon atoms of the aliphatic-substituted carbamoyl group is preferably 2-10. Examples of the aliphatic-substituted carbamoyl group include a methylcarbamoyl group and a diethylcarbamoyl group.

Number of carbon atoms of the aliphatic-substituted sulfamoyl group is preferably 1-8. Examples of the aliphatic-substituted sulfamoyl group include a methylsulfamoyl group and a diethylsulfamoyl group.

Number of carbon atoms of the aliphatic-substituted ureide group is preferably 2-10. Example of the aliphatic-substituted ureide group includes a methylureide group.

Examples of the non-aromatic heterocyclic group include a piperidino group and a morphorino group.

Molecular weight of the Re-developing agent composed of the discotic compound is preferably 300-800.

In the invention, rod-shaped compounds having a linear molecular structure are also usable preferably in addition to the discotic compound. "The linear molecular structure" means that molecular structure of a rod-shaped compound is linear in the thermodynamically stablest structure. The thermodynamically stablest structure can be obtained by crystal structure analysis or molecular orbital calculation. For example, molecular orbital calculation can be performed using a software for molecular orbital calculation (for example, WinMOPAC2000, manufactured by FUJITSU) to obtain the molecular structure for which heat of formation of the compound becomes least. "The linear molecular structure" means that the angle constituted by the primary chain of the molecular structure is 140 degrees or more in the thermodynamically stablest structure obtained according to the aforementioned calculation.

As the rod-shaped compound, ones having at least two aromatic rings are preferred. As the rod-shaped compound having at least two aromatic rings, compounds represented by formula (1) below are preferred.

$$Ar^1-L^1-Ar^2: \quad \text{Formula (1)}$$

wherein each of $Ar^1$ and $Ar^2$ represents an aromatic group independently from each other.

In the specification, the aromatic group includes an aryl group (aromatic hydrocarbon group), a substituted aryl group, an aromatic heteroring group and a substituted aromatic heteroring group.

An aryl group and a substituted aryl group are preferred to an aromatic heteroring group and a substituted aromatic heteroring group. A heteroring in the aromatic heteroring group is generally unsaturated. The aromatic heteroring is preferably a 5-membered ring, a 6-membered ring or a 7-membered ring, more preferably a 5-membered ring or a 6-membered ring. The aromatic heteroring generally has the largest number of double bonds. As for the hetero atom, a nitrogen atom, an oxygen atom or a sulfur atom is preferred, and a nitrogen atom or a sulfur atom is more preferred.

Preferable examples of the aromatic ring in the aromatic group include a benzene ring, a furan ring, a thiophene ring, a pyrrole ring, an oxazole ring, a thiazole ring, an imidazole ring, a triazole ring, a pyridine ring, a pyrimidine ring and a pyrazine ring. A benzene ring is particularly preferred.

Examples of the substituent of the substituted aryl group and substituted aromatic heteroring group include a halogen atom (F, Cl, Br, I), a hydroxyl group, a carboxyl group, a cyano group, an amino group, an alkylamino group (for example, a methylamino group, an ethylamino group, a butylamino group, a dimethylamino group), a nitro group, a sulfo group, a carbamoyl group, an alkylcarbamoyl group (for example, an N-methylcarbamoyl group, an N-ethylcarbamoyl group, an N,N-dimethylcarbamoyl group), a sulfamoyl group, an alkylsulfamoyl group (for example, an N-methylsulfamoyl group, an N-ethylsulfamoyl group, an N,N-dimethylsulfamoyl group), an ureide group, an alkylureide group (for example, an N-methylureide group, an N,N-dimethylureide group, an N,N,N'-trimethylureide group), an alkyl group (for example, a methyl group, an ethyl group, a propyl group, a butyl group, a pentyl group, a heptyl group, an octyl group, an isopropyl group, a s-butyl group, a tert-amyl group, a cyclohexyl group, a cyclopentyl group), an alkenyl group (for example, a vinyl group, an aryl group, a hexenyl group), an alkynyl group (for example, an ethynyl group, a butynyl group), an acyl group (for example, a formyl group, an acetyl group, a butyryl group, a hexanoyl group, a lauryl group), an acyloxy group (for example, an acetoxy group, a butylyloxy group, a hexanoyloxy group, a lauryloxy group), an alkoxy group (for example, a methoxy group, an ethoxy group, a propoxy group, a butoxy group, a pentyloxy group, a heptyloxy group, an octyloxy group), an aryloxy group (for example, a phenoxy group), an alkoxycarbonyl group (for example, a methoxycarbonyl group, an ethoxycarbonyl group, a propoxycarbonyl group, a butoxycarbonyl group, a pentyloxycarbonyl group, a heptyloxycarbonyl group), an aryloxycarbonyl group (for example, a phenoxycarbonyl group), an alkoxycarbonylamino group (for example, a butoxycarbonylamino group, a hexyloxycarbonylamino group), an alkylthio group (for example, a methylthio group, an ethylthio group, a propylthio group, a butylthio group, a pentylthio group, a heptylthio group, an octylthio group), an arylthio group (for example, phenylthio group), an alkylsulfonyl group (for example, a methylsulfonyl group, an ethylsulfonyl group, a propylsulfonyl group, a butylsulfonyl group, a pentylsulfonyl group, a heptylsulfonyl group, an octylsulfonyl group), an amide group (for example, an acetamide group, a butylamide group, a hexylamide group, a laurylamide group) and non-aromatic heterocyclic groups (for example, a morphoryl group, a pyrazinyl group).

Preferable examples of the substituent of the substituted aryl group and substituted aromatic heteroring group include a halogen atom, a cyano group, a carboxyl group, a hydroxyl group, an amino group, an alkyl-substituted amino group, an acyl group, an acyloxy group, an amide group, an alkoxycarbonyl group, an alkoxy group, an alkylthio group and an alkyl group.

An alkyl moiety in the alkylamino group, the alkoxycarbonyl group, the alkoxy group and the alkylthio group and the alkyl group may further have a substituent. Examples of the substituent in the alkyl moiety and the alkyl group include a halogen atom, a hydroxyl, carboxyl, cyano, amino and alkylamino groups, a nitro, sulfo, carbamoyl and alkylcarbamoyl groups, a sulfamoyl and alkylsulfamoyl groups, an ureide and alkylureide groups, an alkenyl group, an alkynyl group, an acyl group, an acyloxy group, an acylamino group, an alkoxy group, an aryloxy group, an alkoxycarbonyl group, an ayrloxycarbonyl group, an alkoxycarbonylamino group, an alkylthio group, an arylthio group, an alkylsulfonyl group, an amide group and non-aromatic heterocyclic groups. As the substituent in the alkyl moiety and the alkyl group, a halogen atom, a hydroxyl, an amino and alkylamino groups, an acyl group, an acyloxy group, an acylamino group, an alkoxycarbonyl group and an alkoxy group are preferred.

In the formula (1), $L^1$ represents a divalent linking group selected from an alkylene group, an alkenylene group, an alkynylene group, —O—, —CO— and groups composed of combinations thereof.

The alkylene group may have a cyclic structure. As a cyclic alkylene group, cicrohexylene is preferred, and 1,4-cyclohexylene is particularly preferred. As a chain alkylene group, a straight-chain alkylene group is preferred to a branched alkylene group.

Number of carbon atoms of an alkylene group is preferably 1-20, more preferably 1-15, further preferably 1-10, furthermore preferably 1-8, most preferably 1-6.

The alkenylene group and the alkynylene group preferably have a chain structure compared with a cyclic structure, more preferably a straight chain structure compared with a branched chain structure.

Number of carbon atoms of the alkenylene group and the alkynylene group is preferably 2-10, more preferably 2-8, further preferably 2-6, furthermore preferably 2-4, most preferably 2 (that is, vinylene or ethynylene). Number of carbon atoms of the arylene group is preferably 6-20, more preferably 6-16, further preferably 6-12. In the molecular structure of the formula (1), an angle formed by $Ar^1$ and $Ar^2$ across $L^1$ is preferably 140 degrees or more.

As the rod-shaped compound, compounds represented by formula (2) below are more preferred.

$$L^2-L^2-X-L^3-Ar^2: \quad \text{Formula (2)}$$

wherein each of $Ar^1$ and $Ar^2$ represents an aromatic group independently from each other. The definition and example for the aromatic group are the same as those for $Ar^1$ and $Ar^2$ of the formula (1).

In the formula (2), each of $L^2$ and $L^3$ represents, independently from each other, a divalent linking group selected from an alkylene group, —O—, —CO— and groups composed of combinations thereof.

The alkylene group preferably has a chain structure compared with a cyclic structure, and more preferably has a straight chain structure compared with a branched chain structure.

Number of carbon atoms of the alkylene group is preferably 1-10, more preferably 1-8, further preferably 1-6, furthermore preferably 1-4, most preferably 1 or 2 (that is, methylene or ethylene).

Particularly preferably, $L^2$ and $L^3$ are —O—CO— or —CO—O—.

In the formula (2), X is 1,4-cyclohexylene, vinylene or ethynylene.

Specific examples of compounds represented by the formula (1) or (2) are shown below.

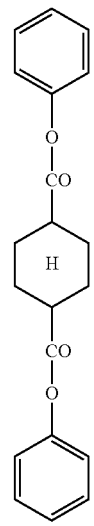

(1)

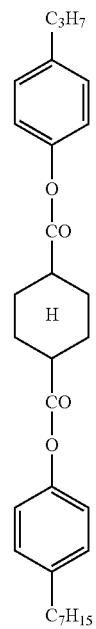

(2)

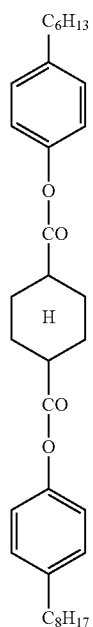
(3)
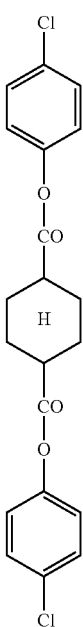
(5)
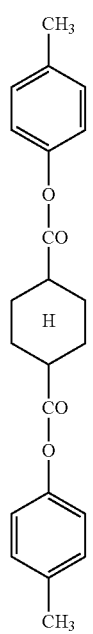
(4)
(6)

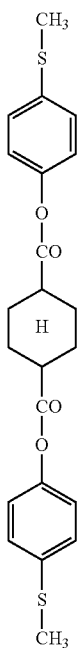 (7)
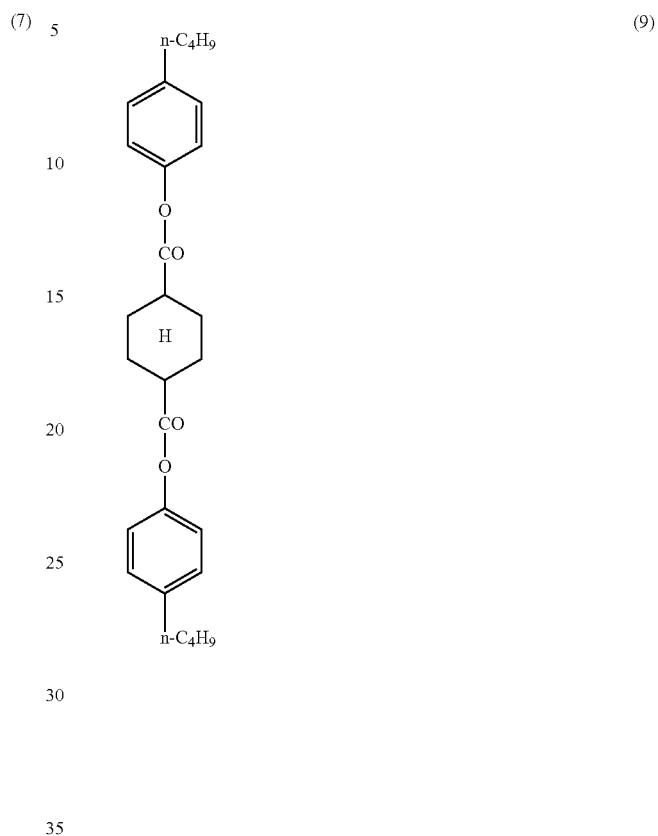
(9)
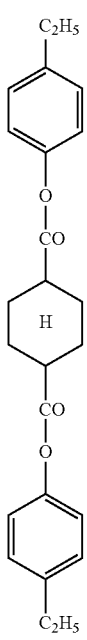 (8)
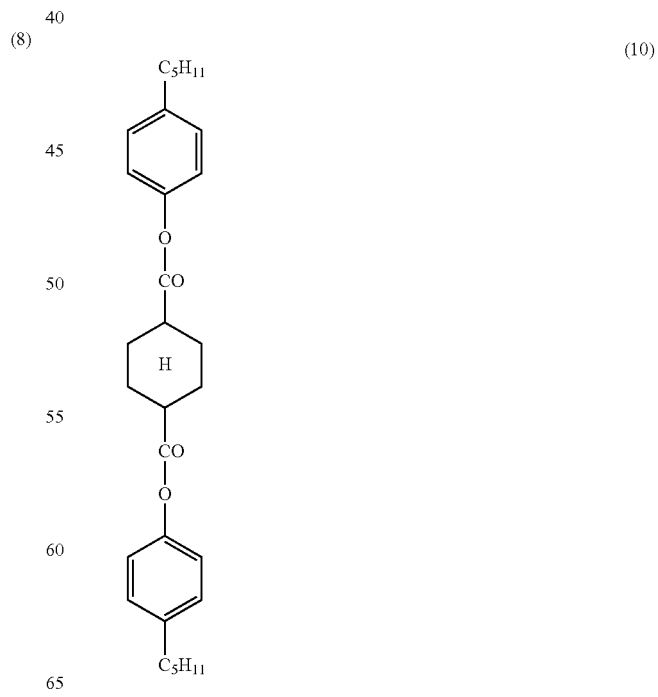
(10)

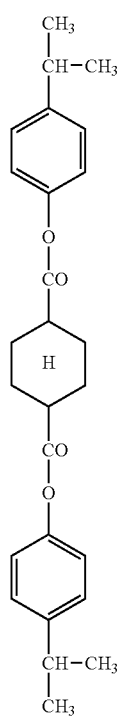
(11)
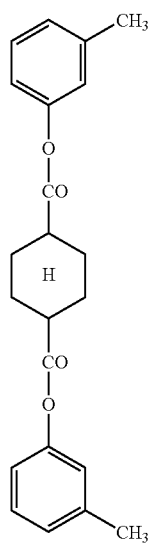
(12)
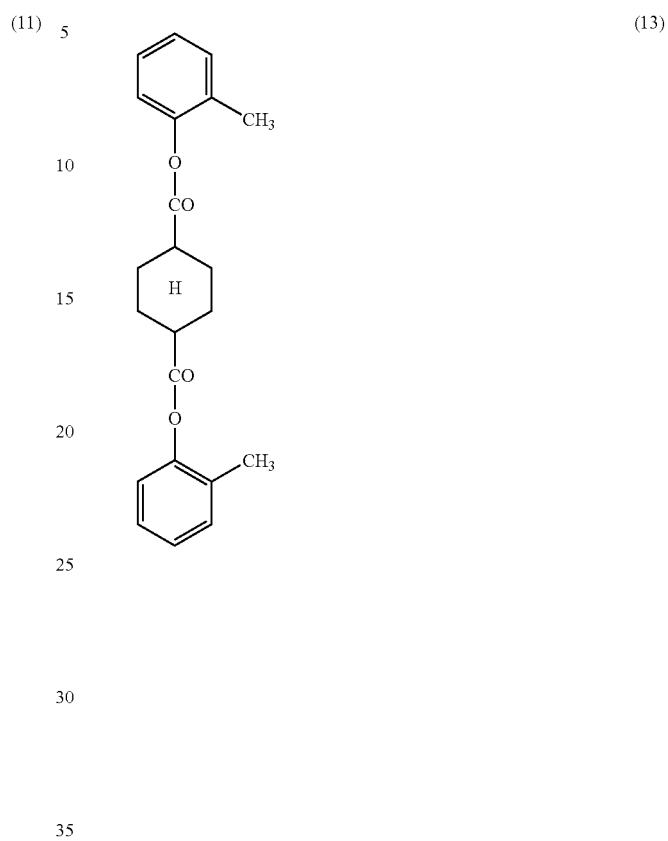
(13)
(14)

(15)
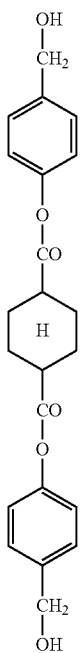
(17)
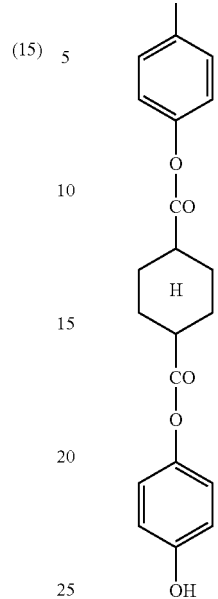
(16)
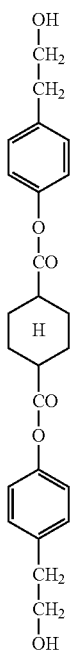
(18)
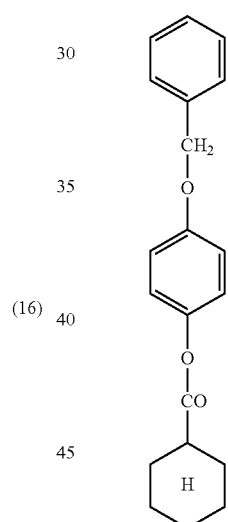
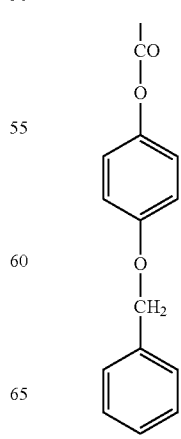

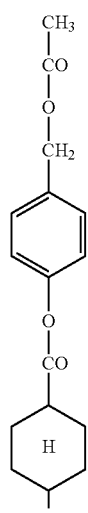
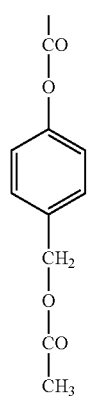
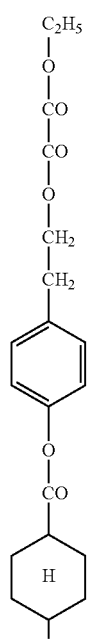
(19)
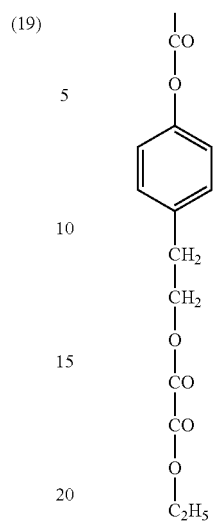
(20)
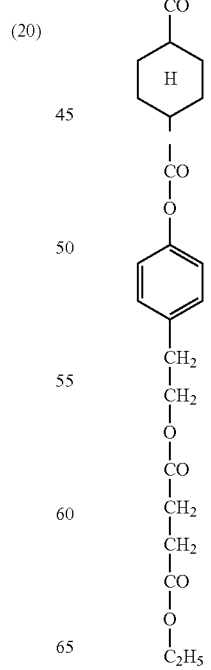
(21)
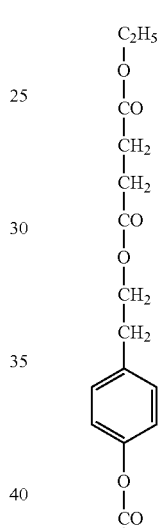

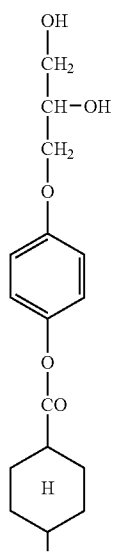 (22)
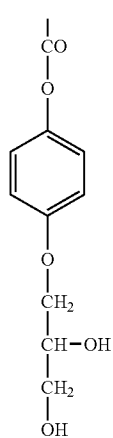
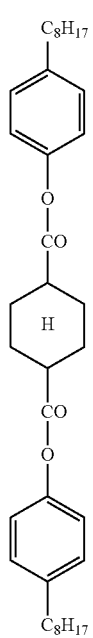 (23)
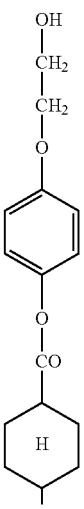 (24)
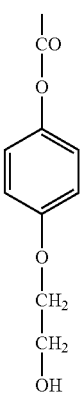
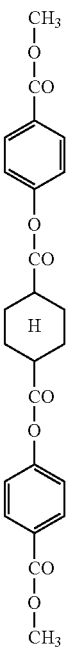 (25)

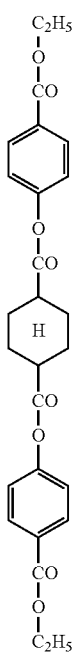 (26)
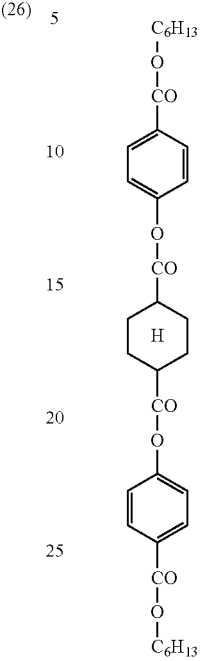 (28)
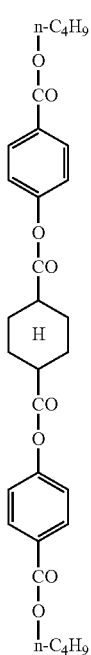 (27)
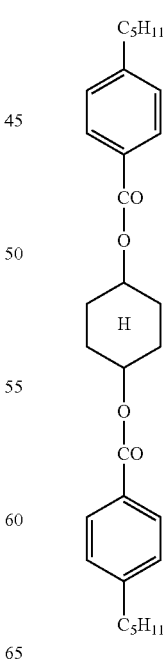 (29)

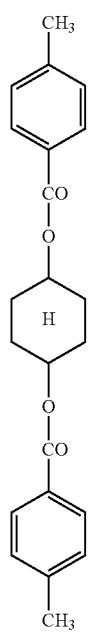
(30)
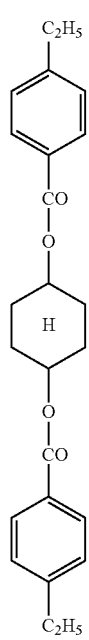
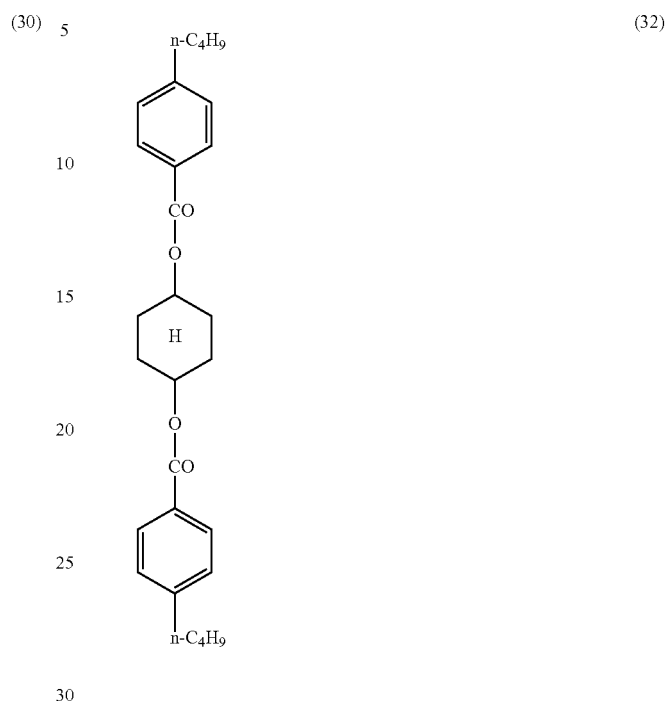
(32)
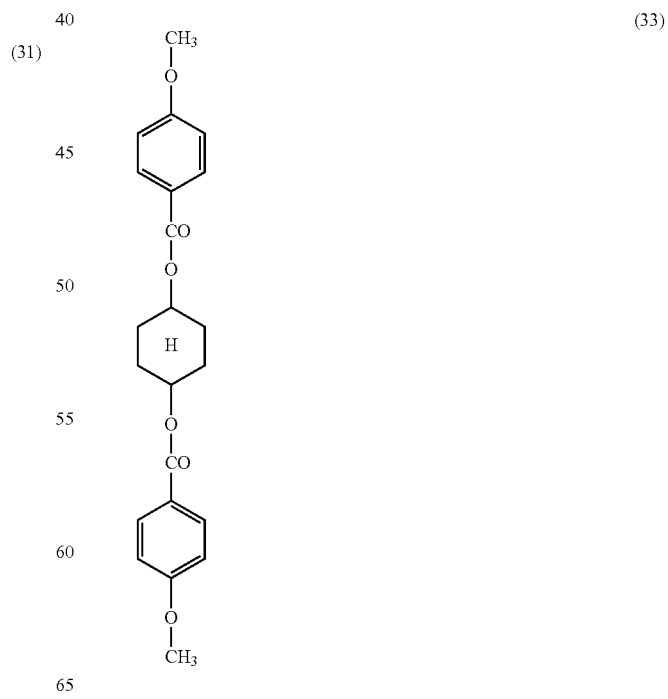
(31)
(33)

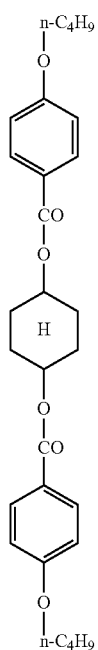
(34)
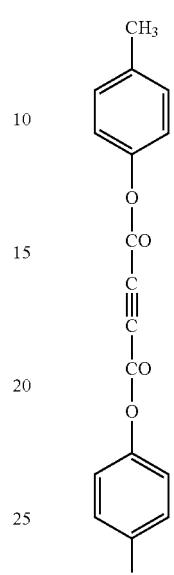
(36)
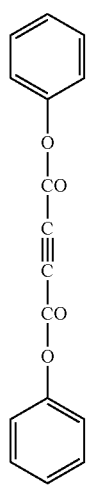
(35)
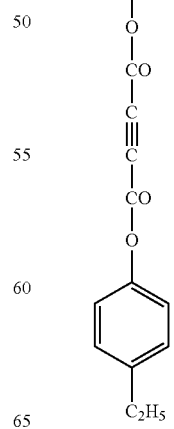
(37)

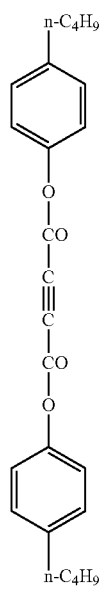 (38)
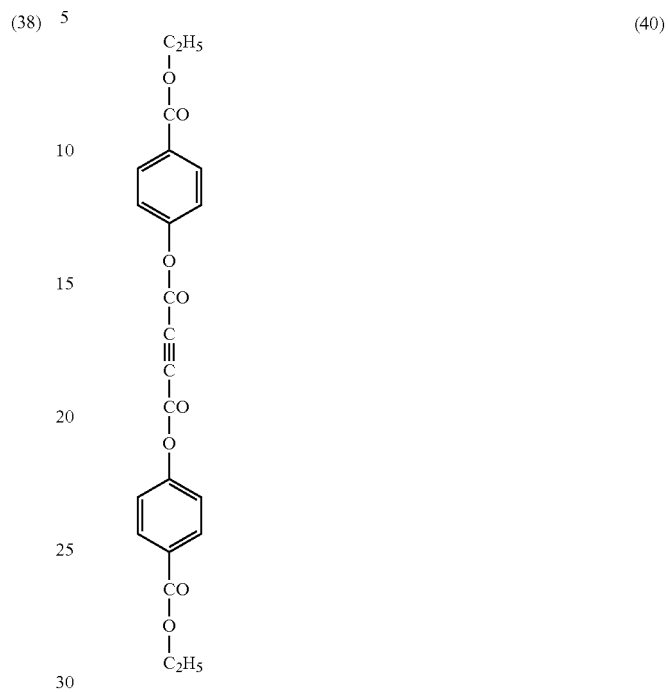
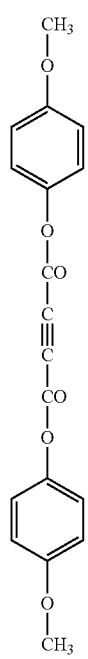 (39)
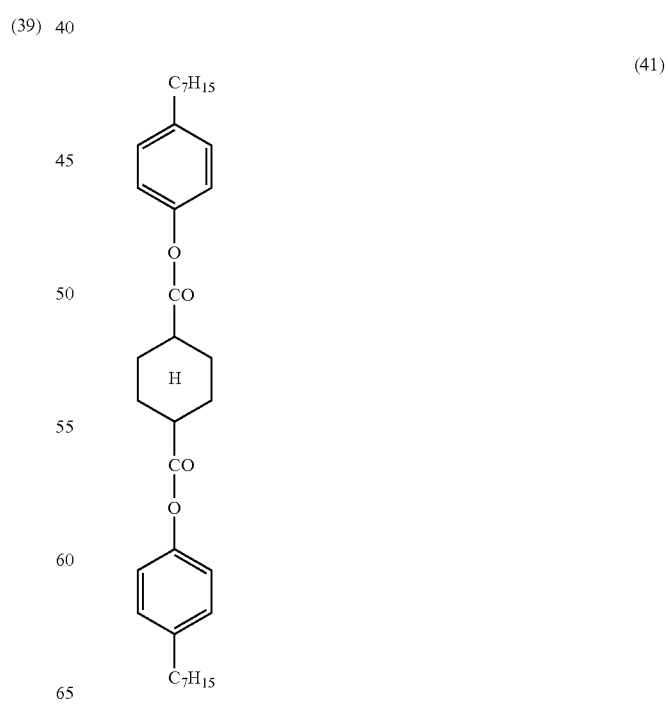

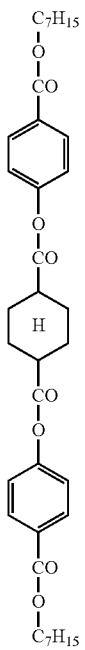
(42)
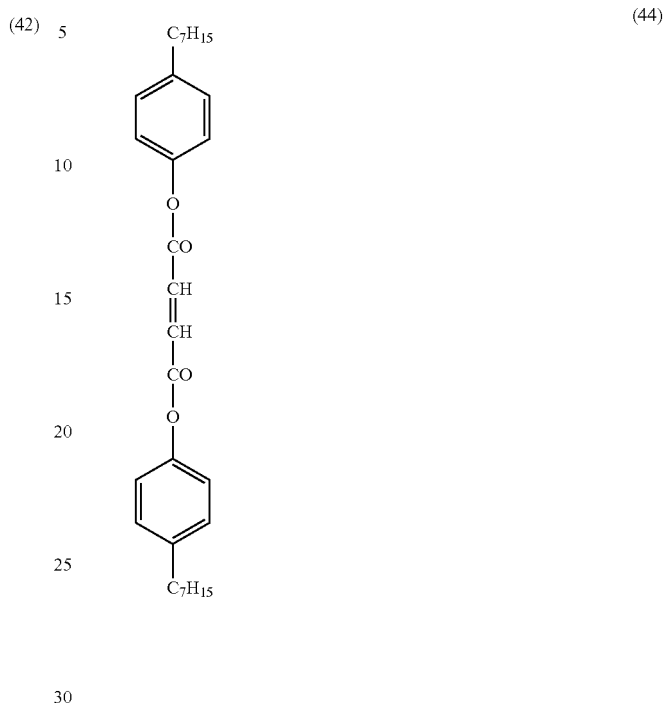
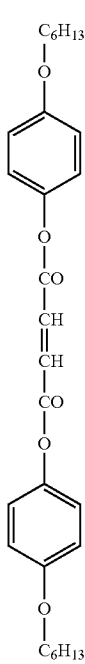
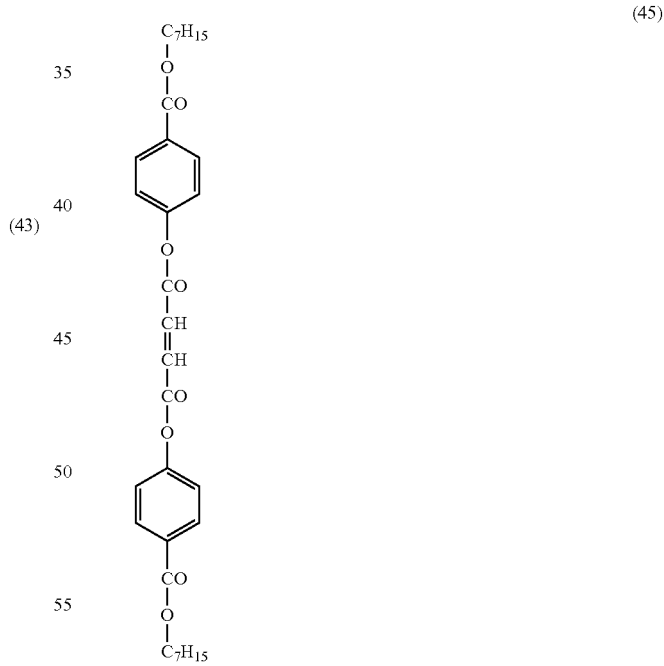
Specific examples (1)-(34), (41) and (42) have 2 asymmetric carbon atoms at 1- and 4-sites of the cyclohexane ring. However, since specific examples (1), (4)-(34), (41) and (42) have a symmetric molecular structure of meso form, there are no optical isomers (optical activity), and only geometric isomers (trans form and cis form) exist. The trans form (1-trans) and cis form (1-cis) of the specific example (1) are shown below.

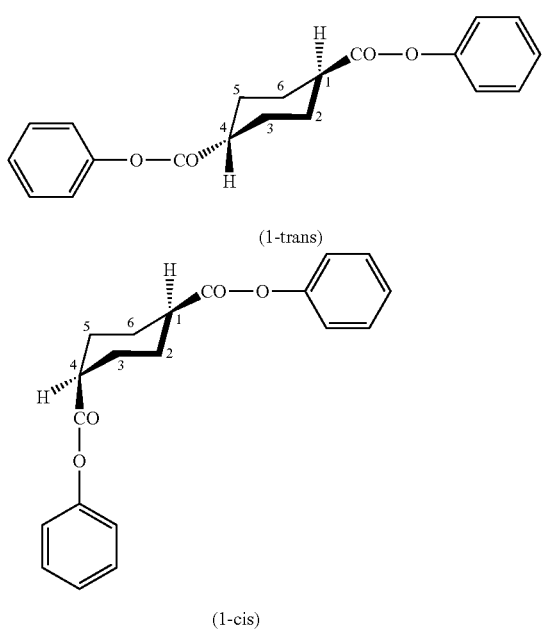

(1-trans)

(1-cis)

As described above, the rod-shaped compound preferably has a linear molecular structure. Therefore, a trans form is preferred to a cis form.

Specific examples (2) and (3) have optical isomers in addition to geometric isomers (4 kinds of isomers in total). As for the geometric isomers, similarly, the trans form is preferred to the cis form. There are no particular relative merits between the optical isomers, and any of D-, L- and racemic forms may be sufficient.

As for specific examples (43)-(45), there are the trans form and cis form due to the vinylene bond at the center. According to the same reason as described above, the trans form is preferred to the cis form.

Compounds represented by formula (3) below are also preferred.

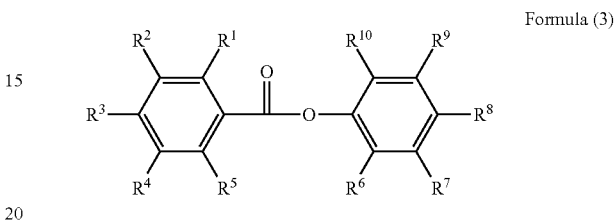

Formula (3)

wherein each of $R^1$, $R^2$, $R^3$, $R^4$, $R^5$, $R^6$, $R^7$, $R^9$ and $R^{10}$ represents a hydrogen atom or a substituent independently from one another, wherein at least one of $R^1$, $R^2$, $R^3$, $R^4$ and $R^5$ represents an electron-donating group. $R^B$ represents a hydrogen atom, an alkyl group having 1-4 carbon atoms, an alkenyl group having 2-6 carbon atoms, an alkynyl group having 2-6 carbon atoms, an aryl group having 6-12 carbon atoms, an alkoxy group having 1-12 carbon atoms, an aryloxy group having 6-12 carbon atoms, an alkoxycarbonyl group having 2-12 carbon atoms, an acylamino group having 2-12 carbon atoms, a cyano group or a halogen atom.

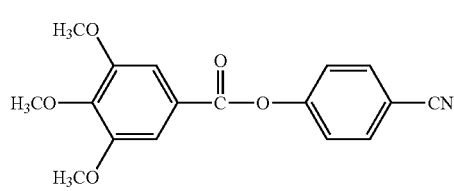

A-1

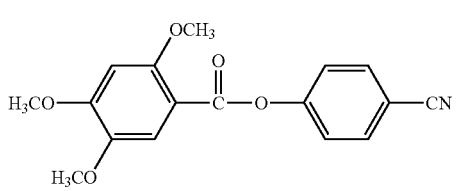

A-2

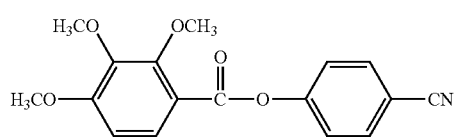

A-3

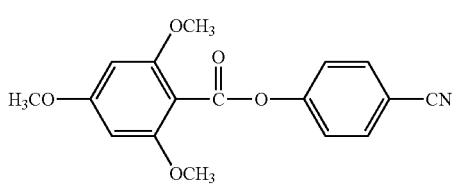

A-4

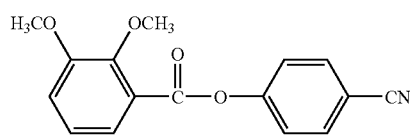

A-5

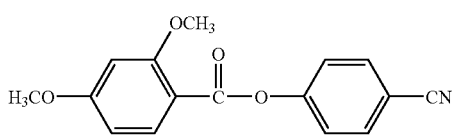

A-6

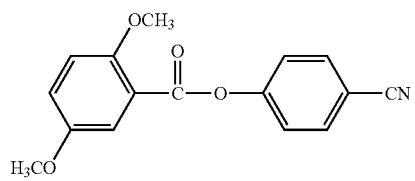

A-7

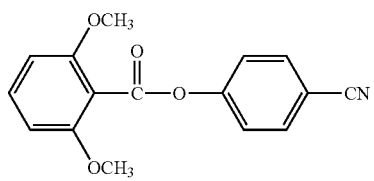

A-8

-continued
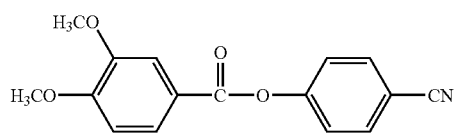
A-9
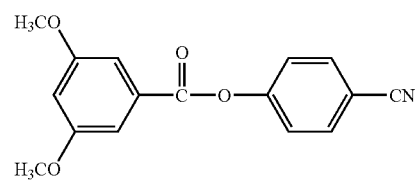
A-10
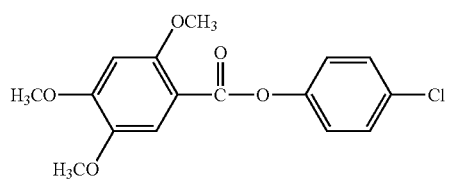
A-11
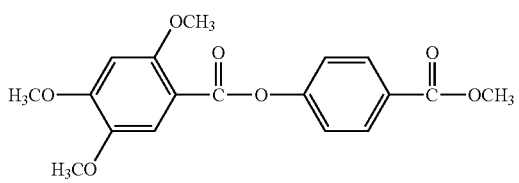
A-12
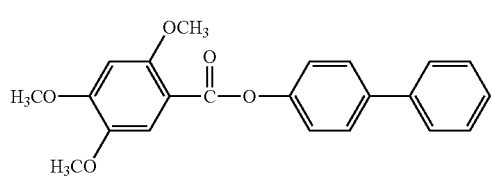
A-13
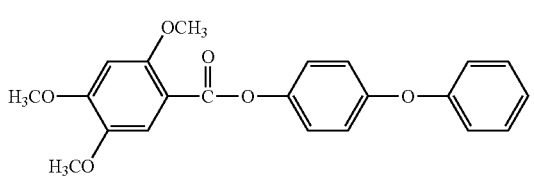
A-14
A-15
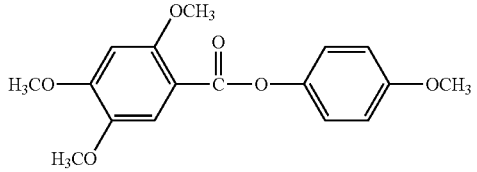
A-16
A-17
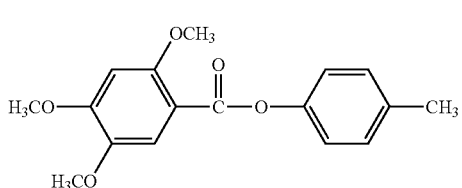
A-18
A-19
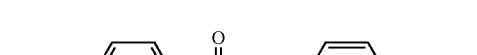
A-20
A-21
A-22
A-23
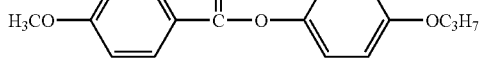
A-24
A-25
A-26
A-27
A-28
A-29
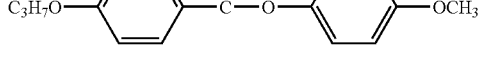
A-30

-continued
A-31
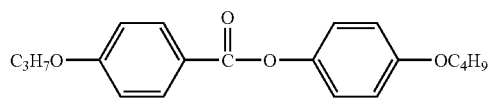
A-32
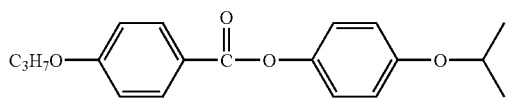
A-33
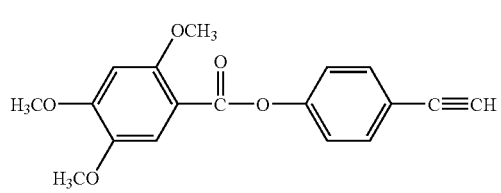
A-34
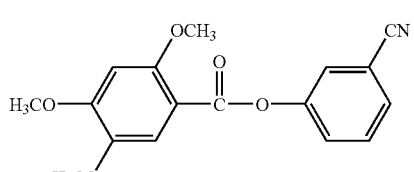
A-35
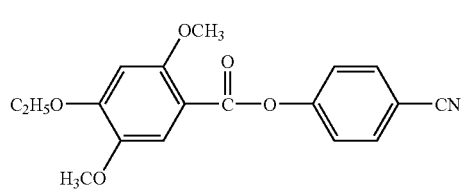
A-36
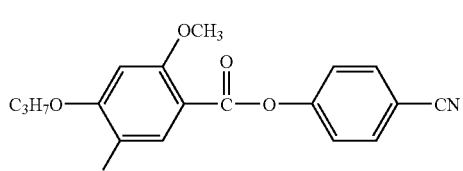
A-37
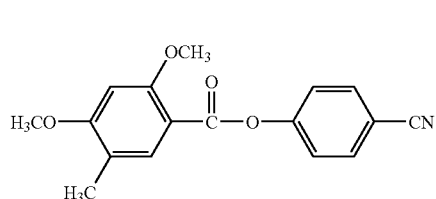
A-38
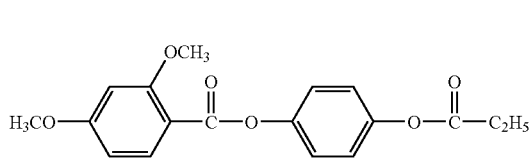
A-39
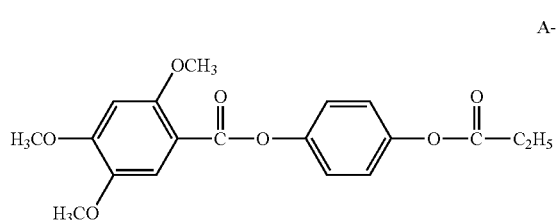
A-40
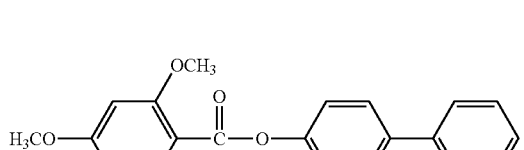
A-41
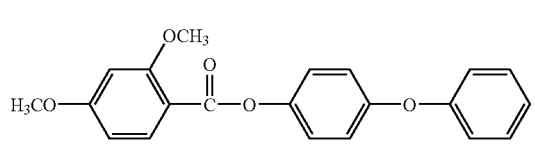
A-42
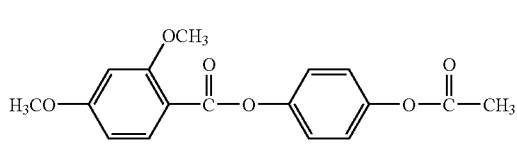
A-43
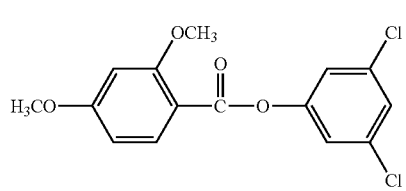
A-45
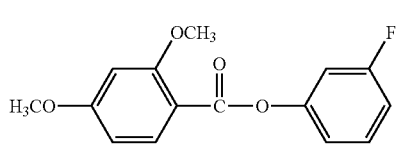
A-46
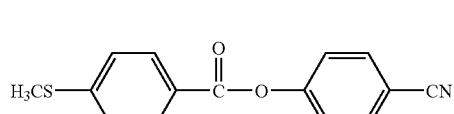
A-47
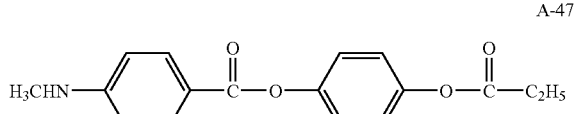
A-48
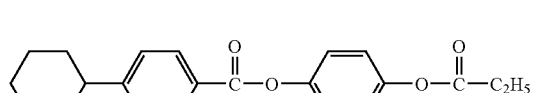
A-49
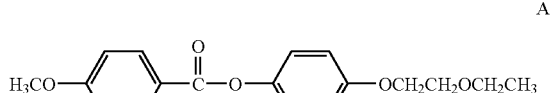
A-50
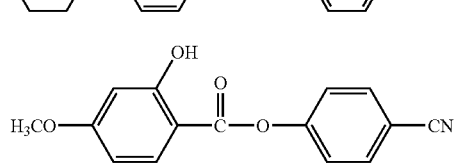
A-51
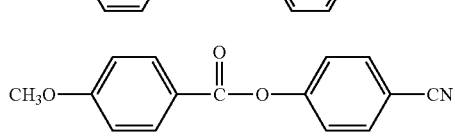

-continued

Two kinds or more of the rod-shaped compounds, which have a maximum absorption wavelength (λmax) of less than 250 nm in an ultraviolet spectrum of the solution, may be used simultaneously.

A rod-shaped compound can be synthesized according to methods described in references. As references, Mol. Cryst. Liq. Cryst., vol. 53, p 229 (1979); do. vol. 89, p 93 (1982); do. vol. 145, p 111 (1987); do. vol. 170, p 43 (1989); Journal of the American Chemical Society, vol. 113, p 1349 (1991); do. vol. 118, p 5346 (1996); do. vol. 92, p 1582 (1970); Journal of Organic Chemistry, vol. 40, p 420 (1975); and Tetrahedron, vol. 48, No. 16, p 3437 (1992) can be mentioned.

A retardation-enhancing agent may be an inorganic compound, and have a negative refraction index. For example, strontium carbonate can be mentioned.

<Rth-lowering Agent>

In order to lower Rth, a compound represented by formulae (13)-(19) below may be added.

Formula (13)

wherein $R^1$ represents an alkyl group or an aryl group, and each of $R^2$ and $R^3$ represent, independently from each other, a hydrogen atom, an alkyl group or an aryl group. The total number of carbon atoms of $R^1$, $R^2$ and $R^3$ is 10 or more, and the respective alkyl and aryl groups may have a substituent.

Description will be given about the compound of the formula (13).

In the formula (13), $R^1$ represents an alkyl group or an aryl group, and each of $R^2$ and $R^3$ represent, independently from each other, a hydrogen atom, an alkyl group or an aryl group. The total number of carbon atoms of $R^1$, $R^2$ and $R^3$ is, particularly preferably, 10 or more. $R^1$, $R^2$ and $R^3$ may be substituted, wherein, as a substituent, a fluorine atom, an alkyl group, an aryl group, an alkoxy group, a sulfone group and a sulfonamido group are preferred, and an alkyl group, an aryl group, an alkoxy group, a sulfone group and a sulfonamido group are particularly preferred. The alkyl group may be of straight chain, branched chain or cycle. Number of carbon atoms thereof is preferably 1-25, more preferably 6-25, particularly preferably 6-20 (for example, a methyl group, an ethyl group, a propyl group, an isopropyl group, a butyl group, an isobutyl group, a t-butyl group, an amyl group, an isoamyl group, a t-amyl group, a hexyl group, a cyclohexyl group, a heptyl group, an octyl group, a bicyclooctyl group, a nonyl group, an adamantyl group, a decyl group, a t-octyl group, an undecyl group, a dodecyl group, a tridecyl group, a tetradecyl group, a pentadecyl group, a hexadecyl group, a heptadecyl group, an octadecyl group, a nonadecyl group and a didecyl group). Number of carbon atoms of the aryl group is preferably 6-30, particularly preferably 6-24 (for example, a phenyl group, a biphenyl group, a terphenyl group, a naphthyl group, a binaphthyl group and a triphenylphenyl group). Preferable examples of the compound represented by the formula (13) are shown below, however the invention is not restricted to these specific examples.

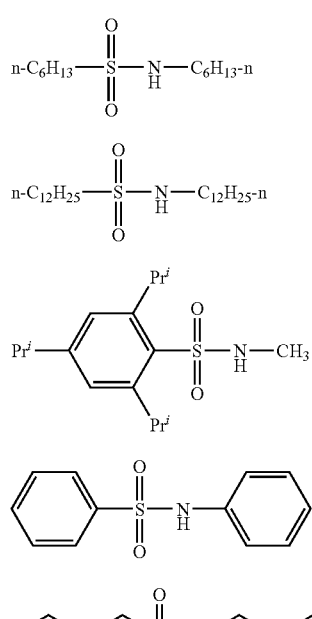

A'-1

A'-2

A'-3

A'-4

A'-5

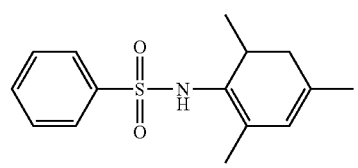

A'-6

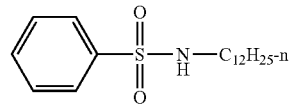

A'-7

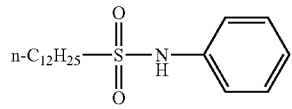

A'-8

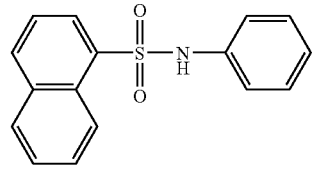

A'-9

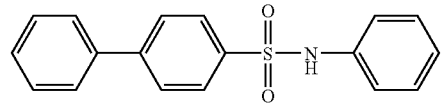

A'-10

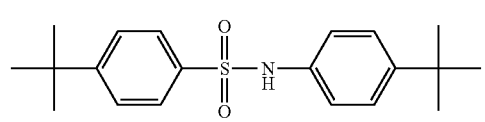

A'-11

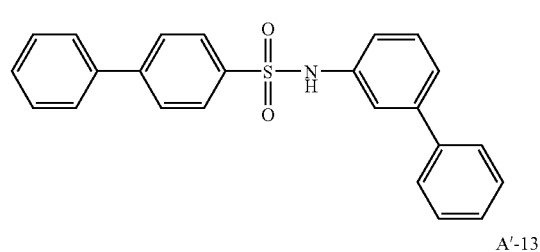

A'-12

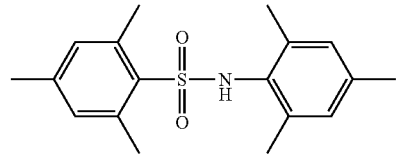

A'-13

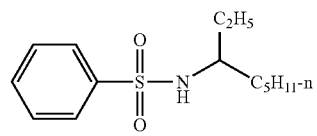

A'-14

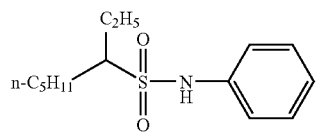

A'-15

-continued
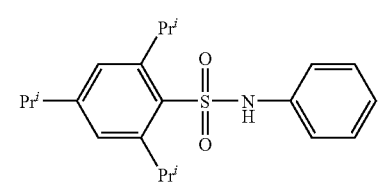 A'-16
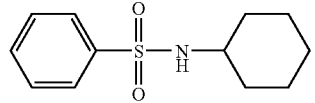 A'-17
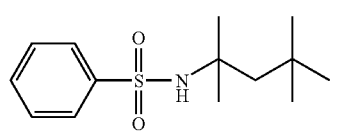 A'-18
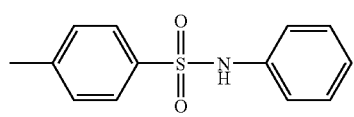 A'-19
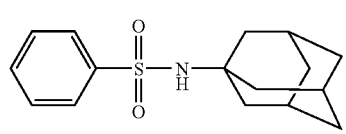 A'-20
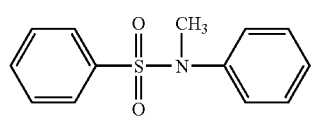 A'-21
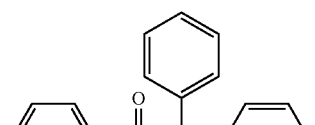 A'-22
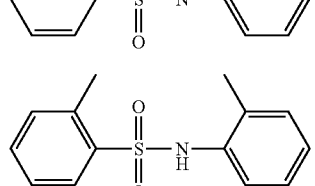 A'-23
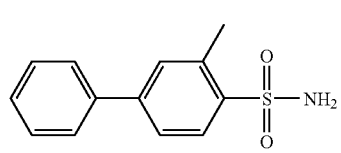 A'-24
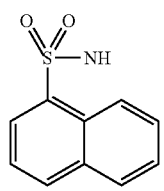 A'-25
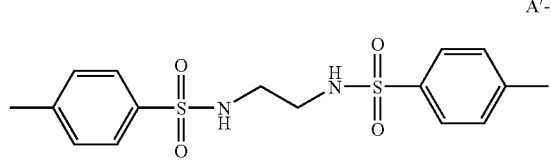 A'-26
-continued
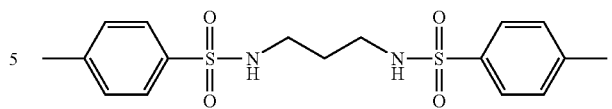 A'-27
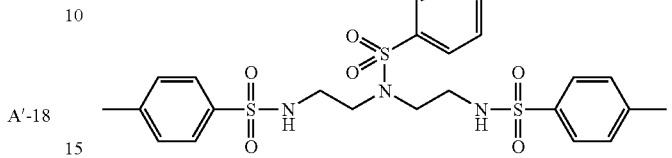 A'-28
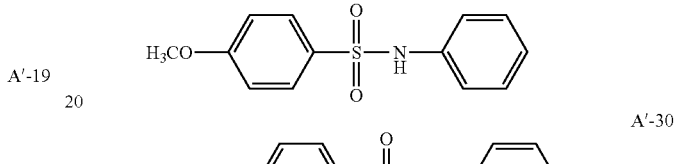 A'-29
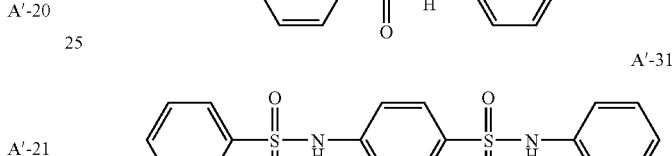 A'-30
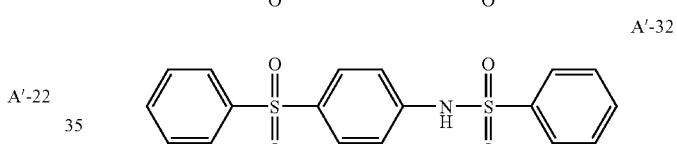 A'-31
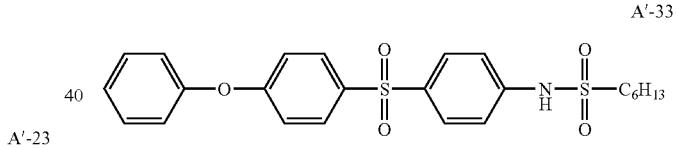 A'-32
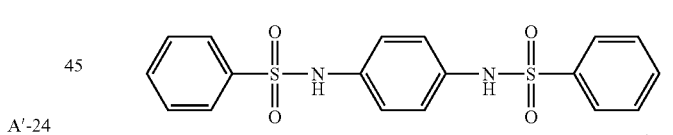 A'-33
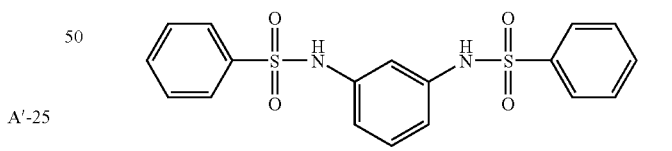 A'-34
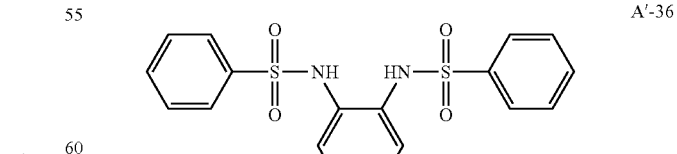 A'-35
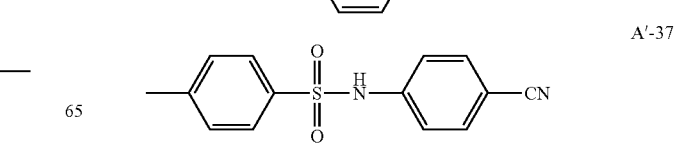 A'-36
 A'-37

-continued

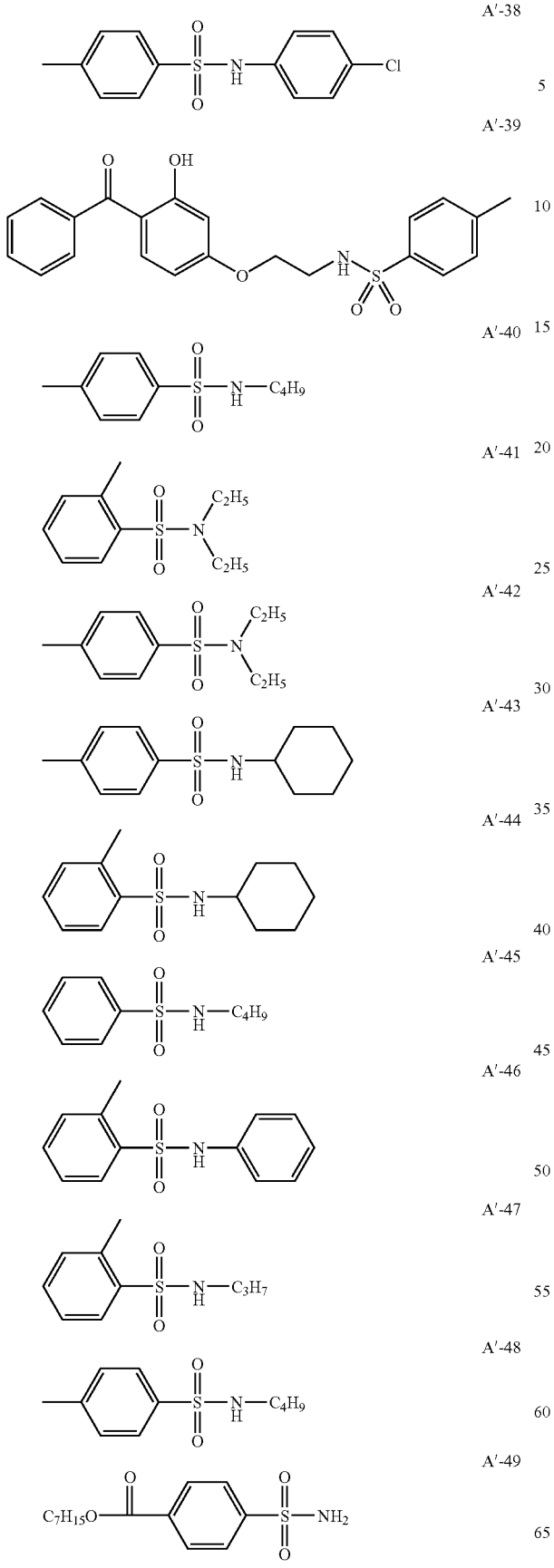

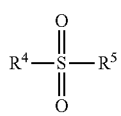

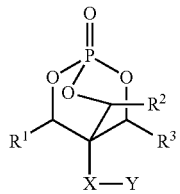

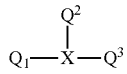

Formula (14)

$$R^4 - \overset{O}{\underset{O}{S}} - R^5$$

wherein each of $R^4$ and $R^5$ represents, independently from each other, an alkyl group or an aryl group. The total number of carbon atoms of $R^4$ and $R^5$ is 10 or more, and the respective alkyl and aryl groups may have a substituent.

Formula (15)

wherein each of $R^1$, $R^2$ and $R^3$ represent, independently from one another, a hydrogen atom or an alkyl group. X represents a single bond or a divalent linking group composed of at least one group selected from —O—, —CO—, —NR$^4$—, an alkylene group and an arylene group ($R^4$ represents a hydrogen atom, an alkyl group, an aryl group or an aralkyl group). Y represents a hydrogen atom, an alkyl group, an aryl group or an aralkyl group.

Formula (16)

$$Q_1 - X - Q^3$$
$$\overset{Q^2}{|}$$

wherein each of $Q^1$, $Q^2$ and $Q^3$ represents, independently from one another, 5- or 6-membered ring. X represents B, C—R (R represents a hydrogen atom or a substituent), N, P or P=O.

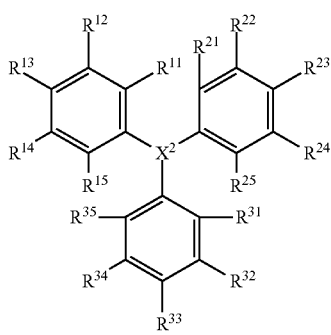

Formula (17)

wherein $X^2$ represents B, C—R(R represents a hydrogen atom or a substituent) or N. Each of $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ represents, independently from one another, a hydrogen atom or a substituent.

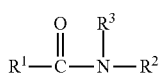

Formula (18)

wherein $R^1$ represents an alkyl group or an aryl group, and each of $R^2$ and $R^3$ represents, independently from each other, a hydrogen atom, an alkyl group or an aryl group. The alkyl group and aryl group may have a substituent.

In the formula (18), preferable compounds are those represented by formula (19) below.

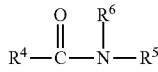

Formula (19)

wherein each of $R^4$, $R^5$ and $R^6$ represents, independently from one another, an alkyl group or an aryl group. The alkyl group may be of straight chain, branched chain, or cycle. Number of carbon atoms thereof is preferably 1-20, more preferably 1-15, most preferably 1-12. As a cyclic alkyl group, a cyclohexyl group is particularly preferred. An aryl group having 6-36 carbon atoms is preferred, and having 6-24 carbon atoms is more preferred.

The aforementioned alkyl group and aryl group may have a substituent. Examples of the substituent include, preferably, a halogen atom (for example, chlorine, bromine, fluorine and iodine), an alkyl group, an aryl group, an alkoxy group, an aryloxy group, an acyl group, an alkoxycarbonyl group, an aryloxycarbonyl group, an acyloxy group, a sulfonylamino group, a hydroxyl group, a cyano group, an amino group and an acylamino group, more preferably a halogen atom, an alkyl group, an aryl group, an alkoxy group, an aryloxy group, a sulfonylamino group and an acylamino group, particularly preferably an alkyl group, an aryl group, a sulfonylamino group and an acylamino group. Preferable examples of the compound represented by the formulae (18) and (19) are shown below, however compounds usable in the invention are not restricted to these specific examples.

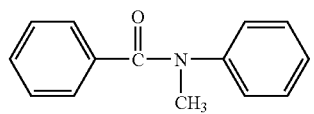

(201)

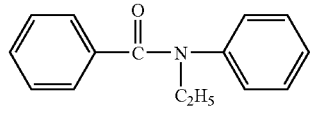

(202)

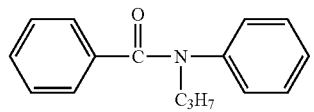

(203)

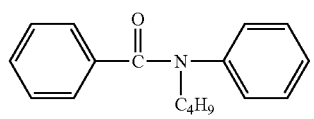

(204)

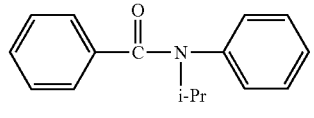

(205)

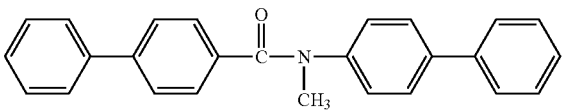

(206)

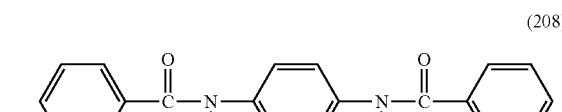

(207)

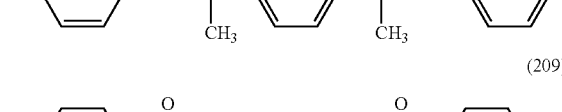

(208)

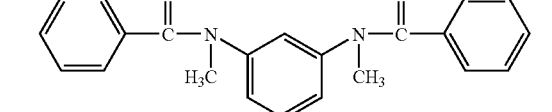

(209)

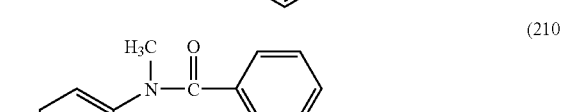

(210)

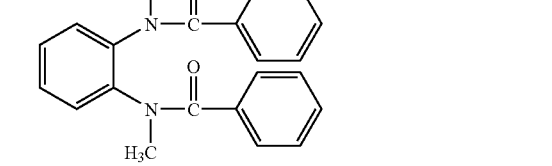

(211)

(212) 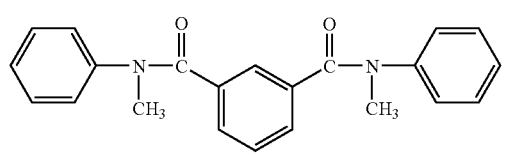
(213) 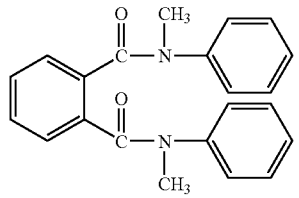
(214) 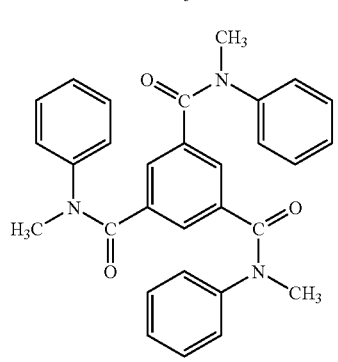
(215) 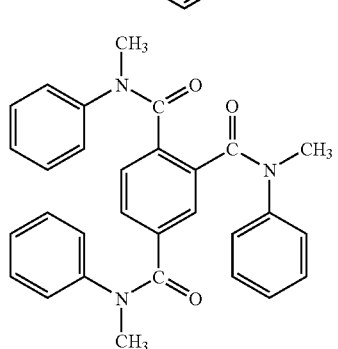
(216) 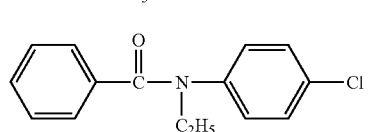
(217) 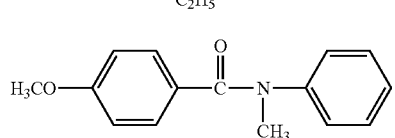
(218) 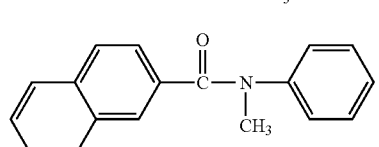
(219) 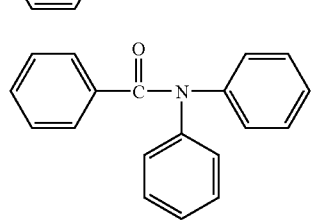
(220) 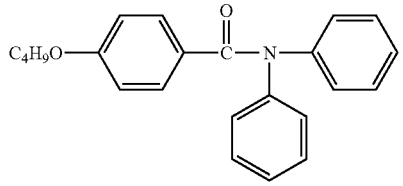
(221) 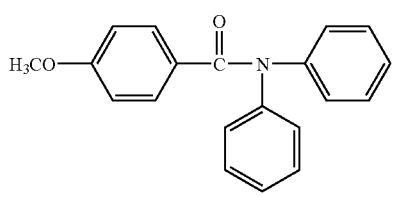
(222) 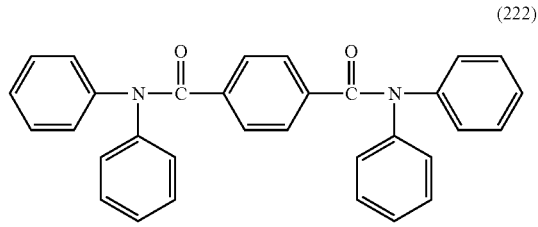
(223) 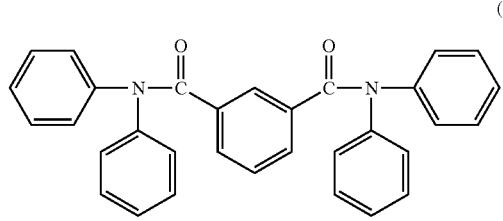
(224) 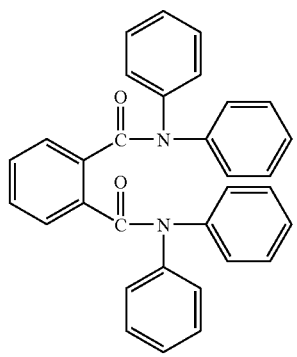
(225) 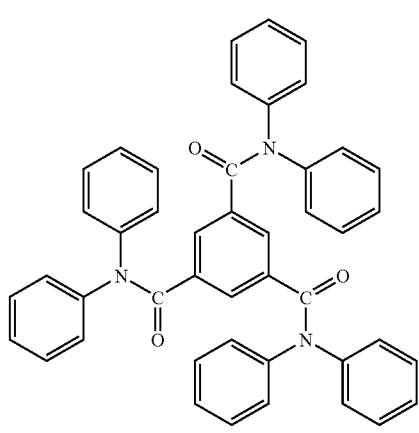

(226)
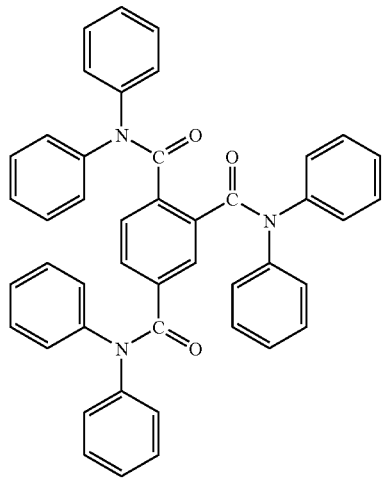
(227)
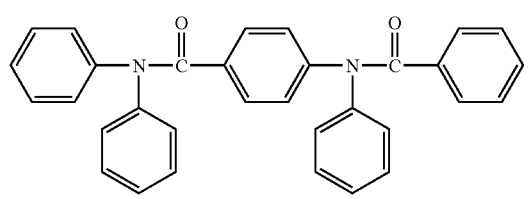
(228)
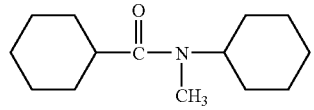
(229)
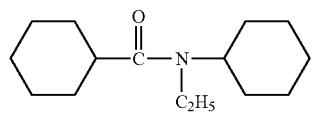
(230)
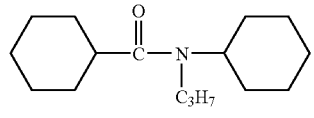
(231)
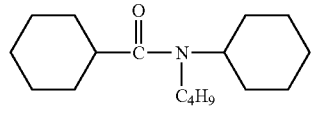
(232)
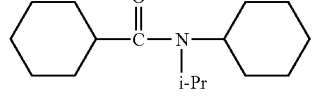
(233)
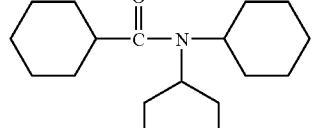
(234)
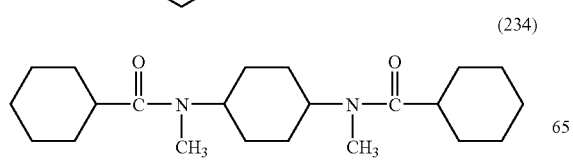
(235)
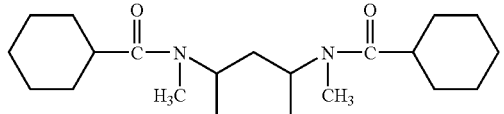
(236)
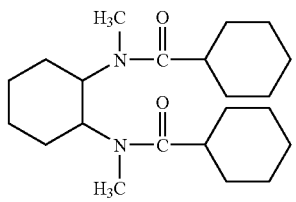
(237)
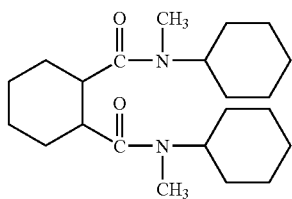
(238)
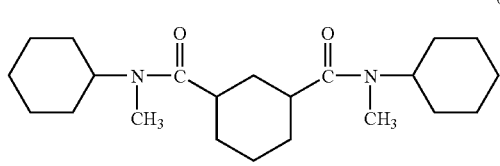
(239)
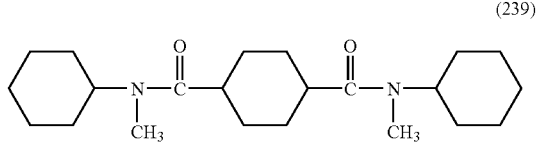
(240)
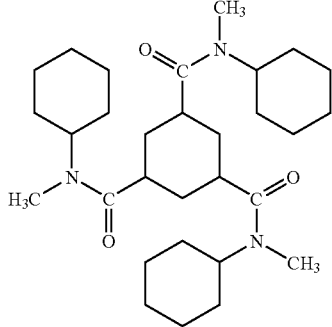
(241)
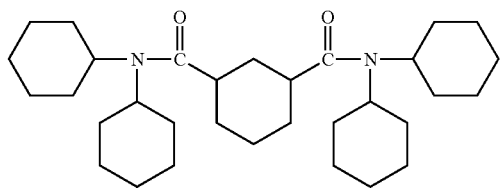

(242) 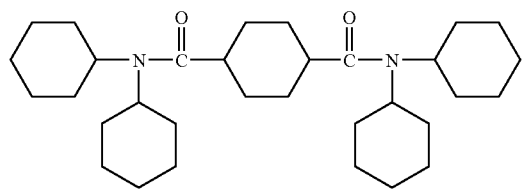
(243) 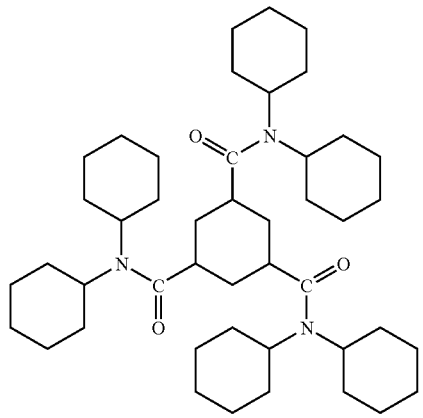
(244) 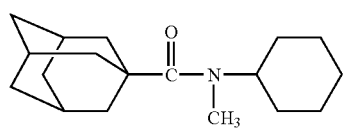
(245) 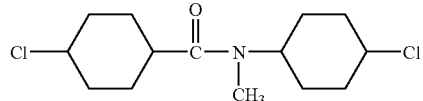
(246) 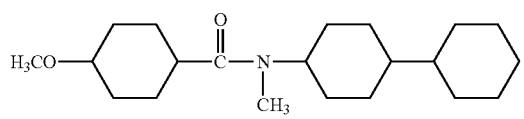
(247) 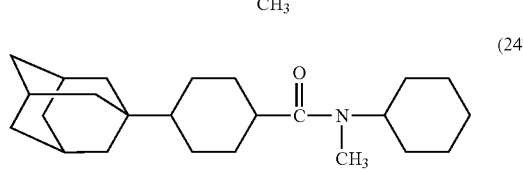
(248) 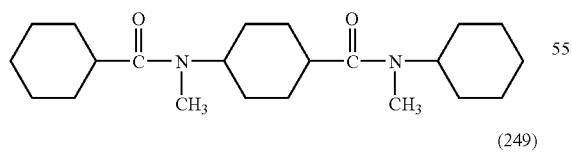
(249) 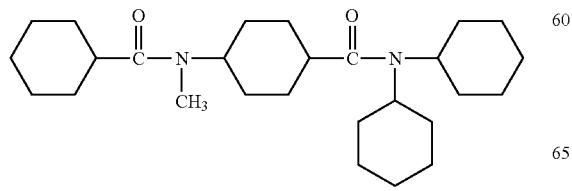
(250) 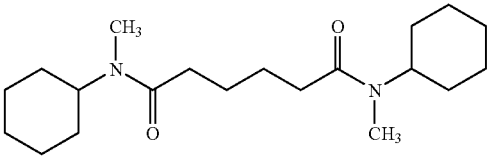
(251) 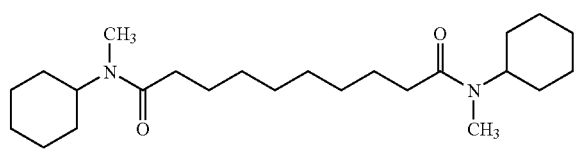
(252) 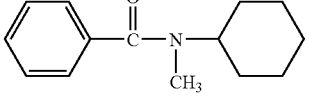
(253) 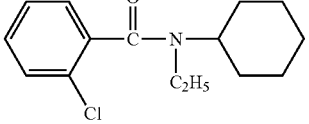
(254) 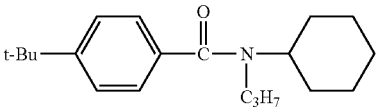
(255) 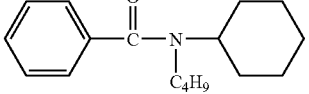
(256) 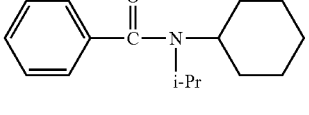
(257) 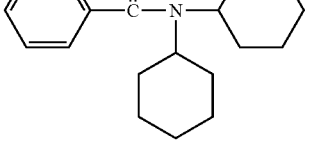
(258) 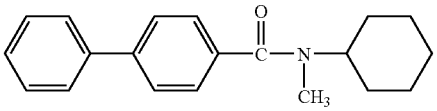
(259) 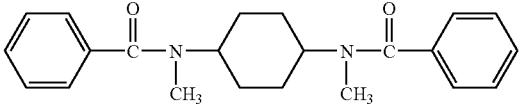
(260) 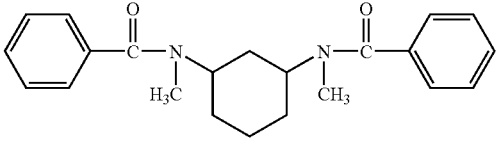

(261)–(278) Chemical structures (continued).

(279) 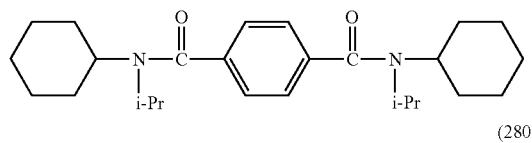
(280) 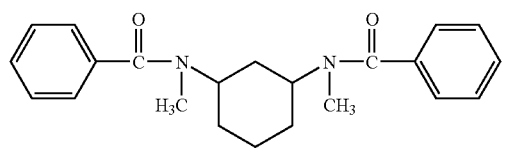
(281) 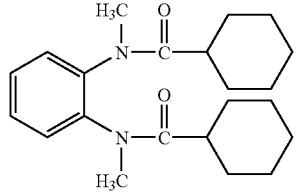
(282) 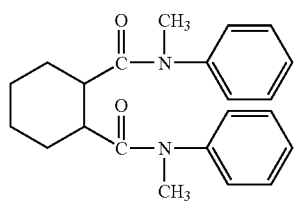
(283) 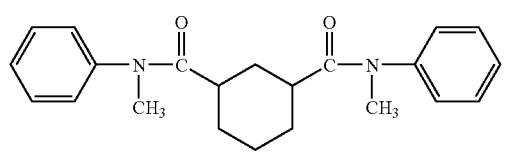
(284) 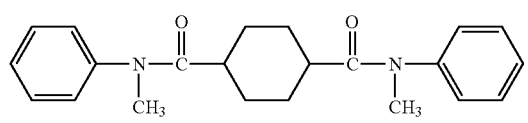
(285) 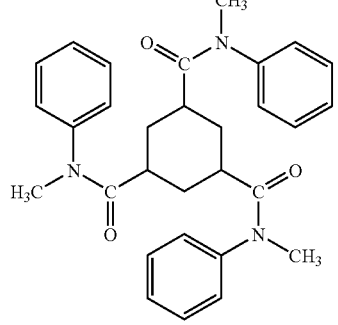
(286) 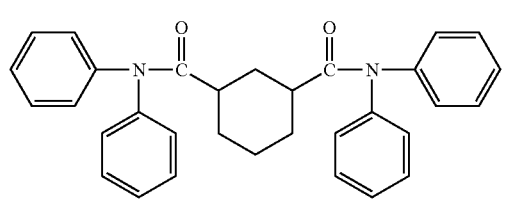
(287) 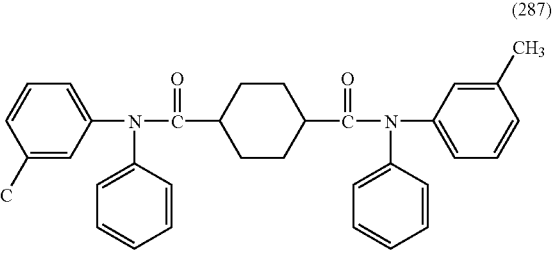
(288) 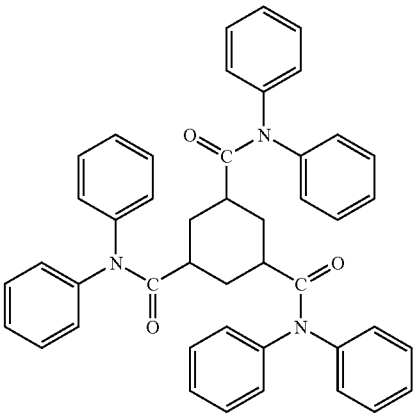
(289) 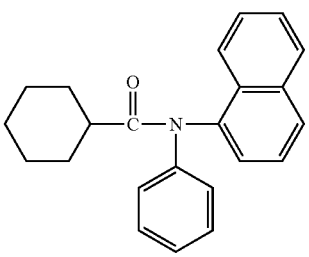
(290) 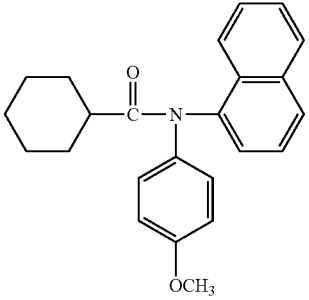
(291) 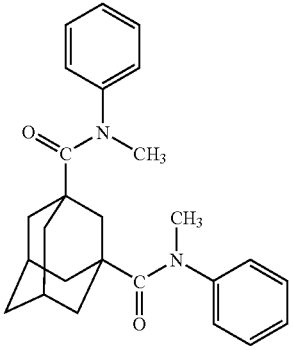

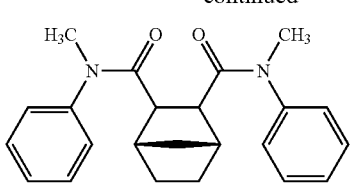

(292)

Wavelength Dispersion-adjusting Agent

Description will be given about a compound that lowers wavelength dispersion of a cellulose acylate film. As the result of intensive studies, the inventors of the invention found that the wavelength dispersion of Re and Rth of a cellulose acylate film can be adjusted by incorporating at least one kind of compounds that have absorption in an ultraviolet region of 200-400 nm and lower $|Re_{(400)}-Re_{(700)}|$ and $|Rth_{(400)}-Rth_{(700)}|$ of the film, in a amount of 0.01-30% by mass of cellulose acylate solid content.

Values of Re and Rth of a cellulose acylate film have such properties that the wavelength dispersion becomes greater on the longer wavelength side than on the shorter wavelength side. Accordingly, it is required to greaten relatively smaller Re and Rth on the shorter wavelength side to smoothen the wavelength dispersion. On the other hand, a compound having absorption in an ultraviolet region of 200-400 nm has such wavelength dispersion property that the absorbance is greater on the shorter wavelength side than the longer wavelength side. It is conceived that, when the compound itself exists isotropically within a cellulose acylate film, birefringence property of the compound itself, consequently, wavelength dispersion of Re and Rth will be greater on the shorter wavelength side as is the case with wavelength dispersion of absorbance.

Accordingly, by using such compound as aforementioned one that is supposed to have absorption in an ultraviolet region of 200-400 nm and a greater wavelength dispersion of Re and Rth of the compound itself on the shorter wavelength side, the wavelength dispersion of Re and Rth of a cellulose acylate film can be adjusted. In order to achieve this purpose, a compound used for adjusting the wavelength dispersion is required to have sufficiently uniform compatibility with cellulose acylate. Absorption range in ultraviolet region of such compound is preferably 200-400 nm, more preferably 220-395 nm, further preferably 240-390 nm.

In addition, recently, for a liquid crystal display for use in televisions, notebook computers or mobile type terminals, optical elements used for the liquid crystal display are required to have a high transmittance in order to enhance brightness with less electric power. From this viewpoint, when adding a compound having absorption in ultraviolet region of 200-400 nm and lowering $|Re_{(400)}-Re_{(700)}|$ and $|Rth_{(400)}-Rth_{(700)}|$ of cellulose acylate film to the film, it is required to have an excellent spectral transmittance. In the cellulose acylate film of the invention, it is desirable to have a spectral transmittance of 45%-95% at the wavelength of 380 nm and a spectral transmittance of 10% or less at the wavelength of 350 nm.

The wavelength dispersion-adjusting agent as described above that is preferably used in the invention preferably has a molecular weight of 250-1000 from the viewpoint of volatilization property. More preferably it is 260-800, further preferably 270-800, and particularly preferably 300-800. When the molecular weight of the agent falls in these ranges, it may have a specific monomer structure, or an oligomer structure or polymer structure formed by plural bonds of the monomer units.

The wavelength dispersion-adjusting agent preferably does not volatile during the steps of dope casting and drying in manufacturing the cellulose acylate film.

(Addition Amount of the Compound)

Addition amount of the wavelength dispersion-adjusting agent described above that is preferably used in the invention is preferably 0.01-30% by mass, more preferably 0.1-20% by mass, particularly preferably 0.2-10% by mass relative to the cellulose acylate.

(Method for Adding the Compound)

The wavelength dispersion-adjusting agent may be used alone or in combination of 2 kinds or more of compounds at an arbitrary ratio.

As for the addition timing of these wavelength dispersion-adjusting agents, any time point during manufacturing the dope, or in the final step of preparing the dope, will give satisfactory result.

Specific examples of the wavelength dispersion-adjusting agent preferably used in the invention include benzotriazole-based compounds, benzophenone-based compounds, cyano group-including compounds, oxybenzophenone-based compounds, salicylic acid ester-based compounds and nickel complex-based compounds, but compounds that can be used in the invention are not restricted to these.

As the benzotriazole-based compound, those represented by formula (101) are preferably used as the wavelength dispersion-adjusting agent of the invention.

$Q^1$-$Q^2$-OH:                  Formula (101)

wherein $Q^1$ represents a nitrogen-containing aromatic heteroring and $Q^2$ represents an aromatic ring.

$Q^1$ represents a nitrogen-containing aromatic heteroring, and is preferably a 5- to 7-membered nitrogen-containing aromatic heterorings, more preferably a 5- to 6-membered nitrogen-containing aromatic heterorings. Examples thereof include imidazole, pyrazole, tirazole, tetrazole, thiazole, oxazole, selenazole, benzotriazole, benzothiazole, benzoxazole, benzoselenazole, thiadiazole, oxadiazole, naphthothiazole, naphthoxazole, azabenzimidazole, purine, pyridine, pyrazine, pyrimidine, pyridazine, triazine, triazaindene and tetrazaindene. More preferably it is a 5-membered nitrogen-containing aromatic heteroring, specific preferable examples including imidazole, pyrazole, tirazole, tetrazole, thiazole, oxazole, benzotriazole, benzothiazole, benzoxazole, thiadiazole and oxadiazole. Particularly preferably it is benzotriazole.

A nitrogen-containing aromatic heteroring represented by $Q^1$ may further have a substituent, including, for example, a substituent T described later. When plural substituents exist, they may condense each other to form an additional condensed ring or rings.

The aromatic ring represented by $Q^2$ may be an aromatic hydrocarbon ring or an aromatic heteroring. Further, these may be a single ring or form a condensed ring with other ring.

The aromatic hydrocarbon ring is preferably a monocyclic or bicyclic aromatic hydrocarbon ring having 6-30 carbon atoms (such as a benzene ring and a naphthalene ring), more preferably an aromatic hydrocarbon ring having 6-20 carbon atoms, further preferably an aromatic hydrocarbon ring having 6-12 carbon atoms, furthermore preferably a benzene ring.

Preferable examples of the aromatic heteroring are aromatic heterorings containing a nitrogen atom or a sulfur atom. Specific examples of the heteroring include a thiophene, ring, an imidazole ring, a pyrazole ring, a pyridine ring, a pyrazine ring, a pyridazine ring, a triazole ring, a triazine ring, an indole ring, an indazole ring, a purine ring, a thiazoline ring, a thiazole ring, a thiadiazole ring, an oxazoline ring, an oxazole ring, an oxadiazole ring, a quinoline ring, an isoquinoline ring, a phthalazine ring, a naphthylidine ring, a quinoxaline ring, a quinazoline ring, a cinnoline ring, a pteridine ring, a acridine ring, a phenanthroline ring, a phenazine ring, a tetrazole ring, a benzimidazole ring, a benzoxazole ring, a benzothiazole ring, a benzotriazole ring and a tetrazaindene ring. Preferable examples of the aromatic heteroring include a pyridine ring, a triazine ring and a quinoline ring.

The aromatic ring represented by $Q^2$ is preferably an aromatic hydrocarbon ring, more preferably a naphthalene ring or a benzene ring, particularly preferably a benzene ring. $Q^2$ may further have a substituent, wherein a substituent T described below is preferred.

Examples of the substituent T include an alkyl group (including, preferably, 1-20 carbon atoms, more preferably 1-12 carbon atoms, particularly preferably 1-8 carbon atoms, such as a methyl group, an ethyl group, an isopropyl group, a tert-butyl group, a n-octyl group, a n-decyl group, a n-hexadecyl group, a cyclopropyl group, a cyclopentyl group and a cyclohexyl group), an alkenyl group (including, preferably, 2-20 carbon atoms, more preferably 2-12 carbon atoms, particularly preferably 2-8 carbon atoms, such as a vinyl group, an aryl group, a 2-butenyl group and a 3-pentenyl group), an alkynyl group (including, preferably, 2-20 carbon atoms, more preferably 2-12 carbon atoms, particularly preferably 2-8 carbon atoms, such as a propagyl group and a 3-pentynyl group), an aryl group (including, preferably, 6-30 carbon atoms, more preferably 6-20 carbon atoms, particularly preferably 6-12 carbon atoms, such as a phenyl group, a p-methylphenyl group and a naphthyl group), a substituted or unsubstituted amino group (including, preferably, 0-20 carbon atoms, more preferably 0-10 carbon atoms, particularly preferably 0-6 carbon atoms, such as an amino group, a methylamino group, a dimethylamino group, a diethylamino group and a dibenzylamino group), an alkoxy group (including, preferably, 1-20 carbon atoms, more preferably 1-12 carbon atoms, particularly preferably 1-8 carbon atoms, such as a methoxy group, an ethoxy group and a butoxy group), an aryloxy group (including, preferably, 6-20 carbon atoms, more preferably 6-16 carbon atoms, particularly preferably 6-12 carbon atoms, such as a phenyloxy group and a 2-naphthyloxy group), an acyl group (including, preferably, 1-20 carbon atoms, more preferably 1-16 carbon atoms, particularly preferably 1-12 carbon atoms, such as an acetyl group, a benzoyl group, a formyl group and a pivaloyl group), an alkoxycarbonyl group (including, preferably, 2-20 carbon atoms, more preferably 2-16 carbon atoms, particularly preferably 2-12 carbon atoms, such as a methoxycarbonyl group and an ethoxycarbonyl group), an aryloxycarbonyl group (including, preferably, 7-20 carbon atoms, more preferably 7-16 carbon atoms, and particularly preferably 7-10 carbon atoms, such as a phenyloxycarbonyl group), an acyloxy group (including, preferably, 2-20 carbon atoms, more preferably 2-16 carbon atoms, particularly preferably 2-10 carbon atoms, such as an acetoxy group and a benzoyloxy group), an acylamino group (including, preferably, 2-20 carbon atoms, more preferably 2-16 carbon atoms, particularly preferably 2-10 carbon atoms, such as an acetylamino group and a benzoylamino group), an alkoxycarbonylamino group (including, preferably, 2-20 carbon atoms, more preferably 2-16 carbon atoms, particularly preferably 2-12 carbon atoms, such as a methoxycarbonylamino group), an aryloxycarbonylamino group (including, preferably, 7-20 carbon atoms, more preferably 7-16 carbon atoms, particularly preferably 7-12 carbon atoms, such as a phenyloxycarbonylamino group), a sulfonylamino group (including, preferably, 1-20 carbon atoms, more preferably 1-16 carbon atoms, particularly preferably 1-12 carbon atoms, such as a methanesulfonylamino group and a benzenesulfonylamino group), a sulfamoyl group (including, preferably, 0-20 carbon atoms, more preferably 0-16 carbon atoms, particularly preferably 0-12 carbon atoms, such as a sulfamoyl group, a methylsulfamoyl group, a dimethylsulfamoyl group and a phenylsulfamoyl group), a carbamoyl group (including, preferably, 1-20 carbon atoms, more preferably 1-16 carbon atoms, particularly preferably 1-12 carbon atoms, such as a carbamoyl group, a methylcarbamoyl group, a diethylcarbamoyl group and a phenylcarbamoyl group), an alkylthio group (including, preferably, 1-20 carbon atoms, more preferably 1-16 carbon atoms, particularly preferably 1-12 carbon atoms, such as a methylthio group and an ethylthio group), an arylthio group (including, preferably, 6-20 carbon atoms, more preferably 6-16 carbon atoms, particularly preferably 6-12 carbon atoms, such as a phenylthio group), a sulfonyl group (including, preferably, 1-20 carbon atoms, more preferably 1-16 carbon atoms, particularly preferably 1-12 carbon atoms, such as a mesyl group and a tosyl group), a sulfinyl group (including, preferably, 1-20 carbon atoms, more preferably 1-16 carbon atoms, particularly preferably 1-12 carbon atoms, such as a methanesulfinyl group and a benzenesulfinyl group), an ureide group (including, preferably, 1-20 carbon atoms, more preferably 1-16 carbon atoms, and particularly preferably 1-12 carbon atoms, such as an ureide group, a methylureide group and a phenylureide group), a phosphoric amide group (including, preferably, 1-20 carbon atoms, more preferably 1-16 carbon atoms, particularly preferably 1-12 carbon atoms, such as a diethylphosphoric amide group and a phenylphosphoric amide group), a hydroxyl group, a mercapto group, a halogen atom (such as a fluorine atom, a chlorine atom, a bromine atom and an iodine atom), a cyano group, a sulfo group, a carboxyl group, a nitro group, a hydroxamic acid group, a sulfino group, a hydrazino group, an imino group, a heteroring group (including, preferably, 1-30 carbon atoms, more preferably 1-12 carbon atoms, wherein examples of the hetero atom include a nitrogen atom, an oxygen atom and a sulfur atom, and specific examples include an imidazolyl group, a pyridyl group, a quinolyl group, a furyl group, a piperidyl group, a morphorino group, a benzoxysazolyl group, a benzimidazolyl group and a benzothiazolyl group), and a silyl group (including, preferably, 3-40 carbon atoms, more preferably 3-30 carbon atoms, particularly preferably 3-24 carbon atoms, such as a trimethylsilyl group and a triphenylsilyl group). These substituents may further have a substituent. When there are two substituents or more, they may be same with or different from each other. Further, when possible, they may be linked with each other to form a ring.

In the formula (101), preferable compounds are those represented by formula (101-A) below.

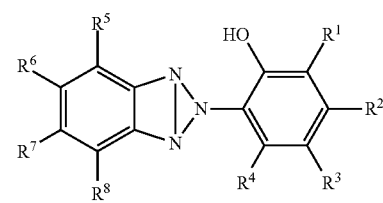

Formula (101-A)

wherein each of $R^1$, $R^2$, $R^3$, $R^4$, $R^5$, $R^6$, $R^7$ and $R^8$ represents, independently from one another, a hydrogen atom or a substituent.

Each of $R^1$, $R^2$, $R^3$, $R^4$, $R^5$, $R^6$, $R^7$ and $R^8$ represents, independently from one another, a hydrogen atom or a substituent, wherein the aforementioned substituent T can be applied. Further, these substituents may have a further alternative substituent, or these substituents may be ring-condensed each other to form a ring structure or structures.

Examples of $R^1$ and $R^3$ include, preferably, a hydrogen atom, an alkyl group, an alkenyl group, an alkynyl group, an aryl group, a substituted or unsubstituted amino group, an alkoxy group, an aryloxy group, a hydroxyl group and a halogen atom, more preferably a hydrogen atom, an alkyl group, an aryl group, an alkyloxy group, an aryloxy group and a halogen atom, further preferably a hydrogen atom and an alkyl group having 1-12 carbon atoms, particularly preferably an alkyl group having 1-12 (preferably 4-12) carbon atoms.

Examples of $R^2$ and $R^4$ include, preferably, a hydrogen atom, an alkyl group, an alkenyl group, an alkynyl group, an aryl group, a substituted or unsubstituted amino group, an alkoxy group, an aryloxy group, a hydroxyl group and a halogen atom, more preferably a hydrogen atom, an alkyl group, an aryl group, an alkyloxy group, an aryloxy group and a halogen atom, further preferably a hydrogen atom and an alkyl group having 1-12 carbon atoms, particularly preferably a hydrogen atom and a methyl group, most preferably a hydrogen atom.

Examples of $R^5$ and $R^8$ include, preferably, a hydrogen atom, an alkyl group, an alkenyl group, an alkynyl group, an aryl group, a substituted or unsubstituted amino group, an alkoxy group, an aryloxy group, a hydroxyl group and a halogen atom, more preferably a hydrogen atom, an alkyl group, an aryl group, an alkyloxy group, an aryloxy group and a halogen atom, further preferably a hydrogen atom and an alkyl group having 1-12 carbon atoms, particularly preferably a hydrogen atom and a methyl group, most preferably a hydrogen atom.

Examples of $R^6$ and $R^7$ include, preferably, a hydrogen atom, an alkyl group, an alkenyl group, an alkynyl group, an aryl group, a substituted or unsubstituted amino group, an alkoxy group, an aryloxy group, a hydroxyl group and a halogen atom, more preferably a hydrogen atom, an alkyl group, an aryl group, an alkyloxy group, an aryloxy group and a halogen atom, further preferably a hydrogen atom and a halogen atom, most preferably a hydrogen atom and a chlorine atom.

In the formula (101), more preferable compounds are those represented by formula (101-B) below.

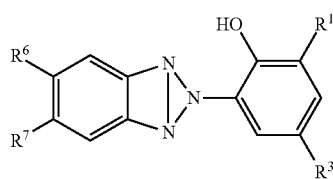

Formula (101-B)

wherein each of $R^1$, $R^3$, $R^6$ and $R^7$ has, independently from one another, the same meaning and also the same preferable range as those in the formula (101-A).

Examples of the compound represented by the formula (101) are shown below, but compounds usable in the invention are not restricted to specific examples below.

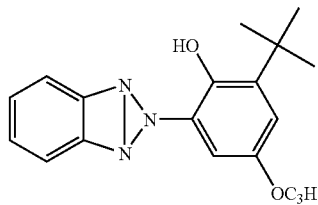

UV-1

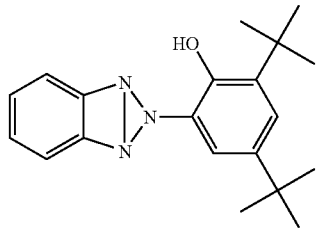

UV-2

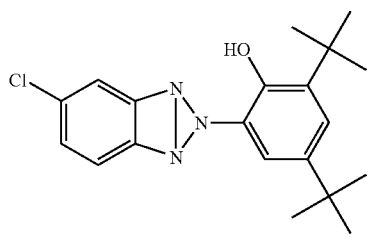

UV-3

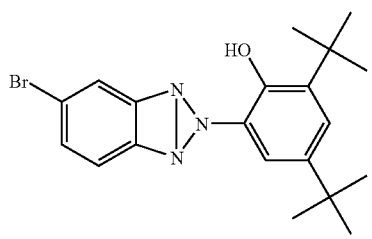

UV-4

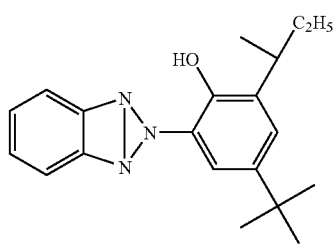

UV-5

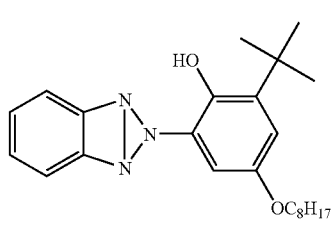

UV-6

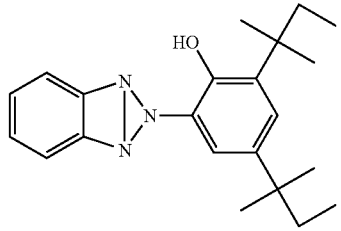

UV-7

UV-8
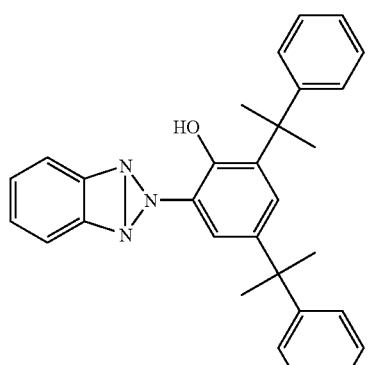
UV-9
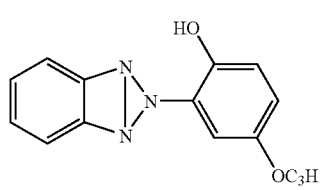
UV-10
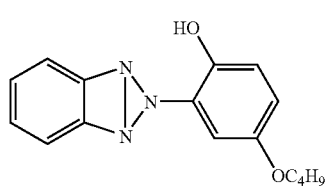
UV-11
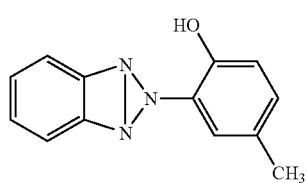
UV-12
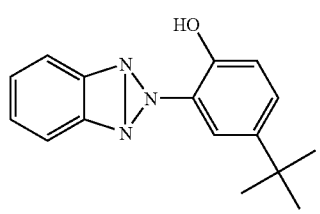
UV-13
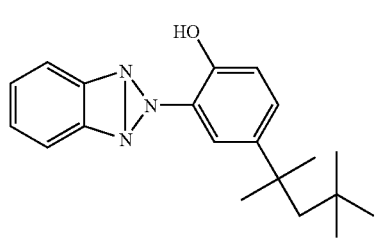
UV-14
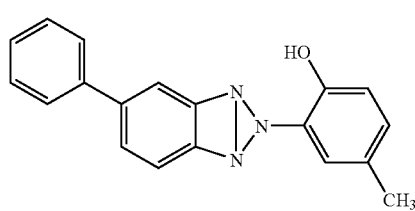
UV-15
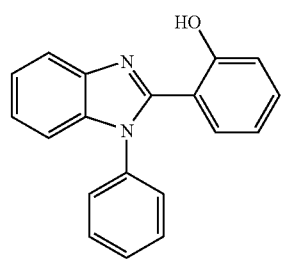
UV-16
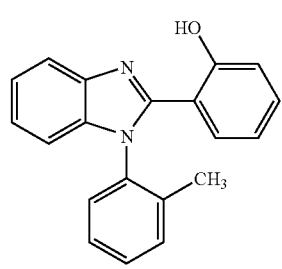
UV-17
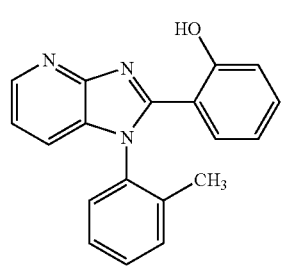
UV-18
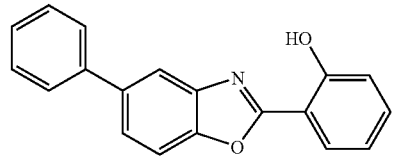
UV-19
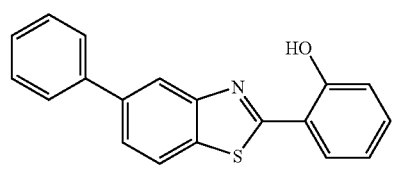
UV-20
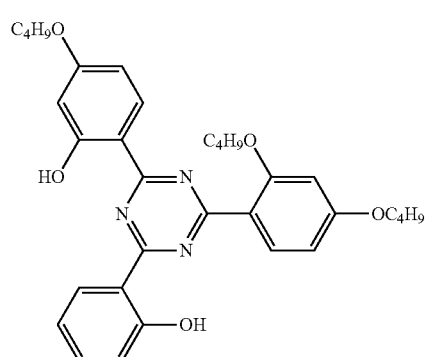

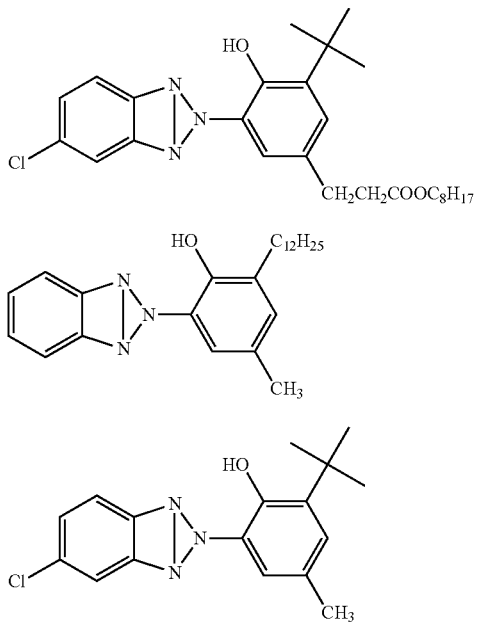

It was checked that manufacture of the cellulose acylate film of the invention without incorporating a benzotriazole-based compound having molecular weight of 320 or less among those exemplified above is advantageous in permanence property.

Further, as a benzophenone-based compound, which is one of the wavelength dispersion-adjusting agent for use in the invention, one represented by formula (102) is preferably used.

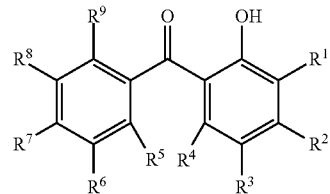

Formula (102)

wherein each of $Q^1$ and $Q^2$ represents an aromatic ring independently from each other. X represents NR(R represents a hydrogen atom or a substituent), an oxygen atom or a sulfur atom.

The aromatic ring represented by $Q^1$ or $Q^2$ may be an aromatic hydrocarbon ring or an aromatic heteroring. They may be monocyclic or further form a condensed ring with other ring.

The aromatic hydrocarbon ring represented by $Q^1$ or $Q^2$ is preferably a monocyclic or bicyclic aromatic hydrocarbon ring having 6-30 carbon atoms (such as a benzene ring and a naphthalene ring), more preferably an aromatic hydrocarbon ring having 6-20 carbon atoms, further preferably an aromatic hydrocarbon ring having 6-12 carbon atoms, most preferably a benzene ring.

Preferable examples of the aromatic heteroring represented by $Q^1$ or $Q^2$ include aromatic heterorings containing at least one of any of an oxygen atom, a nitrogen atom and a sulfur atom. Specific examples of the heteroring include furan, pyrrole, thiophene, imidazole, pyrazole, pyridine, pyrazine, pyridazine, tirazole, triazine, indole, indazole, purine, thiazoline, thiazole, thiadiazole, oxazoline, oxazole, oxadiazole, quinoline, isoquinoline, phthalazine, naphthyliz- ine, quinoxaline, quinazoline, cinnoline, pteridine, acridine, phenanthroline, phenazine, tetrazole, benzimidazole, benzoxazole, benzothiazole, benzotriazole and tetraazaindene. Preferable examples of the aromatic heteroring include pyridine, triazine and quinoline.

The aromatic ring represented by $Q^1$ or $Q^2$ is preferably an aromatic hydrocarbon ring, more preferably an aromatic hydrocarbon ring having 6-10 carbon atoms, further preferably a substituted or unsubstituted benzene ring.

$Q^1$ and $Q^2$ may further have a substituent, preferably such as a substituent T described later, but the substituent does not include carboxylic acid, sulfonic acid and quaternary ammonium salts. Further, when possible, substituents may be linked each other to form a ring structure or structures.

X is NR (R represents a hydrogen atom or a substituent, wherein the substituent may be a substituent T described later), oxygen atom or a sulfur atom. As X, NR (as R, an acyl group and a sulfonyl group are preferred, and these substituents may be further substituted) or O is preferred, and O is particularly preferred.

As the substituent T, those described above can be mentioned.

In the formula (102), preferable compounds are those represented by formula (102-A) below.

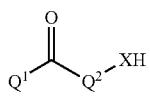

Formula (102-A)

wherein each of $R^1$, $R^2$, $R^3$, $R^4$, $R^5$, $R^6$, $R^7$, $R^8$ and $R^9$ represents, independently from one another, a hydrogen atom or a substituent.

Each of $R^1$, $R^2$, $R^3$, $R^4$, $R^5$, $R^6$, $R^7$, $R^8$ and $R^9$ represents, independently from one another, a hydrogen atom or a substituent, wherein the aforementioned substituent T can be applied as the substituent. Further, these substituents may be further substituted with other substituents, or the substituents may be ring-condensed each other to form a ring structure or structures.

Examples of $R^1$, $R^3$, $R^4$, $R^5$, $R^6$, $R^8$ and $R^9$ include, preferably, hydrogen atom, an alkyl group, an alkenyl group, an alkynyl group, an aryl group, a substituted or unsubstituted amino group, an alkoxy group, an aryloxy group, a hydroxyl group and a halogen atom, more preferably a hydrogen atom, an alkyl group, an aryl group, an alkyloxy group, an aryloxy group and a halogen atom, further preferably a hydrogen atom and an alkyl group having 1-12 carbon atoms, particularly preferably a hydrogen atom and a methyl group, most preferably a hydrogen atom.

Examples of $R^2$ include, preferably, a hydrogen atom, an alkyl group, an alkenyl group, an alkynyl group, an aryl group, a substituted or unsubstituted amino group, an alkoxy group, an aryloxy group, a hydroxyl group and a halogen atom, more preferably a hydrogen atom, an alkyl group having 1-20 carbon atoms, an amino group having 0-20 carbon atoms, an alkoxy group having 1-12 carbon atoms, an aryloxy group having 6-12 carbon atoms and a hydroxyl group, further preferably an alkoxy group having 1-20 carbon atoms, particularly preferably an alkoxy group having 1-12 carbon atoms.

Examples of $R^7$ include, preferably, a hydrogen atom, an alkyl group, an alkenyl group, an alkynyl group, an aryl group, a substituted or unsubstituted amino group, an alkoxy group, an aryloxy group, a hydroxyl group and a halogen atom, more preferably a hydrogen atom, an alkyl group having 1-20 carbon atoms, an amino group having 0-20 carbon atoms, an alkoxy group having 1-12 carbon atoms, an aryloxy group having 6-12 carbon atoms and a hydroxyl group, further preferably a hydrogen atom, an alkyl group having 1-20 carbon atoms (preferably having 1-12 carbon atoms, more preferably having 1-8 carbon atoms, further preferably a methyl group), particularly preferably a methyl group and a hydrogen atom.

In the formula (102), more preferable compounds are those represented by formula (102-B) below.

Formula (102-B)

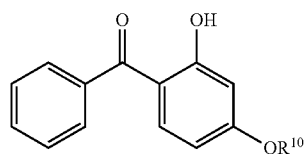

wherein $R^{10}$ represents a hydrogen atom, a substituted or unsubstituted alkyl group, a substituted or unsubstituted alkenyl group, a substituted or unsubstituted alkynyl group, or a substituted or unsubstituted aryl group.

$R^{10}$ represents a hydrogen atom, a substituted or unsubstituted alkyl group, a substituted or unsubstituted alkenyl group, a substituted or unsubstituted alkynyl group, or a substituted or unsubstituted aryl group, wherein the aforementioned substituent T can be applied as the substituent.

Example of $R^{10}$ is preferably a substituted or unsubstituted alkyl group, more preferably a substituted or unsubstituted alkyl group having 5-20 carbon atoms, further preferably a substituted or unsubstituted alkyl group having 5-12 carbon atoms (such as a n-hexyl group, a 2-ethylhexyl group, a n-octyl group, a n-decyl group, a n-dodecyl group and a benzyl group), particularly preferably a substituted or unsubstituted alkyl group having 6-12 carbon atoms (a 2-ethylhexyl group, a n-octyl group, a n-decyl group, a n-dodecyl group and a benzyl group).

The compound represented by the formula (102) can be synthesized by a publicly known method described in JP-A-11-12219.

Hereinafter, specific examples of the compound represented by the formula (102) are shown, but compounds usable in the invention are not restricted to these specific examples below.

UV-101

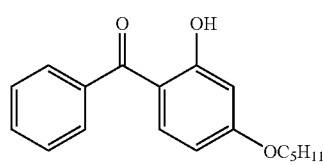

UV-102

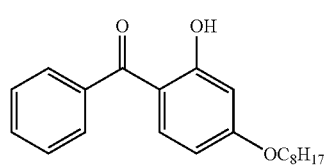

UV-103

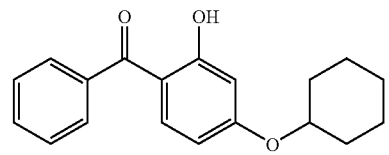

UV-104

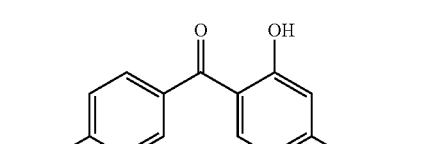

UV-105

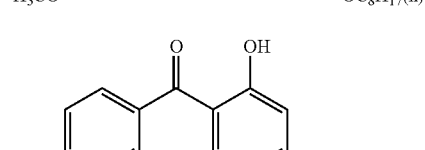

UV-106

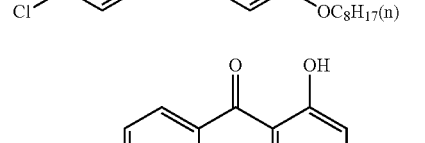

UV-107

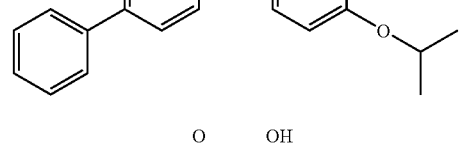

UV-108

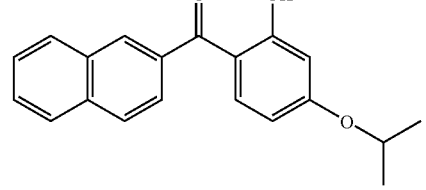

UV-109

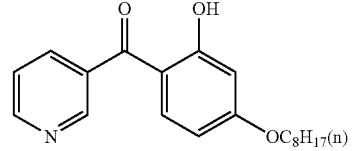

UV-110

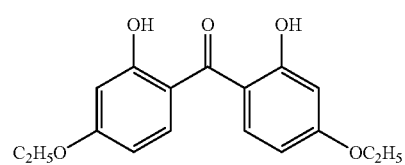

UV-111

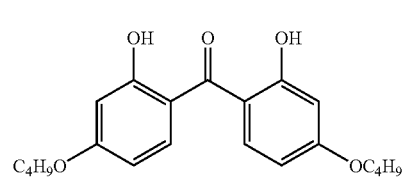

-continued

UV-112
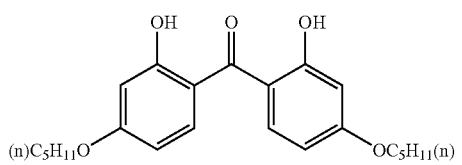

UV-113
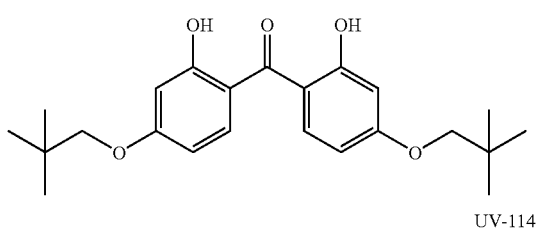

UV-114
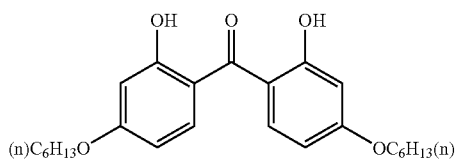

UV-115
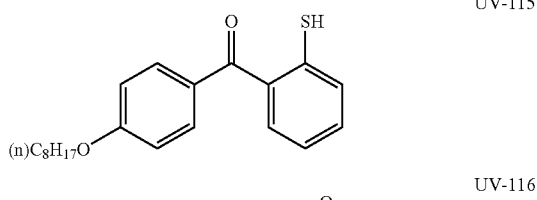

UV-116
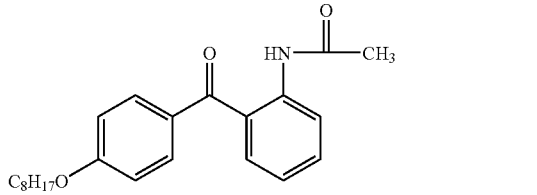

UV-117
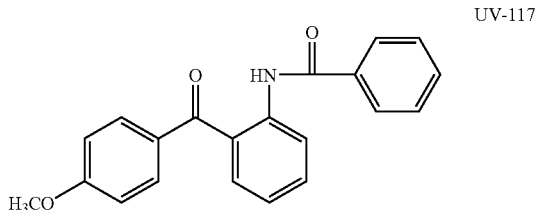

UV-118
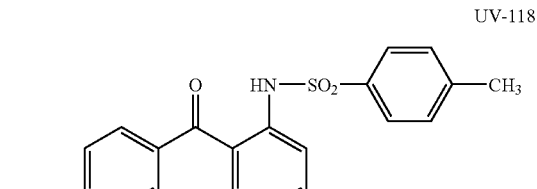

UV-119
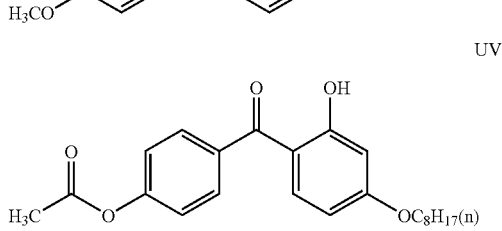

-continued

UV-120
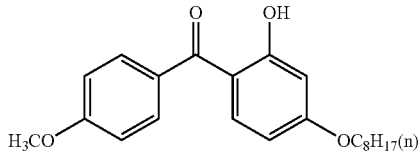

UV-121
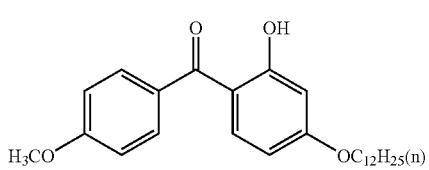

As a compound including a cyano group, which is one of the wavelength dispersion-adjusting agent used in the invention, one represented by formula (103) is preferably used.

Formula (103)
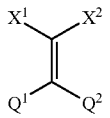

wherein each of $Q^1$ and $Q^2$ represents, independently from each other, an aromatic ring. Each of $X^1$ and $X^2$ represents, independently from each other, a hydrogen atom or a substituent, wherein at least either one of them represents a cyano group, a carbonyl group, a sulfonyl group or an aromatic heteroring.

Each of aromatic rings represented by $Q^1$ and $Q^2$ may be an aromatic hydrocarbon ring or an aromatic heteroring. They may be monocyclic, or further form a condensed ring with other ring.

Aromatic hydrocarbon ring is preferably a monocyclic or bicyclic aromatic hydrocarbon ring having 6-30 carbon atoms (such as a benzene ring and a naphthalene ring), more preferably an aromatic hydrocarbon ring having 6-20 carbon atoms, further preferably an aromatic hydrocarbon ring having 6-12 carbon atoms, furthermore preferably a benzene ring.

A preferable aromatic heteroring is an aromatic heteroring containing a nitrogen atom or a sulfur atom. Specific examples of the heteroring include a thiophene ring, an imidazole ring, a pyrazole ring, a pyridine ring, a pyrazine ring, a pyridazine ring, a triazole ring, a triazine ring, an indole ring, an indazole ring, a purine ring, a thiazoline ring, a thiazole ring, a thiadiazole ring, an oxazoline ring, an oxazole ring, a oxadiazole ring, a quinoline ring, an isoquinoline ring, a phthalazine ring, a naphthilidine ring, a quinoxaline ring, a quinazoline ring, a cinnoline ring, a pteridine ring, a acridine ring, a phenanthroline ring, a phenazine ring, a tetrazole ring, a benzimidazole ring, a benzoxazole ring, a benzothiazole ring, a benzotriazole ring and a tetrazaindene ring. Preferable aromatic heterorings are a pyridine ring, a triazine ring and a quinoline ring.

Example of the aromatic ring represented by $Q^1$ or $Q^2$ is preferably an aromatic hydrocarbon ring, and more preferably a benzene ring.

$Q^1$ and $Q^2$ may further have a substituent, wherein the aforementioned substituent T is preferred.

$X^1$ and $X^2$ represent a hydrogen atom or a substituent, wherein at least either one of them represents a cyano group, a carbonyl group, a sulfonyl group or an aromatic heteroring.

The substituent represented by $X^1$ or $X^2$ can include the aforementioned substituent T. Further, the substituent represented by $X^1$ or $X^2$ may be further substituted with other substituent or each of $X^1$ and $X^2$ may be ring-condensed to form a ring structure.

Examples of $X^1$ and $X^2$ include, preferably, a hydrogen atom, an alkyl group, an aryl group, a cyano group, a nitro group, a carbonyl group, a sulfonyl group and an aromatic heteroring, more preferably a cyano group, a carbonyl group, a sulfonyl group and an aromatic heteroring, further preferably a cyano group and a carbonyl group, particularly preferably a cyano group and an alkoxycarbonyl group (—C(=O)OR, wherein R represents an alkyl group having 1-20 carbon atoms, an aryl group having 6-12 carbon atoms, or combinations thereof).

In the formula (103), preferable compounds are those represented by formula (103-A) below.

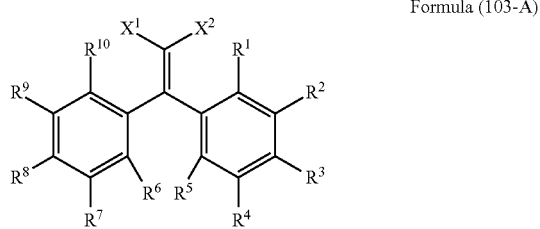

Formula (103-A)

wherein each of $R^1$, $R^2$, $R^3$, $R^4$, $R^5$, $R^6$, $R^7$, $R^8$, $R^9$ and $R^{10}$ represents, independently from one another, a hydrogen atom or a substituent. $X^1$ and $X^2$ have the same meanings and also preferable ranges as those in the formula (20).

Each of $R^1$, $R^2$, $R^3$, $R^4$, $R^5$, $R^6$, $R^7$, $R^8$, $R^9$ and $R^{10}$ represents, independently from one another, a hydrogen atom or a substituent, wherein the aforementioned substituent T can be applied as the substituent. Further, these substituents may further be substituted with other substituent, or substituents may be ring-condensed with each other to form a ring structure or structures.

Examples of $R^1$, $R^2$, $R^4$, $R^5$, $R^6$, $R^7$, $R^9$ and $R^{10}$ include, preferably, a hydrogen atom, an alkyl group, an alkenyl group, an alkynyl group, an aryl group, a substituted or unsubstituted amino group, an alkoxy group, an aryloxy group, a hydroxyl group and a halogen atom, more preferably a hydrogen atom, an alkyl group, an aryl group, an alkyloxy group, an aryloxy group and a halogen atom, further preferably a hydrogen atom and an alkyl group having 1-12 carbon atoms, particularly preferably a hydrogen atom and a methyl group, the most preferably a hydrogen atom.

Examples of $R^3$ and $R^8$ include, preferably, a hydrogen atom, an alkyl group, an alkenyl group, an alkynyl group, an aryl group, a substituted or unsubstituted amino group, an alkoxy group, an aryloxy group, a hydroxyl group and a halogen atom, more preferably a hydrogen atom, an alkyl group having 1-20 carbon atoms, an amino group having 0-20 carbon atoms, an alkoxy group having 1-12 carbon atoms, an aryloxy group having 6-12 carbon atoms and a hydroxyl group, further preferably a hydrogen atom, an alkyl group having 1-12 carbon atoms and an alkoxy group having 1-12 carbon atoms, particularly preferably a hydrogen atom.

In the formula (103), more preferable compounds are those represented by formula (103-B) below.

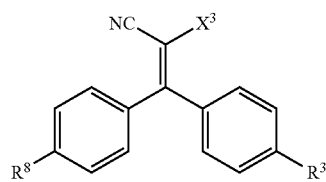

Formula (103-B)

wherein each of $R^3$ and $R^8$ has, independently from each other, the same meaning and also the preferable range as those in (103-A). $X^3$ represents a hydrogen atom or a substituent.

$X^3$ represents a hydrogen atom or a substituent, wherein the aforementioned substituent T can be applied as the substituent and, further, may further be substituted with other substituent when possible. Examples of $X^3$ include, preferably, a hydrogen atom, an alkyl group, an aryl group, a cyano group, a nitro group, a carbonyl group, a sulfonyl group and an aromatic heteroring, more preferably a cyano group, a carbonyl group, a sulfonyl group and an aromatic heteroring, further preferably a cyano group and a carbonyl group, particularly preferably a cyano group and an alkoxycarbonyl group (—C(=O)OR, wherein R represents an alkyl group having 1-20 carbon atoms, an aryl group having 6-12 carbon atoms or combinations thereof).

In the formula (103), further preferable compounds are those represented by formula (103-C).

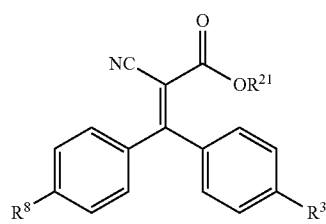

Formula (103-C)

wherein each of $R^3$ and $R^8$ has, independently from each other, the same meaning and also the preferable range as those in (103-A). $R^{21}$ represents an alkyl group having 1-20 carbon atoms.

When both of $R^3$ and $R^8$ are hydrogen atoms, the example of $R^{21}$ is preferably an alkyl group having 2-12 carbon atoms, more preferably an alkyl group having 4-12 carbon atoms, further preferably an alkyl group having 6-12 carbon atoms, particularly preferably a n-octyl group, a tert-octyl group, a 2-ethylhexyl group, a n-decyl group or a n-dodecyl group, most preferably a 2-ethylhexyl group.

When both of $R^3$ and $R^8$ are not hydrogen atoms, preferable examples of $R^{21}$ include such alkyl groups that make molecular weight of compounds represented by the formula (103-C) 300 or more and have 20 or less carbon atoms.

The compound represented by the formula (103) of the invention can be synthesized according to the method described in Journal of American Chemical Society, vol. 63, p 3452 (1941).

Hereinafter, specific examples of the compound represented by the formula (103) are shown, however compounds usable in the invention is not restricted to the specific examples below.

UV-201 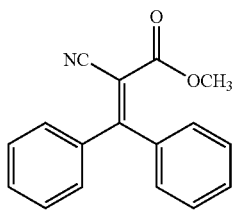
UV-202 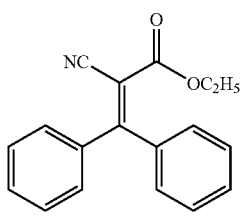
UV-203 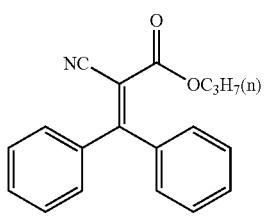
UV-204 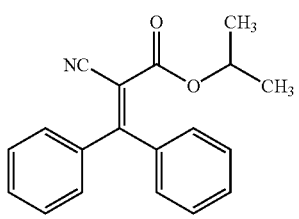
UV-205 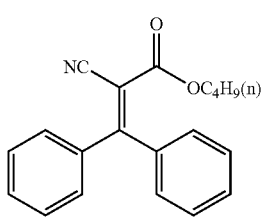
UV-206 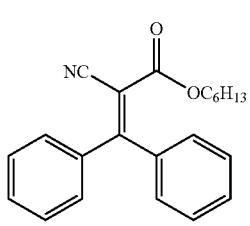
UV-207 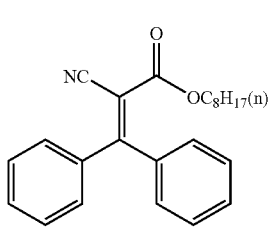
-continued
UV-208 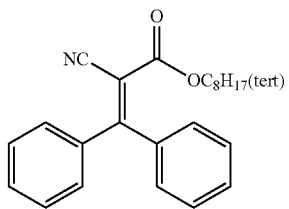
UV-209 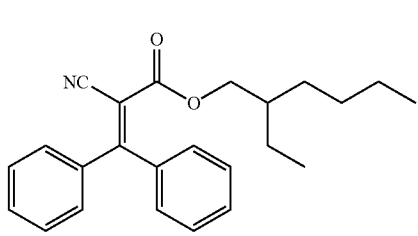
UV-210 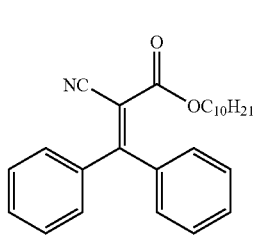
UV-211 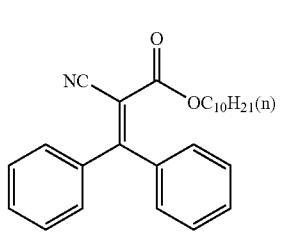
UV-212 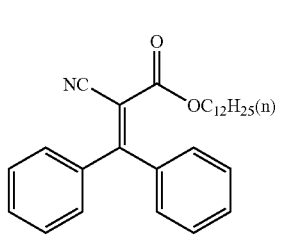
UV-213 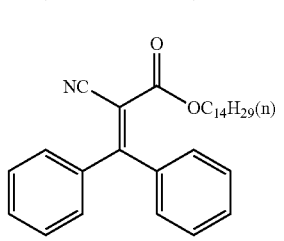
UV-214 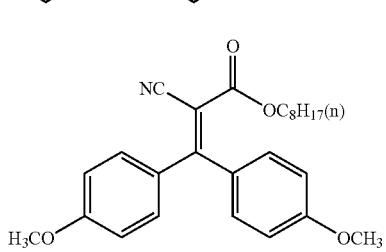

-continued
UV-215
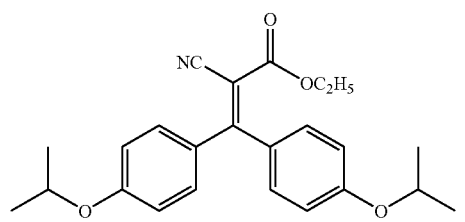
UV-216
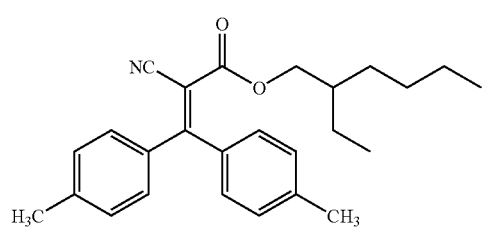
UV-217
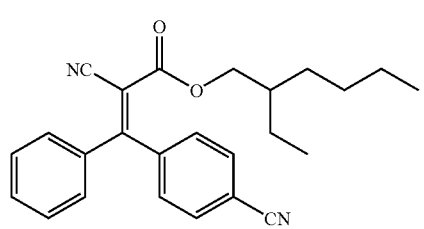
UV-218
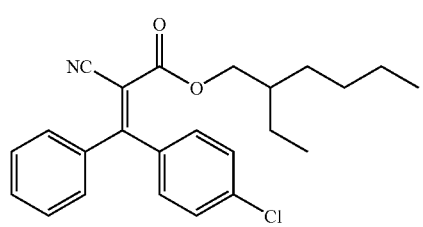
UV-219
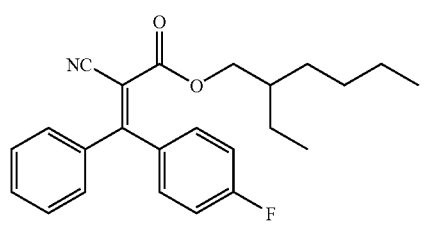
UV-220
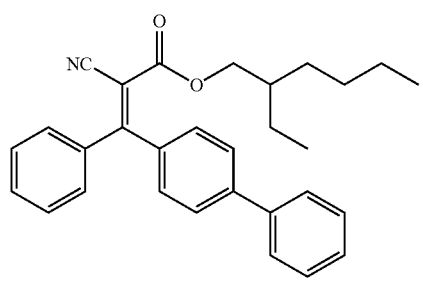
UV-221
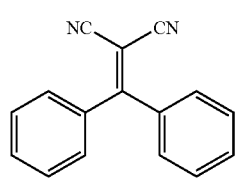
-continued
UV-222
UV-223
UV-224
UV-225
UV-226
UV-227
UV-228

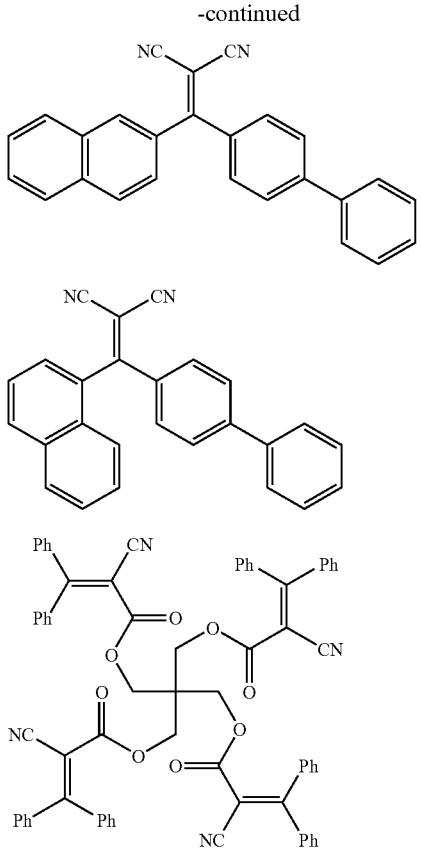

Matting Agent Fine Particles

Addition of fine particles as a matting agent to the cellulose acylate film of the invention is preferred. Examples of fine particles for use in the invention include silicon dioxide, titanium dioxide, aluminum oxide, zirconium oxide, calcium carbonate, talc, clay, calcined kaolin, calcined calcium silicate, calcium silicate hydrate, aluminum silicate, magnesium silicate and calcium phosphate. Fine particles containing silicon are preferred because turbidity becomes low, and silicon dioxide is particularly preferred. Preferable fine particles of silicon dioxide have a primary average particle size of 20 nm or less, and an apparent specific gravity of 70 g/l or more. Those having the primary average particle size as small as 5-16 nm are more preferred because they can lower haze of the film. As for an apparent specific gravity, 90-200 g/l is preferred, and 100-200 g/l is more preferred. A greater apparent specific gravity makes it possible to manufacture a dispersion liquid having a high concentration to lead to better haze and aggregate, and thus is preferred.

When the silicon dioxide fine particles are used, preferable amount is 0.01-0.3 parts by mass relative to 100 parts by mass of polymer component including the cellulose acylate.

These fine particles forms secondary particles usually having an average particle size of 0.1-3.0 μm and these fine particles exist as aggregates of the primary particles to form irregularity of 0.1-3.0 μm on the surface of the film. As for the secondary average particle size, 0.2 μm-1.5 μm is preferred, 0.4 μm-1.2 μm is more preferred, and 0.6 μm-1.1 μm is most preferred. The secondary average particle size within the above range exerts sufficient effect of preventing creaking and gives a little haze.

The primary and secondary particle sizes are defined as the diameter of a circle circumscribing the particle, which is obtained by observing particles in the film under a scanning electron microscope. The average particle size is defined as an averaged value of the size of particles obtained by observing 200 particles at different positions.

As fine particles of silicon dioxide, marketed productions can be used, including, for example, AEROSIL R972, R972V, R974, R812, 200, 200V, 300, R202, OX50 and TT600 (all of them are manufactured by NIPPON AEROSIL CO., LTD.) etc. As fine particles of zirconium oxide, for example, those available in the market under trade names of AEROSIL R976 and R811 (manufactured by NIPPON AEROSIL CO., LTD.) can be used.

Among these, AEROSIL 200V and AEROSIL R972V are particularly preferred, because they are fine particles of silicon dioxide having a primary average particle size of 20 nm or less and an apparent specific gravity of 70 g/l to exert a large effect of lowering a friction coefficient while maintaining turbidity of an optical film at a low level.

In order to obtain a cellulose acylate film having particles with a small secondary average particle size in the invention, several procedures are conceived upon preparing a dispersion liquid of fine particles. For example, there is such method that a dispersion liquid of fine particles is prepared in advance by stirring and mixing a solvent and fine particles, then the dispersion liquid of fine particles is added to a small amount of cellulose acylate solution having been prepared separately to be stirred and dissolved, which is further mixed with a main cellulose acylate dope liquid. This method is a preferable preparation method in that it results in a good dispersibility of silicon dioxide fine particles, hardly allowing the silicon dioxide fine particles to aggregate again. As an alternative, there is also such method that a solvent is added with a small amount of cellulose acylate to be stirred and dissolved, then fine particles are added to the solution to be dispersed by a dispersing apparatus to form a fine particles addition liquid, and the fine particles addition liquid is sufficiently mixed with a dope liquid by an in-line mixer. However, the invention is not restricted to these method. When silicon dioxide fine particles are dispersed by mixing them with a solvent or the like, concentration of silicon dioxide is preferably 5-30% by mass, more preferably 10-25% by mass, most preferably 15-20% by mass. A higher dispersion concentration results in a lower liquid turbidity relative to the addition amount and better haze and aggregates, and thus is preferred. The final addition amount of a matting agent in a cellulose acylate dope solution is preferably 0.01-1.0 g/m$^2$, more preferably 0.03-0.3 g/m$^2$, and most preferably 0.08-0.16 g/m$^2$.

As for usable solvents, as lower alcohols, preferable examples include methyl alcohol, ethyl alcohol, propyl alcohol, isopropyl alcohol and butyl alcohol. Solvents other than lower alcohols are not particularly restricted, but use of a solvent that is used at a film-forming step of cellulose acylate is preferred.

Preparation of Dope

Next, preparation of a cellulose acylate solution (dope) will be described. A method for dissolving cellulose acylate is not particularly restricted and can be practiced at room temperature, by a cooling dissolving method or a high-temperature dissolving method, or further by a combined method of these. Preparation methods of a cellulose acylate solution are described in, for example, JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017, JP-A-11-302388 etc.

These methods of dissolving cellulose acylate in an organic solvent described above are technologies also suitably applicable for the invention within the range of the invention. Details of these, particularly a chlorine-free organic-based solvent system, are practiced according to the method described in detail in pp 22-25 of KOKAI-GIHO (Disclosure of Techniques) (Kogi No. 2001-1745, published on Mar. 15, 2001 by Japan Institute of Invention and Innovation). Further, the dope solution of cellulose acylate of the invention is usually subjected to solution condensation and filtration, which are similarly described in detail in p 25 of KOKAI-GIHO (Disclosure of Techniques) (Kogi No. 2001-1745, published on Mar. 15, 2001 by Japan Institute of Invention and Innovation). In this connection, when dissolution is carried out at high temperatures, in most cases the temperature is not lower than the boiling point of a solvent used and the solvent is used under pressurized conditions.

As for the cellulose acylate solution, a preferable solution has a viscosity and a dynamic storage elastic modulus within a range described below from the viewpoint of easy casting. Measurement is carried out by applying 1 mL of a sample solution to a rheometer (CLS 500) with a Steel Cone having diameter of 4 cm/2° (both are manufactured by TA Instruments). Such measurement condition is employed that measurement is carried out within a range of 40° C.--10° C. while varying at 2° C./min of Oscillation Step/Temperature Ramp to give a static non-Newtonian viscosity n* (Pa·s) at 40° C. and a storage elastic modulus G' (Pa) at −5° C. Here, before starting the measurement, the sample solution is kept warm at a temperature for starting the measurement till the solution temperature becomes constant. In the invention, viscosity of 1-400 Pa·s at 40° C. and a dynamic storage elastic modulus of 500 Pa or more at 15° C. are preferred, and viscosity of 10-200 Pa·s at 40° C. and a dynamic storage elastic modulus of 100-1,000,000 Pa at 15° C. are more preferred. Further, a greater dynamic storage elastic modulus at low temperature is more preferred. For example, when a casting support is at −5° C., a dynamic storage elastic modulus is preferably 10,000-1,000,000 Pa at −5° C., and when the support is at −50° C., a dynamic storage elastic modulus is preferably 10,000-5,000,000 Pa at −50° C.

In the invention, since the aforementioned specific cellulose acylate is employed, it is the characteristic that a dope of a high concentration can be obtained, thereby giving a cellulose acylate solution having a high concentration and, further, excellent stability without relying on such means as condensation. In order to achieve easier dissolution, a solution having a lower concentration may be first prepared, which is then condensed with some condensation means. Although there is not particular restriction to the condensation method, for example, such methods can be employed as leading a low concentration solution between a tube and a rotating locus of a periphery of rotor blade rotating in the circumferential direction in the tube and giving temperature difference between the solution and the system to evaporate the solvent and obtain a high concentration solution (for example, JP-A-4-259511 etc.); and injecting a heated low concentration solution from a nozzle into a vessel, flash-evaporating the solvent during staying time of the solution between the nozzle and the vessel interior wall and, at the same time, extracting the solvent vapor from the vessel and extracting a high concentration solution from the vessel bottom (for example, methods as described in U.S. Pat. Nos. 2,541,012, 2,858,229, 4,414,341, 4,504,355 etc.).

Prior to casting, the solution is preferably filtered and removed of foreign material such as an undissolved material, dirt and impurities using an appropriate filter element such as a metal mesh and filtering cloth. For filtration of the cellulose acylate solution, use of a filter having an absolute filtration accuracy of 0.1-100 µm is preferred, and use of a filter having an absolute filtration accuracy of 0.5-25 µm is more preferred. Thickness of the filter is preferably 0.1-10 mm, more preferably 0.2-2 mm. In that case, filtration pressure is preferably 1.6 MPa or less, more preferably 1.2 MPa or less, further preferably 1.0 MPa or less, and filtration under 0.2 MPa or less is particularly preferred. As for an filter element, conventionally publicly know materials can be preferably used, including glass fiber, cellulose fiber, paper filter and fluorocarbon resin such as tetrafluoroethylene, and the like. Particularly, ceramics, metal and the like are preferably used. The cellulose acylate solution just before film-forming may have a viscosity in a range that allows casting to be performed upon film-forming. Usually, preparation in a range of 10 Pa·s-2000 Pa·s is preferred, 30 Pa·s-1000 Pa·s is more preferred, and 40 Pa·s-500 Pa·s is further preferred.

Temperature at that time is not particularly restricted when it is a temperature at the casting, but it is preferably −5-+70° C., more preferably −5-+55° C.

Film-Forming

The cellulose acylate film of the invention can be obtained by carrying out film-forming by using the aforementioned cellulose acylate solution. As for a film-forming method and equipment, a solution casting film-forming method and a solution casting film-forming apparatus conventionally provided for production of cellulose triacetate film are used. Dope (cellulose acylate solution) prepared in a dissolving machine (caldron) is once stored in a storage caldron and defoamed of foam included in the dope to manufacture a final preparation. The dope is sent from a dope discharge port to a pressurized die through, for example, a pressurized metering gear pump capable of metering feed at a high accuracy by rotation rate, which is uniformly cast from a slit of the pressurized die onto a metal support of casting section that is running endlessly. Then, at a striping point where the metal support has gone approximately one round, a half-dried dope film (also referred to as web) is stripped off the metal support. The resulting web is pinched with clips at both ends thereof, conveyed by a tenter while retaining the width of the film and dried, and then conveyed by a group of rolls of a drying apparatus to finish drying and wound by a winder in a designed length. Combination of a tenter and a drying apparatus or a group of rolls depends on purpose thereof. In a solution casting film-forming method used for manufacturing a functional protective film for electronic display, in addition to a solution casting film-forming apparatus, a coating apparatus is often added for surface processing of the film such as an under-coating layer, an antistatic layer, an antihalation layer and a protective layer. Hereinafter, respective production processes are briefly described, but are not restricted to these.

First, upon manufacturing a cellulose acylate film by a solution casting method, a prepared cellulose acylate solution (dope) is cast on a dram or a band, from which the solvent is evaporated to form a film. Concentration of the dope before the casting is preferably adjusted so that solid content thereof is 5-40% by mass. Surface of the dram or the band is preferably of mirror finish. The dope is preferably cast on a dram or a band having a surface temperature of 30° C. or less, and in particular, a metal support temperature of −10-20° C. is preferred. Further, the invention can use such methods as described in JP-A-2000-301555, JP-A-2000-301558, JP-A-07-032391, JP-A-03-193316, JP-A-05-086212, JP-A-62-037113, JP-A-02-276607, JP-A-55-014201, JP-A-02-111511 and JP-A-02-208650.

As for film-forming speed, 5-300 m/min is preferred, 20-100 m/min is more preferred, and 40-80 m/min is most preferred. A film-forming speed in the specification means a casting speed when a film is formed by a casting method.

Multi-Layer Casting

The cellulose acylate solution may be cast as a single layer solution, or plural cellulose acylate liquids for 2 layers or more may be cast, on a smooth band or a dram as a metal support. When plural cellulose acylate solutions are cast, respective solutions containing cellulose acylate may be cast from casting ports arranged at some intervals in the traveling direction of the metal support while forming a laminated film. Such methods as described, for example, in JP-A-61-158414, JP-A-1-122419 and JP-A-11-198285 can be applied. Further, cellulose acylate solutions may be cast from 2 casting ports to form a film, which can be practiced according to such methods as described, for example, in JP-B-60-27562, JP-A-61-94724, JP-A-61-947245, JP-A-61-104813, JP-A-61-158413 an JP-A-6-134933. Furthermore, a cellulose acylate film casting method described in JP-A-56-162617 may be employed, in which flow of a high viscosity cellulose acylate solution is enveloped by a low viscosity cellulose acylate solution, and the high and low viscosity cellulose acylate solutions are excluded simultaneously. Furthermore, an embodiment described in JP-A-61-94724 and JP-A-61-94725, in which an outer solution contains more amount of an alcohol component being a poor solvent than an inner solution, is also preferred. Alternatively, by using 2 casting ports, a film may be formed by molding a film on a metal support by a first casting port, striping the film, and performing a second casting on the side of the film having contacted with the metal support surface. Such method is described, for example, in JP-B-44-20235. Cellulose acylate solutions to be cast may be the same solutions or different solutions, without particular restriction. In order to make plural cellulose acylate layers have some functions, respective solutions corresponding to the function may be excluded from respective casting ports. In addition, a cellulose acylate solution may also be simultaneously cast with solutions for other functional layers (such as an adhesion layer, a dye layer, an antistatic layer, an anti-halation layer, a UV-absorbing layer and a polarizing film).

When a conventional liquid for a single layer was used, it was necessary to exclude a cellulose acylate solution having a high concentration and viscosity in order to achieve a designed film thickness, and in that case, such troubles often occurred as spots and poor planarity due to generation of solid matters resulting from poor stability of a cellulose acylate solution. In order to solve the problem, plural cellulose acylate solutions are cast from casting ports to make it possible to simultaneously exclude high viscosity solutions onto a metal support, thereby achieving not only manufacture of a film having an improved plane property of good planarity, but also reduction of a drying load due to use of a condensed cellulose acylate solution to allow production speed of a film to be increase. In the case of co-casting, inside and outside thicknesses are not particularly restricted, but the outside is preferably 1-50%, more preferably 2-30% of the total film thickness. Here, in the case of co-casting of 3 layers or more, the thickness of the outside is defined as the total film thickness of the layer contacting with the metal support and the layer contacting with the air side. In the case of co-casting, casting of cellulose acylate solutions containing different concentrations of such additives as the aforementioned plasticizer, ultraviolet absorber and matting agent may be also possible to form a cellulose acylate film having an laminated structure. For example, a cellulose acylate film having such structure as skin layer/core layer/skin layer can be manufactured. For example, a matting agent can be incorporated in a skin layer in an large amount, or only in a skin layer. A plasticizer and an ultraviolet absorber may be incorporated in a large amount in a core layer than in a skin layer, or only in a core layer. Further, types of a plasticizer and an ultraviolet absorber can be altered in a core layer and a skin layer. For example, it is also possible to incorporate at least either one of a low volatile plasticizer and ultraviolet absorber in a skin layer, and add a plasticizer excellent in plastic property or an ultraviolet absorber excellent in ultraviolet-absorbing property in a core layer. Further, addition of a stripping accelerator only in a skin layer on the metal support side is also a preferable embodiment. Addition of an alcohol as a poor solvent in a larger amount in a skin layer than in a core layer is also preferred in order to chill the metal support by a chilled dram method to form gel of the solution. Tgs of a skin layer and a core layer may be different from each other, and Tg of a core layer lower than Tg of a skin layer is preferred. Viscosity of a solution containing cellulose acylate at casting may be different between a skin layer and a core layer. In this case, a lower viscosity of skin layer than viscosity of core layer is preferred, but a lower viscosity of core layer than viscosity of skin layer may be allowable.

Casting

As for a casting method of the solution, there are such methods as uniformly excluding a prepared dope from a pressurized die onto a metal support, using an doctor blade to adjust a film thickness of the dope once cast on a metal support by a blade, and using a reverse roll coater to adjust it by a roll rotating in a reverse direction. The method using a pressurized die is preferred. Examples of the pressurized die include a coat hanger type, a T-die type and the like, all of which can be used preferably. In addition to methods mentioned here, the casting can be carried out by various conventionally known methods of casting and film-forming a cellulose triacetate solution, thereby giving the same effect as described in respective gazettes, by setting respective conditions while considering differences in boiling points of solvents used and the like. As a metal support running endlessly for use in producing the cellulose acylate film of the invention, a dram, whose surface has been mirror finished by chrome plating, or a stainless belt (or a band), which has been mirror finished by surface polishing, can be used. One or two or more of pressurized dies for use in producing the cellulose acylate film of the invention may be disposed on the upper side of the metal support. Preferably, 1 or 2. When 2 or more of them are disposed, the amount of dope to be cast may be divided to respective dies at various ratios, or the dope may be sent to dies by plural accurate metering gear pumps at respective ratios. Temperature of the cellulose acylate solution used for casting is preferably −10-55° C., more preferably 25-50° C. In that case, all the steps may have the same temperature, or each of steps may have different temperatures. In the latter case, achievement of a designed temperature just before the casting is sufficient.

Drying

There are many methods for drying the dope on a metal support responsible for producing the cellulose acylate film, including such methods as blowing hot wind generally from the front face side of the metal support (dram or belt), that is, the front face of web on a metal support, blowing hot wind from the rear face of a dram or belt, and a liquid heat transfer method in which a temperature-controlled liquid is contacted to a belt or dram from the rear face thereof that is the opposite side of the dope casting face to heat the dram or belt through heat transfer and control the surface temperature. Among them, a liquid heat transfer system from the rear face is preferred. Surface temperature of a metal support before the casting may be arbitrary only when it does not exceed the boiling point of a solvent used for the dope. However, in order to accelerate drying and cause flowability on the metal support to be absent, preferably the temperature is set at a temperature lower by 1-10° C. than the boiling point of a solvent having the lowest boiling point among solvents used. Incidentally, when the cast dope is stripped without chilling and drying, this is not applied.

Stretching Treatment

The cellulose acylate film of the invention can be adjusted of retardation by a stretching treatment. Further, there is such methods as stretching the film in width direction in a positive manner, which are described, for example, in JP-A-62-115035, JP-A-4-152125, JP-A-4-284211, JP-A-4-298310, JP-A-11-48271 and the like. This stretching of a produced film is carried out in order to make an in-plane retardation of the cellulose acylate film be a high value.

Stretching of a film is practiced under ordinary temperature or heated conditions. Heated temperature is preferably in a range of ±20° C. across the glass transition temperature of the film. Stretching at a temperature extremely lower than the glass transition temperature tends to occurrence of easy breaking, whereby expression of desired optical properties can not be achieved. On the other hand, stretching at a temperature extremely higher than the glass transition temperature can not fix molecular alignment because the alignment formed by the stretching is relaxed before thermal fixation thereof by heat during the stretching, thereby resulting in degraded expression of optical properties.

The film may be stretched by a uniaxial drawing (fixed width, free width) or by a simultaneous or sequential biaxial drawing. Range of the stretching is 10-200%. Range of the stretching is preferably 12-100%, particularly preferably 15-80%.

When being used as a retardation film for a liquid crystal display, the cellulose acylate film is required to have a large refraction index in a direction perpendicular to the absorption axis of a polarizer. Accordingly, in order to achieve a roll-to-roll processing with a polarizer, preferably the refraction index of an optical film in width direction is greater than the refraction index in the length direction.

The stretching treatment may be carried out in the middle of a film-forming step, or a rolled web having been film-formed and wound may be subjected to a stretching treatment. In the former case, stretching may be carried out under a state of presence of a residual solvent, wherein the stretching can be preferably carried out at a residual solvent volume (wet ratio, residual solvent amount/(residual solvent amount+ solid content)) of 2-50%.

Film thickness of the cellulose acylate film of the invention obtained after drying varies according to intended uses and, usually, is preferably 5-500 μm, more preferably 40-200 μm, further preferably 40-180 μm, furthermore preferably 40-150 μm, particularly preferably 40-130 μm. For optical use, in particular for a liquid crystal display, 40-120 μm is preferred.

Since the absolute value of retardation is proportional to the film thickness, optical properties of a film may be adjusted by controlling the film thickness. Further, since the moisture permeability decreases in inverse proportion to the film thickness, by increasing the film thickness, the film has the decreased moisture permeability and does not allow water to pass through it easily. It is advantageous in a polarizing plate durability test at 60° C., relative humidity of 90% for 500 hours.

Adjustment of the film thickness may be achieved by controlling concentration of solid content contained in the dope, slit gap of the mouth of die, extrusion pressure from the die or speed of the metal support so that a designed thickness is obtained. Width of the cellulose acylate film obtained according to the above-described way is preferably 0.5-3 m, more preferably 0.6-2.5 m, further preferably 0.8-2.2 m, and particularly preferably 1.2-2.2 m. A too narrow width tends to decrease production efficiency and make application to a large size liquid crystal display use difficult. A wound length per roll is preferably 100-10,000 m, more preferably 500-7,000 m, further preferably 1,000-6,000 m. Upon winding, creation of knurling at least at one side is preferred. Width thereof is preferably 3 mm-50 mm, more preferably 5 mm-30 mm, and height is preferably 0.5-500 μm, more preferably 1-200 μm. It may be formed in one way or in both ways.

Optical Properties of Cellulose Acylate Film

The in-plane retardation Re and the retardation Rth in the thickness direction of the cellulose acylate film of the invention satisfy, respectively, the following formulae (XI) and (XII). This can give a wide view angle of a liquid crystal display, particularly of an IPS mode liquid crystal display, and thus is preferred.

$$50\ nm < Re_{(590)} < 400\ nm \quad \text{Formula (XI)}$$

$$-200\ nm \leq Rth_{(509)} \leq 50\ nm \quad \text{Formula (XII)}$$

Wherein $Re_{(\lambda)}$ is an in-plane retardation (unit: nm) at wavelength λ nm, and $Rth_{(\lambda)}$ is a retardation (unit: nm) in the thickness direction at wavelength λ nm.

The cellulose acylate film of the invention more preferably satisfies the following formulae.

$$110\ nm \leq Re_{(590)} \leq 300\ nm \quad \text{Formula (XIII)}$$

$$-100\ nm \leq Rth_{(590)} \leq 20\ nm \quad \text{Formula (XIV)}$$

The cellulose acylate film of the invention further preferably satisfies the following formulae.

$$150\ nm \leq Re_{(590)} \leq 300\ nm \quad \text{Formula (XV):}$$

$$-50\ nm \leq Rth_{(590)} \leq 5\ nm \quad \text{Formula (XVI)}$$

The absolute value of Nz represented by the following formula is preferably 10 or less, more preferably 1 or less, and most preferably 0.7 or less.

$$Nz = Rth_{(590)}/Re_{(590)} + 0.5 \quad \text{Formula (A)}$$

In particular, when being used in an IPS type liquid crystal display, the cellulose acylate film of the invention has, preferably, Re of 200-330 nm and |Nz| of 0.3-0.7, more preferably Re of 220-300 nm and |Nz| of 0.4-0.6, and further preferably Re of 250-290 nm and |Nz| of 0.4-0.6.

Further, manufacture of an optical compensation sheet by laminating the cellulose acylate film of the invention having a specific optical properties and other optical compensation layer makes it possible to realize various optical properties to increase freedom of optical design.

In addition, preferably the cellulose acylate film of the invention has such characteristics that difference ΔRe=Re (10% RH)-Re(80% RH) between Re at 25° C., 10% RH (relative humidity) and Re at 25° C., 80% RH is 0-50 nm, and difference ΔRth=Rth (10% RH)-Rth (80% RH) between Rth at 25° C., 10% RH and Rth at 25° C., 80% RH is 0-30 nm, in order to reduce color change of a liquid crystal display with an elapse of time.

Film thickness distribution of Re in the width direction can be evaluated by collecting sequentially 10 samples of 2 cm (width direction)×3 cm (perpendicular to width direction) starting from the position 5 cm inner from the film edge to width direction at equal intervals and measuring respective thicknesses. Thicknesses of respective test pieces (2 cm×3 cm) can be obtained by measuring total 9 points, that is, 3 points in both longitudinal and lateral directions in the plane of the film.

When the film thickness distribution R is defined as R(%)= (Rmax−Rmin)/Rave×100, while representing the maximum, minimum and average values in the width direction as Rmax, Rmin and Rave, respectively, R has been adjusted preferably to 0-8%, more preferably to 0-7.8%, further preferably to 0-7.6%. Since Re and Rth have values proportional to the film thickness, a smaller distribution of the film thickness in the width direction gives a smaller variation of $Re_{(590)}$ and $Rth_{(590)}$, and is preferred.

Distributions of $Re_{(590)}$ and $Rth_{(590)}$ generate caused by the aforementioned variation of the film thickness, or unevenness of stretching or drying. Preferably, distribution (unevenness) of Re has been adjusted to 5% or less, and distribution of Rth has been adjusted to 10% or less. More preferably, distribution of Re is 4.8% or less and distribution of Rth is 9.8% or less, and further preferably distribution of Re is 4.6% or less and distribution of Rth is 9.6% or less.

The aforementioned film thickness distribution R, Re distribution and Rth distribution are preferred because display unevenness is reduced when the film is used for a liquid crystal display to display images.

In the invention, optical properties were measured according to following methods.

$Re_{(\lambda)}$ was measured by using KOBRA 21ADH (manufactured by Oji Scientific Instruments) while irradiating light of wavelength λnm in the normal line direction of film. $Rth_{(\lambda)}$ was calculated by inputting a hypothetical value 1.48 of an average refraction index and the film thickness, on the basis of the retardations measured in total 3 directions, that is, the aforementioned $Re_{(\lambda)}$, a retardation measured by irradiating light of wavelength λ nm from the direction tilting in +40° relative to the film normal line direction while employing the slow axis in the plane as a tilt axis, and a retardation measured by irradiating light of wavelength λ nm from the direction tilting in −40° relative to the film normal line direction while employing the slow axis in the plane as a tilt axis. In the present specification, unless a particular restriction is present, the retardation is a value measured at wavelength of 590 nm.

In the cellulose acylate film of the invention, color difference ΔE*ab is preferably 0.8 or less, more preferably 0.7 or less, further preferably 0.5 or less after an elapse of 500 hours at 90° C. In addition, color difference is preferably 1.5 or less, more preferably 1.0 or less, further preferably 0.5 or less after an elapse of 24 hours at 140° C. Coloring of the film under such forced environmental conditions as 90° C., 500 hours or 140° C., 24 hours is undesirable because it induces degradation of optical compensation performance as a retardation film, and also from the viewpoint of appearance. For measurement of color difference, UV3100 (manufactured by Shimadzu Corporation) was used. In the measurement, first, initial values (L0*, a0*, b0*) were obtained by performing, after humidity condition of a film at 25° C., 60% RH for 2 hours or more, color measurement of the film prior to storage under a high temperature and humidity. Then, the film alone was left in an air constant temperature bath for a predetermined time. After an elapse of the predetermined time, the film was taken out of the bath followed by humidity conditioning at 25° C., 60% RH for 2 hours, and then color measurement was carried out to give values (L1*, a1*, b1*) after storage under the aforementioned conditions. From these results, color difference $\Delta E^*ab=((L0^*-L1^*)^2+(a0^*-a1^*)^2+(b0^*-b1^*)^2)^{1/2}$ was obtained.

The cellulose acylate film of the invention has an equilibrium moisture content at 25° C., 80% RH of preferably 5.0% or less, more preferably 4.0% or less, further preferably 3.2% or less, from the viewpoint of reducing color change of a liquid crystal display caused by an elapse of time.

Moisture content of the cellulose acylate film of the invention is measured for a sample of 7 mm×35 mm by using MOISTURE METER CA-03 and WATER VAPORIZER VA-05 (both are manufactured by Mitsubishi Chemical Corporation) according to Karl Fischer's method. The moisture content is calculated by dividing weight of water (g) by mass of the sample (g).

Further, the cellulose acylate film of the invention has moisture permeability (in terms of film thickness 80 μm) at 60° C., 95% RH for 24 hours of preferably 400 g/m²·24 h–1800 g/m²·24 h, from the viewpoint of reducing color change of a liquid crystal display caused by an elapse of time.

A greater thickness of the cellulose acylate film gives a smaller moisture permeability, and a smaller thickness gives a greater moisture permeability. The measured moisture permeability is converted to a value while employing 80 μm as the standard film thickness. The converted moisture permeability is calculated according to the formula [moisture permeability in terms of 80 μm=actually measured moisture permeability×actually measured film thickness μm/80 μm].

As a measuring method of moisture permeability, there are such applicable methods as described in pages 285-294 of "Measurement of Moisture Permeating Amount (mass method, thermometer method, vapor pressure method, absorbing amount method)" of "Kobunshi No Bussei (Physical Properties of Polymer) II" (Kobunsh Jikken Koza (Polymer Experiment Course) 4, KYORITSU SHUPPAN CO., LTD.).

The glass transition temperature of the cellulose acylate film of the invention is determined by measuring a sample of the film (not stretched) of 5 mm×30 mm, which has been humidity controlled at 25° C., 60% RH for 2 hours or more, using a dynamic viscoelasticity analyzer (Vibron: DVA-225 manufactured by ITK Corp. Ltd) under conditions of a grip distance of 20 mm, a temperature rising rate of 2° C./min, a measuring temperature range of 30° C.-200° C. and a frequency of 1 Hz, and by drawing, while plotting storage elastic modulus as the logarithmic vertical axis and temperature (° C.) as the linear horizontal axis, linear line in a solid region and linear line 2 in the glass transition region for sharp decline in a storage elastic modulus that is observed when the storage elastic modulus makes the transition from the solid region to the glass transition region, and then determining the intersection point of the linear lines 1 and 2 as the glass transition temperature Tg (dynamic viscoelasticity) because the point is a temperature where the storage elastic modulus begins to reduce sharply to result in start of softening of the film and a temperature where the film starts to make the shift to the glass transition region.

The elastic modulus was measured for the dried cellulose acylate film of the invention of 10 mm×150 mm, which had been humidity controlled at 25° C., 60% RH for 2 hours, by a tensile analyzer (Strograph-R2 (manufactured by Toyoseiki)) under conditions of a grip distance of 100 mm, temperature of 25° C. and a drawing rate of 10 mm/min.

The cellulose acylate film has haze of preferably 0.01-2%. Here, the haze is measured for a 40 mm×80 mm sample of the cellulose acylate film of the invention by a haze meter (HGM-2DP, manufactured by Suga Test Instruments Co., Ltd.) at 25° C., 60% RH according to JIS K-6714.

The cellulose acylate film of the invention has mass change of preferably 0-5% after being left at rest for 48 hours at 80° C., 90% RH.

The cellulose acylate film of the invention has dimension change of preferably 0-5% for each case after being left at rest for 24 hours at 60° C., 95% RH, and for 24 hours at 90° C., 5% RH.

The cellulose acylate film of the invention has a photoelastic coefficient of preferably $50 \times 10^{-13}$ cm$^2$/dyne or less from the viewpoint of reducing color change of a liquid crystal display caused by an elapse of time. As a specific measurement method, a 10 mm×100 mm sample of the cellulose acylate film is subjected to tensile stress in the long axis direction of the sample, retardation at that time is measured by an ellipsometer (M150, manufactured by JASCO Corporation), and a photoelastic coefficient is calculated from the variation in the retardation relative to the stress.

Polarizing Plate

Next, a polarizing plate of the invention will be described. A polarizing plate is usually composed of a polarizer and two transparent protective films arranged on both sides of the polarizer. In the invention, the cellulose acylate film of the invention is used as at least one of the protective film. The cellulose acylate film of the invention or a common cellulose acetate film may be used as the other protective film. Examples of the polarizer include an iodine-based polarizer, a dye-based polarizer using a dichromatic dye and a polyene-based polarizer. An iodine-based polarizer and a dye-based polarizer are generally manufactured using a polyvinyl alcohol-based film. When the cellulose acylate film of the invention is used as a polarizing plate protective film, there is no particular restriction on a production method of a polarizing plate and it can be manufactured by a common method. For example, there is such method that an obtained cellulose acylate film is alkali-treated and laminated on both sides of a polarizer having been manufactured by dipping and stretching a polyvinyl alcohol film in an iodine solution with an aqueous solution of completely saponified polyvinyl alcohol. In place of an alkali treatment, easy-to-bond finish as described in JP-A-6-94915 and JP-A-6-118232 may be provided. Examples of the adhesive used for laminating the treated surface of protective film and the polarizer include polyvinyl alcohol-based adhesives such as polyvinyl alcohol and polyvinyl butyral, a vinyl-based latex such as butyl acrylate, and the like. A polarizing plate is composed of a polarizer and protective films for protecting both sides of the plate, and may be composed by laminating an additional protect film on one side of the polarizing plate and separate film on the other side of the plate. The protect film and separate film are used for the purpose of protecting the polarizing plate before shipping, at product test and the like. In this case, the protect film is laminated for the purpose of protecting the surface of the polarizing plate, and is used for the surface of the polarizing plate opposite to the surface to be laminated on a liquid crystal plate. The separate film is used for the purpose of covering an adhesive layer to be laminated on an liquid crystal plate, and is used for the surface side of the polarizing plate to be laminated on a liquid crystal plate.

In the lamination of the cellulose acylate film of the invention on a polarizer, it is preferred that the cellulose acylate film of the invention is laminated so that the slow axis thereof coincides with the transmission axis of the polarizer.

In this connection, as for a polarizing plate manufactured under crossed Nicols, when orthogonality accuracy between the slow axis of the cellulose acylate film of the invention and the absorption axis (an axis orthogonal to the transmission axis) of the polarizer exceeds 1°, polarization degree performance under polarizing plate crossed Nicols degrade to generate a bright defect, whereby sufficient black level and contrast can not obtained when it is combined with a liquid crystal cell. Accordingly, shift between the direction of the primary refraction index nx of the cellulose acylate film of the invention and the direction of the transmission axis of the polarizing plate is preferably 1° or less, more preferably 0.5° or less.

In the invention, the single panel transmittance, parallel transmittance and cross transmittance of the polarizing plate was measured using UV3100PC (Shimadzu Corporation). The measurement was carried out under the conditions of 25° C., 60% RH and the range of 380 nm-780 nm. For the single plate, parallel and cross transmittances, 10 measurements were repeated to give respective average values. Durability test of the polarizing plate was carried out as follows in 2 types of configurations, that is, (1) the polarizing plate alone and (2) the polarizing plate is stuck to glass via an adhesive. As for the measurement of the polarizing plate alone, two same combinations composed of the optical compensation film sandwiched between 2 polarizers that were orthogonal to each other were prepared and measured. As for one stuck to glass, two samples (about 5 cm×5 cm), in which the polarizing plate was stuck onto glass so that the optical compensation film lay on the glass side, were manufactured. In the measurement of the single plate transmittance, the film side of the sample was set so as to face a light source. Each of 2 samples was measured and respective values were averaged to give the transmittance of single plate. A preferable range of the polarizing performance is, for the single plate transmittance, parallel transmittance and cross transmittance in this order, $40.0 \leq TT \leq 45.0$, $30.0 \leq PT \leq 40.0$ and $CT \leq 2.0$, a more preferable range is $40.2 \leq TT \leq 44.8$, $32.2 \leq PT \leq 39.5$ and $CT \leq 1.6$, and a further preferable range is $41.0 \leq TT \leq 44.6$, $34 \leq PT \leq 39.1$ and $CT \leq 1.3$.

Polarization degree P is calculated from these transmittances, and a greater polarization degree P indicates a less leak of light when cross-arranged and a higher performance of the polarizing plate. The polarization degree P is preferably 95.0% or more, more preferably 96.0% or more, further preferably 97.0% or more.

In the polarizing plate of the invention, when the cross transmittance at wave length λ is defined as $T_{(\lambda)}$, $T_{(380)}$, $T_{(410)}$ and $T_{(700)}$ preferably satisfy at least one of formulae (e)-(g) below:

$$T_{(380)} \leq 2.0 \quad (e)$$

$$T_{(410)} \leq 1.0 \quad (f)$$

$$T_{(700)} \leq 0.5. \quad (g)$$

More preferably, $T_{(380)} \leq 1.95$, $T_{(410)} \leq 0.9$ and $T_{(700)} \leq 0.49$, further preferably $T_{(380)} \leq 1.90$, $T_{(410)} \leq 0.8$ and $T_{(700)} \leq 0.48$.

For the polarizing plate of the invention, variation ΔCT in the cross single plate transmittance and variation ΔP in polarization degree after being left at rest for 500 hours under conditions of 60° C., 95% RH preferably satisfy at least one of following formulae (j) and (k):

$$-6.0 \leq \Delta CT \leq 6.0 \quad (j)$$

$$-10.0 \leq \Delta P \leq 0.0 \quad (k)$$

wherein variation means a value obtained by subtracting a value measured before the test from a value measured after the test.

More preferably, $-5.8 \leq \Delta CT \leq 5.8$ and $-9.5 \leq \Delta P \leq 0.0$, further preferably $-5.6 \leq \Delta CT \leq 5.6$ and $-9.0 \leq \Delta P \leq 0.0$.

For the polarizing plate of the invention, variation ΔCT in the cross single plate transmittance and variation ΔP in polarization degree after being left at rest for 500 hours under conditions of 60° C., 90% RH preferably satisfy at least one of following formulae (h) and (i):

$$-3.0 \leq \Delta CT \leq 3.0 \quad \text{(h)}$$

$$-5.0 \leq \Delta P \leq 0.0. \quad \text{(i)}$$

For the polarizing plate of the invention, variation ΔCT in the cross single plate transmittance and variation ΔP in polarization degree after being left at rest for 500 hours under condition of 80° C. preferably satisfy at least one of following formulae (l) and (m):

$$-3.0 \leq \Delta CT \leq 3.0 \quad \text{(l)}$$

$$-2.0 \leq \Delta P \leq 0.0. \quad \text{(m)}$$

Further, in the durability test of the polarizing plate, a less variation thereof is preferred.

Surface Treatment

In the cellulose acylate film of the invention, enhancement in adhesiveness of the cellulose acylate film with respective functional layers (for example, under-coating layer and back layer) may be sometimes achieved by carrying out a surface treatment. Usable surface treatments include, for example, a glow discharge treatment, an ultraviolet irradiation treatment, a corona treatment, a flame treatment, and an acid or alkali treatment. The glow discharge treatment here may utilize low-temperature plasma generating under a low pressure gas of $10^{-3}$-20 Torr, and further a plasma treatment under atmospheric pressure is also preferred. A plasma excitable gas means a gas that is plasma-excited under the aforementioned conditions, and examples thereof include argon, helium, neon, krypton, xenon, nitrogen, carbon dioxide, chlorofluorocarbons such as tetrafluoromethane and mixtures thereof. About these, pp 30-32 of KOKAI-GIHO (Disclosure of Techniques) (Kogi No. 2001-1745, published on Mar. 15, 2001 by Japan Institute of Invention and Innovation) describes in detail. Incidentally, in a plasma treatment under atmospheric pressure attracting attention recently, for example, an irradiation energy of 20-500 kGy under 10-1000 KeV is used, and more preferably an irradiation energy of 20-300 kGy under 30-500 KeV is used. A particularly preferable treatment among these is an alkali saponification treatment, which is extremely effective as a surface treatment of the cellulose acylate film.

An alkali saponification treatment is preferably practiced by a method of directly dipping the cellulose acylate film in a bath of a saponifying liquid, or a method of coating a saponifying liquid on the cellulose acylate film. Examples of the coating method include a dip coating method, a curtain coating method, an extrusion coating method, a bar coating method and an E-type coating method. As for a solvent of an alkali saponification treatment coating liquid, since the saponifying liquid is coated on the cellulose acylate film, such solvent is preferably selected that has good wettability and can maintain the surface in good conditions without forming irregularity on the surface of the cellulose acylate film. Specifically, alcohol-type solvents are preferred, and isopropyl alcohol is particularly preferred. An aqueous surfactant solution is also usable as the solvent. As for an alkali for an alkali saponification coating liquid, alkalis that dissolve in the aforementioned solvent are preferred, and KOH and NaOH are more preferred. pH of the saponification coating liquid is preferably 10 or more, more preferably 12 or more. Reaction conditions upon alkali saponification is preferably 1 second-5 minutes at room temperature, more preferably 5 seconds-5 minutes, particularly preferably 20 seconds-3 minutes. After the alkali saponification reaction, washing with water, or sequential washing with an acid and water of the saponification liquid-coated surface is preferred.

The polarizing plate of the invention is preferably provided with at least one of a hard coat layer, an antiglare layer and an antireflection layer on the surface of the protective film on the other side of the polarizing plate. In other words, arrangement of a functional film such as an antireflection layer is preferably practiced on the protective film (TAC2) of the polarizing plate that is disposed on the side opposite the liquid crystal cell upon application to a liquid crystal display. As the functional film, at least one of a hard coat layer, an antiglare layer and an antireflection layer is preferably disposed. In this connection, it is not necessary to arrange respective layers as an independent layer. For example, an antireflection layer may be given the function as an antiglare layer to form an antireflection layer that functions as an antireflection and antiglare layer.

Antireflection Layer

In the invention, such antireflection layer is preferably used as one constituted by laminating at least a light-scattering layer and a low refraction index layer in this order on the protective film, or one formed by laminating a middle refraction index layer, a high refraction index layer and a low refraction index layer in this order on the protective film. Hereinafter, preferable examples thereof are described.

Description will be given about preferable examples of the antireflection layer formed by arranging a light-scattering layer and a low refraction index layer on the protective film.

In the light-scattering layer, matting particles are preferably dispersed. In this case, the refraction index of elements of the light-scattering layer other than the matting particles is in a range of preferably 1.50-2.00. The refraction index of a low refraction index layer is in a range of preferably 1.20-1.49. In the invention, the light-scattering layer has both of antiglare properties and hard coat properties, and may be composed of one layer or plural layers, for example, 2-4 layers.

The antireflection layer has a recessed and projecting surface shape that is designed so that a center line average roughness is 0.08-0.40 μm, a 10-point average roughness Rz is 10 times or less Rz, the average crest/root distance Sm is 1-100 μm, the standard deviation of the height of projecting portions from the deepest portions of the irregularity is 0.5 μm or less, the standard deviation of the average crest/root distances Sm on the basis of the center line is 20 μm or less and surfaces having a tilt angle of 0-5° are 10% or more, thereby achieving sufficient antiglare properties and uniform mat feeling with eye observation to be preferred. Further, such values as −2-2 of a*, −3-3 of b*, and 0.5-0.99 of the ratio between the minim and maximum values of the reflection coefficient in a range of 380 nm-780 nm result in neutral color of reflected light under a C light source, and are preferred. A value 0-3 of b* of transmitted light under a C light source reduces yellowish color of white display when applied to a display apparatus, and is preferred. The standard deviation of luminance distribution of 20 or less, which is measured on the film after inserting a grid of 120×μm×40 μm between a surface light source and the antireflection film of the invention, reduces glaring when the film of the invention is applied to a high-definition panel, and is preferred.

An antireflection layer usable in the invention preferably has such optical properties as 2.5% or less of mirror reflectivity, 90% or more of transmittance and 70% or less of 60° glossiness. As the result, reflection of ambient light is prevented to enhance visibility. In particular, the mirror reflectivity is more preferably 1% or less, and most preferably 0.5% or less. Such values as 20%-50% of haze, 0.3-1 of internal haze value/total haze value, 15% or less of decrease in haze value from the value until the formation of the light-scattering layer to the value after forming the low refraction index layer, 20%-50% of transmitted image clearness measured at comb width of 0.5 mm, and 1.5-5.0 of transmittance ratio of vertical transmitted light/transmitted light tilted in 2° from vertical direction, achieve prevention of glare and reduction in blur of characters and the like on a high-definition LCD panel, and are preferred.

Low Refraction Index Layer

Hereinafter, description will be given about a low refraction index layer in an antireflection layer formed by laminating at least a light-scattering layer and a low refraction index layer, in this order, on the protective film.

The refraction index of the low refraction index layer is in a range of preferably 1.20-1.49, more preferably 1.30-1.44. Further, the low refraction index layer preferably satisfies following formula (XV) from the viewpoint of achieving a low reflection coefficient.

$$(m/4) \times 0.7 < nldl < (m/4) \times 1.3 \quad \text{Formula (XV)}$$

wherein, m represents a positive odd number, nl represents the refraction index of the low refraction index layer, and dl represents film thickness (nm) of the low refraction index layer. λ is wavelength and has a value in a range of 500-550 nm.

Hereinafter, materials that constitute the low refraction index layer will be described.

The low refraction index layer preferably contains a fluorine-containing polymer as a low refraction index binder. As for the fluorine-containing polymer, such fluorine-containing polymer is preferred that is cross-linkable by heat or irradiation of an ionizing radiation and has a coefficient of dynamic friction of 0.03-0.20, a contact angle to water of 90-120° and a slide angle of pure water of 70° or less. When the polarizing plate of the invention is mounted to an image display apparatus, a lower releasing force between the plate and a commercially available adhesive tape allows a stuck seal or memo pad to be stripped off easier, and is preferred. A releasing force measured by a tensile tester is preferably 500 gf or less, more preferably 300 gf or less, most preferably 100 gf or less. Further, a higher surface hardness measured by a micro hardness meter not easier allows the surface to be damaged. 0.3 GPa or more is preferred, and 0.5 GPa or more is more preferred.

Examples of the fluorine-containing polymer for use in the low refraction index layer include hydrolysates and dehydration condensed materials of perfluoroalkyl group-containing silane compounds (for example, (heptadecafluoro-1,1,2,2-tetrahydrodecyl)triethoxysilane)) and, in addition, a fluorine-containing copolymer having a fluorine-containing monomer unit and a constitutional unit for giving cross-linking reactivity as constitutional components.

Specific examples of the monomer forming a fluorine-containing monomer unit, which is a constitutional component of a fluorine-containing copolymer, include fluoroolefines (such as fluoroethylene, vinylidenfluoride, tetrafluoroethylene, perfluorooctylethylene, hexafluoropropylene, perfluoro-2,2-dimethyl-1,3-dioxol), a partial or complete fluorinated alkylester derivatives of (meth)acrylic acid (such as Viscoat 6FM (manufactured by OSAKA ORGANIC CHEMICAL INDUSTRY LTD.) and M-2020 (manufactured by Daikin Industries Ltd.)) and a perfect or partial fluorinated vinylethers. Among them, perfluoroolefines are preferred, and hexafluoropropylene is particularly preferred from the viewpoint of refractive index, solubility, transparency, obtainability and the like.

Examples of the constitutional unit for giving cross-linking reactivity include a constitutional unit obtained by polymerization of such monomers as glycidyl (meth)acrylate and glycidyl vinylether that previously have a self-crosslinkable functional group in the molecule thereof, a constitutional unit obtained by polymerization of such monomers as those having a carboxyl group, a hydroxyl group, an amino group or a sulfo group (such as (meth)acrylic acid, methylol (meth)acrylate, hydroxyalkyl (meth)acrylate, acrylacrylate, hydroxyethylvinylether, hydroxybutylvinylether, maleic acid, crotonic acid), and a constitutional unit formed by introducing such cross-linkable reactive group as (meth)acryloyl group to these constitutional groups by a polymer reaction (for example, introduction can be carried out by such way as acting acrylic acid chloride to a hydroxyl group).

In addition to the fluorine-containing monomer unit and the constitutional unit for giving a cross-linking reactivity, a monomer containing no fluorine atom can be also copolymerized arbitrarily from the view point of solubility in a solvent, transparency of the film and the like. Simultaneously usable monomers are not particularly restricted, and examples thereof include olefins (ethylene, propylene, isoprene, vinyl chloride, vinyliden chloride etc.), acrylic esters (methyl acrylate, ethyl acrylate, 2-ethylhexyl acrylate), methacrylic esters (methyl methacrylate, ethyl methacrylate, butyl methacrylate, ethyleneglycol dimethacrylate etc.), styrene derivatives (styrene, divinylbenzene, vinyltoluene, α-methylstyrene etc.), vinylethers (methylvinylether, ethylvinylether, cyclohexylvinylether etc.), vinylesters (vinylacetate, vinylpropionate, vinylcinnamate etc.), acrylamides (N-tert-butylacrylamide, N-cyclohexylacrylamide etc.), methacrylamides, and acrylonitrile derivatives.

To the aforementioned polymers, a hardening agent may be arbitrarily applied simultaneously as described in JP-A-10-25388 and JP-A-10-147739.

Light-Scattering Layer

A light-scattering layer is formed for the purpose of providing a film with light diffusivity due to at least one of surface scattering and inner scattering and hard coat properties for enhancing abrasion resistance. Accordingly, it is formed while containing a binder for giving hard coat properties, matting particles for providing light diffusivity, and, if necessary, an inorganic filler for giving a high refraction index, cross-link contraction-inhibiting property or high strength. By arranging such light-scattering layer, the light-scattering layer functions also as an antiglare layer to give an antiglare layer to the polarizing plate.

Film thickness of the light-scattering layer is preferably 1-10 μm, more preferably 1.2-6 μm for the purpose of giving hard coat properties to the layer. A too small thickness results in insufficient hard property, and a too large thickness results in insufficient processability due to degradation of curling and brittleness.

A binder for the light-scattering layer is composed of preferably a polymer having a saturated hydrocarbon chain or polyether chain as a primary chain, more preferably a polymer having a saturated hydrocarbon chain as a primary chain. Further, the binder polymer preferably has a cross-linked structure. As the binder polymer having a saturated hydrocarbon chain, a polymer of an ethylenic unsaturated monomer is preferred. As the binder polymer having a saturated hydrocarbon chain as a primary chain and a cross-linked structure, a (co)polymer of a monomer having 2 or more ethylenic unsaturated groups is preferred. In order to give a high refraction index to the binder polymer, it is also possible to select such monomer that contains, in the structure thereof, an aromatic ring or at least one atom selected from a halogen atom other than fluorine atom, a sulfur atom, a phosphorous atom and a nitrogen atom.

Example of the monomer having 2 or more ethylenic unsaturated groups include esters of polyhydric alcohol and (meth) acrylic acid (such as ethyleneglycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate), ethyleneoxide-modified bodies of the above compounds, vinylbenzene and derivatives thereof (such as 1,4-divinylbenzene, 4-vinylbenzoic acid-2-acryloylethylester, 1,4-divinylcyclohexanone), vinylsulfone (such as divinylsulfone), acrylamide (such as methylenebisacrylamide) and methacrylamide. Two or more kinds of the monomers may be used simultaneously.

Specific examples of the high refraction index monomer include bis(4-methacryloylthiophenyl)sulfide, vinylnaphthalene, vinylphenylsulfide and 4-methacryloxyphenyl-4'-methoxyphenylthioether. Two or more of these monomers may be also used simultaneously.

Polymerization of these monomers having an ethylenic unsaturated group can be carried out by irradiation of an ionizing radiation or heating in the presence of an optical radical initiator or a thermal radical initiator.

That is, the antireflection film can be formed by preparing a coating liquid containing a monomer having an ethylenic unsaturated group, an optical radical initiator or a thermal radical initiator, matting particles and an inorganic filler, applying the coating liquid on the protective film, and then curing the coated layer by a polymerization reaction by an ionizing radiation or heat. As these optical radical initiator and the like, publicly known ones can be used.

As a polymer having polyether as a primary chain, a ring-opened polymer of a polyfunctional epoxy compound is preferred. Ring-opening polymerization of a polyfunctional epoxy compound can be carried out by irradiation of an ionizing radiation or heating in the presence of an optical acid-generating agent or a thermal acid-generating agent.

Accordingly, the antireflection film can be formed by preparing a coating liquid containing a polyfunctional epoxy compound, an optical acid-generating agent or a thermal acid-generating agent, matting particles and an inorganic filler, applying the coating liquid on the protective film, and then curing the coated layer by a polymerization reaction by irradiation of an ionizing radiation or heat.

In place of, or in addition to a monomer having 2 or more ethylenic unsaturated groups, a monomer having a cross-linkable functional group may be used to introduce a cross-linkable functional group in a polymer, and then to introduce a cross-linked structure into the binder polymer by reaction of the cross-linkable functional group.

Examples of the cross-linkable functional group include an isocyanate group, an epoxy group, an aziridine group, an oxazoline group, an aldehyde group, a carbonyl group, a hydrazine group, a carboxyl group, a methylol group and an active methylene group. Vinyl sulfonic acid, acid anhydride, cyanoacrylate derivatives, melamine, an etherified methylol, ester and urethane, and metal alkoxide such as tetramethoxysilane can be also used as a monomer for introducing a cross-linked structure. A functional group such as a blocked isocyanate group that represents cross-linkable property as the result of decomposition reaction may be also usable. That is, in the invention, a cross-likable functional group may not be one that exerts reactivity directly, but may be one that exert reactivity as the result of decomposition.

These binder polymers having a cross-linkable functional group can form a cross-linked structure by heating after coating.

The light-scattering layer is incorporated with matting particles such as particles of an inorganic compound or resin particles, which are larger than filler particles and have an average particle size of 1-10 μm, preferably 1.5-7.0 μm, for the purpose of giving antiglare property to the layer.

Preferable specific examples of the matting particle include particles of inorganic compound such as silica particles and $TiO_2$ particles, and resin particles such as acrylic particles, cross-linked acrylic particles, polystyrene particles, cross-linked styrene particles, melamine resin particles and benzoguanamine resin particles. Among these, cross-linked styrene particles, cross-linked acrylic particles, cross-linked acrylic styrene particles and silica particles are preferred. Matting particles having either of spherical shape and infinite form are usable.

Two or more types of matting particles having particle sizes different from one another may be also used simultaneously. It is possible to give an antiglare property by matting particles having a greater particle size and to give other optical characteristics by matting particles having a smaller particle size.

Further, the aforementioned matting particles have most preferably particle size distribution of monodispersity. That is, as for the size of respective particles, the closer the better. For example, when defining particles having particle sizes greater than an average particle size by 20% or more as coarse particles, percentage of the coarse particles is preferably 1% or less, more preferably 0.1% or less, further preferably 0.01% or less of the total particle number. Matting agent having such particle size distribution can be obtained by classification after a usual synthesis reaction. Repeating classification or intensified classification can give matting agents having more preferable distribution.

The aforementioned matting particles are incorporated in the light-scattering layer so that the amount of the matting agent is preferably 10-1,000 $mg/m^2$, more preferably 100-700 $mg/m^2$ in the formed light-scattering layer.

Particle size distribution of the matting agent is measured by the Coulter counter method, and the measured distribution is converted to particle number distribution.

In order to enhance the refraction index of the layer, the light-scattering layer is preferably incorporated, in addition to the matting particle, with an inorganic filler consisting of an oxide of at least one metal selected from titanium, zirconium, aluminum, indium, zinc, tin and antimony and having an average particle size of preferably 0.2 μm or less, preferably 0.1 μm or less, more preferably 0.06 μm or less.

On the contrary, in a light-scattering layer in which matting particles of a high refraction index are used, in order to increase difference of refraction index from matting particles, use of an oxide of silicon is also preferred to maintain the refraction index of the layer at a lower level. Preferable particle size is the same as that of the aforementioned inorganic filler.

Specific examples of the inorganic filler for use in the light-scattering layer include $TiO_2$, $ZrO_2$, $Al_2O_3$, $In_2O_3$, $ZnO$, $SnO_2$, $Sb_2O_3$, ITO, $SiO_2$ and the like. $TiO_2$ and $ZrO_2$ are particularly preferred from the viewpoint of achieving a high refraction index. The surface of inorganic filler is also preferably subjected to a silane coupling treatment or a titanium coupling treatment, wherein a surface treatment agent, which provides a functional group capable of reacting with the binder on the filler surface, is used preferably.

Addition amount of the inorganic filler is preferably 10-90%, more preferably 20-80%, particularly preferably 30-75% of the total mass of the light-scattering layer.

Incidentally, since such filler has the particle size that is sufficiently smaller than wavelength of light, it does not cause scattering, and a dispersed member formed by dispersing the filler in a binder polymer acts as an optically uniform material.

Bulk refraction index of a mixture of the binder for the light-scattering layer and the inorganic filler is preferably 1.50-2.00, more preferably 1.51-1.80. A refraction index in the above range can be obtained by suitably selecting kinds and amount ratio of the binder and inorganic filler. The selection method can be easily known experimentally in advance.

In order to assure uniform surface conditions, in particular, surface free of uneven coating, uneven drying and point defect, a coating composition for forming the light-scattering layer contains either of a fluorine-containing and silicone-based surfactant, or both of them. Particularly, a fluorine-containing surfactant exerts an effect of improving such planer failures as uneven coating, uneven drying and point defect of the antireflection film of the invention in a less addition amount, and is used preferably. The purpose is to enhance productivity by providing the coating composition with suitability for high-speed coating while enhancing surface evenness.

Next, description will be given about the antireflection layer which is formed by laminating a middle refraction index layer, a high refraction index layer and a low refraction index layer in this order on the protective film.

An antireflection layer having such layer constitution as at least a middle refraction index layer, a high refraction index layer and a low refraction index layer (the outermost layer) in this order on the protective film is designed so as to have refraction indices satisfying the following relation.

Refraction index of the high refraction index>refraction index of the middle refraction index layer>refraction index of the protective film>refraction index of the low refraction index layer Further, a hard coat layer may be arranged between the protective film and the middle refraction index layer. Furthermore, constitution of a middle refraction index hard coat layer, a high refraction index layer and a low refraction index layer may be acceptable.

For example, antireflection layers described in JP-A-8-122504, JP-A-8-110401, JP-A-10-300902, JP-A-2002-243906 and JP-A-2000-111706 can be mentioned.

Each layer may be provided with other function. For example, an antifouling low refraction index layer and an antistatic high refraction index layer (for example, JP-A-10-206603, JP-A-2002-243906 etc.) can be mentioned.

Haze of the antireflection layer is preferably 5% or less, more preferably 3% or less. Strength of the film is preferably H or more, more preferably 2H or more, most preferably 3H or more in the pencil hardness test according to JIS K5400.
High Refraction Index Layer and Middle Refraction Index Layer A layer having a high refraction index in the antireflection layer is composed of a cured film containing at least fine particles of an inorganic compound with a high refraction index having an average particle size of 100 nm or less and a matrix binder.

As inorganic compound fine particles with a high refraction index, fine particles of an inorganic compound having a refraction index of 1.65 or more can be mentioned, and preferably ones having a refraction index of 1.9 or more can be mentioned, including, for example, fine particles of oxides of Ti, Zn, Sb, Sn, Zr, Ce, Ta, La or In, complex oxides containing these metal atoms, and the like.

In order to obtain fine particles having an average particle size of 100 nm or less, such methods can be mentioned as treating particle surface with a surface treatment agent (for example, a silane coupling agent or the like: JP-A-11-295503, JP-A-11-153703, JP-A-2000-9908; an anionic compound or an organic metal coupling agent: JP-A-2001-310432 etc.), forming a core-shell structure employing a high refraction index particle as a core (for example, JP-A-2001-166104 etc.), simultaneous use of a specific dispersing agent (for example, JP-A-11-153703, U.S. Pat. No. 6,210,858 B1, JP-A-2002-2776069 etc.) and the like.

As a material for forming the matrix, conventionally publicly known thermoplastic resin, curable resin and the like can be mentioned.

Further, at least one composition is preferred, which is selected from compositions containing a multifunctional compound including 2 or more of at least either of a radical polymerizable or cation polymerizable group, and compositions containing an organic metal compound including a hydrolyzable group and a partial condensate thereof, including, for example, compositions described in JP-A-2000-47004, JP-A-2001-315242, JP-A-2001-31871, JP-A-2001-296401 and the like.

In addition, such curable material that can be obtained from a colloidal metal oxide resulting from a hydrolysis condensate of a metal alkoxide and a metal alkoxide composition is also preferred. For example, there is description in JP-A-2001-293818 and the like.

The high refraction index layer has a refraction index of preferably 1.70-2.20. It has a thickness of preferably 5 nm-10 µm, more preferably 10 nm-1 µm.

The refraction index of the middle refraction index layer is controlled so as to be a value between the refraction index of the low refraction index layer and the refraction index of the high refraction index layer. The refraction index of the middle refraction index layer is preferably 1.50-1.70. It has a thickness of preferably 5 nm-10 more preferably 10 nm-1 µm.
Low Refraction Index Layer Next, description will be given about the low refraction index layer in the antireflection layer formed by laminating a middle refraction index layer, a high refraction index layer and a low refraction index layer in this order on the protective film.

The low refraction index layer is laminated on the high refraction index layer. The refraction index of the low refraction index layer is preferably 1.20-1.55, more preferably 1.30-1.50.

It is preferably built as the outermost layer having scratch resistance and antifouling. As a means for enhancing scratch resistance to a large extent, impartation of sliding property to the surface is effective, and such conventionally known means as a thin film layer consisting of introduction of silicone, introduction of fluorine, or the like can be applied.

As a fluorine-containing compound, a compound containing a fluorine atom in a range of 35-80% by mass and a cross-linkable or polimerizable functional group is preferred. For example, compounds described in paragraph numbers [0018]-[0026] of JP-A-9-222503, paragraph numbers

[0019]-[0030] of JP-A-11-38202, paragraph numbers [0027] [0028] of JP-A-2001-40284, and JP-A-2000-284102 can be mentioned.

The refraction index of a fluorine-containing compound is preferably 1.35-1.50, more preferably 1.36-1.47.

A preferable silicone compound is one having a polysiloxane structure and containing a curable functional group or a polymerizable group in the polymer chain to form a bridged structure in the film. For example, a reactive silicone (for example, Silaplane (manufactured by CHISSO CORPORATION), polysiloxane containing silanol groups at both ends (JP-A-11-258403 etc.) and the like can be mentioned.

Cross-linking or polymerization reaction of at least either of fluorine-containing polymer and siloxane polymer having a cross-linkable or polymerizable group is preferably carried out by light irradiation or heating of a coated composition for forming the outermost layer containing a polymerization initiator, a sensitizer or the like in parallel with coating or after coating to form the low refraction index layer.

A sol-gel cured film formed by curing an organic metal compound such as a silane coupling agent and a silane coupling agent containing a specific fluorine-containing hydrocarbon group by a condensation reaction in the coexistence of a catalyst, is also preferred.

For example, a polyfluoroalkyl group-containing silane compound or a partial hydrolysis condensate thereof (compounds described in JP-A-58-142958, JP-A-58-147483, JP-A-58-147484, JP-A-9-157582, JP-A-11-106704 etc.), a silyl compound containing a poly(perfluoroalkylether) group which is a fluorine-containing long chain group (compounds described in JP-A-2000-117902, JP-A-2001-48590, JP-A-2002-53804, and the like) can be mentioned.

The low refraction index layer can contain, as additives other than those above-described, a filler (for example, particles of a low refraction index inorganic compound such as silicon dioxide (silica) and fluorine-containing compounds (magnesium fluoride, calcium fluoride, barium fluoride) having an average primary particle diameter of 1-150 nm, organic fine particles described in paragraph numbers [0020]-[0038] of JP-A-11-3820, and the like), a silane coupling agent, a sliding agent, a surfactant, or the like.

When the low refraction index layer is located under the outermost layer, the low refraction index layer may be formed by a gas phase method (such as a vacuum evaporation method, a sputtering method, an ion plating method and a plasma CVD method). From the viewpoint of low production cost, a coating method is preferred.

The thickness of the low refraction index layer is preferably 30-200 nm, more preferably 50-150 nm, most preferably 60-120 nm.

Hard Coat Layer

A hard coat layer is disposed on the surface of the protective film in order to give physical strength to the protective film having been arranged with the antireflection layer. Particularly, it is preferably disposed between the transparent support and the aforementioned high refraction index layer. Preferably, the hard coat layer is formed by a cross-linking or polymerization reaction of a curable compound by at least either means of light and heat. As for a curable functional group in the curable compound, a photopolymerizable functional group is preferred. In addition, an organic metal compound and an organic alkoxysilyl compound containing a hydrolysable functional group is also preferred.

Specific examples of these compounds include the same ones as exemplified for the high refraction index layer. Examples of specific structural compositions of the hard coat layer include those described in JP-A-2002-144913, JP-A-2000-9908, WO 00/46617 and the like.

The high refraction index layer can also function as the hard coat layer. In this case, a formation procedure of incorporating the hard coat layer with fine particles finely dispersed by a procedure described in the high refraction index layer is preferred.

The hard coat layer can also function as an antiglare layer provided with an antiglare function by incorporating it with particles having an average particle size of 0.2-10 μm.

Film thickness of the hard coat layer can be suitably designed corresponding to applications. The film thickness of the hard coat layer is preferably 0.2-10 μm, more preferably 0.5-7 μm.

Strength of the hard coat layer is preferably H or more, more preferably 2H or more, most preferably 3H or more in a pencil hardness test according to JIS K5400. Further, in a Taber test according to JIS K5400, a less abrasion amount of a test piece before and after the test is more preferred.

Other Layers in the Antireflection Layer

A forward scattering layer, a primer layer, an antistatic layer, an under-coating layer or a protective layer may be arranged additionally.

Antistatic Layer

In the case of disposing an antistatic layer, preferably an electric conductivity is given so as to result in volume resistivity of $10^{-8}$ ($\Omega cm^{-3}$) or less.

Although a volume resistivity of $10^{-8}$ ($\Omega cm^{-3}$) or less may be given using a hygroscopic substance, a water-soluble inorganic salt, some kind of surfactant, cation polymer, anion polymer, colloidal silica or the like, there is such problem that the volume resistivity is greatly dependent on temperature and humidity, and that sufficient conductivity can not be secured. Therefore, metal oxides are preferred as conductive elements. Some metal oxides are colored. Use of such oxide as a conductive element leads to coloring of the whole film, and is not preferred. Examples of the metal capable of forming metal oxides free of coloring include Zn, Ti, Al, In, Si, Mg, Ba, Mo, W and V. Use of a metal oxide including these metals as a primary component is preferred. Specific examples of the oxide include ZnO, $TiO_2$, $SnO_2$, $Al_2O_3$, $In_2O_3$, $SiO_2$, MgO, BaO, $MoO_3$, $V_2O_5$ and complex oxides thereof. In particular, ZnO, $TiO_2$ and $SnO_2$ are preferred. As for a case where a hetero atom is incorporated, effective examples include addition of Al, In or the like to ZnO, addition of Sb, Nb, a halogen element or the like to $SnO_2$, and addition of Nb, TA or the like to $TiO_2$. Further, as described in JP-B-59-6235, raw material formed by sticking the aforementioned metal oxide to other crystalline metal particles or fibrous material (for example, titanium oxide) may be used. In this connection, a volume resistance and a surface resistance are different physical property values and can not be compared simply, but, in order to assure conductivity of $10^{-8}$ ($\Omega cm^{-3}$) or less in terms of a volume resistance, the antistatic layer may have a surface resistance of approximately $10^{-10}$ ($\Omega/\square$) or less, more preferably $10^{-8}$ ($\Omega/\square$) or less. The surface resistance value of the antistatic layer is a value of the case where the antistatic layer is the outermost layer, and can be measured at the step on the way of forming the antistatic layer.

Liquid Crystal Display (General Constitution of Liquid Crystal Display)

When a cellulose acylate film is used as an optical compensation film, the transmission axis of a polarizing element and the slow axis of an optical compensation film composed of the cellulose acylate film may be arranged at any angle. A liquid crystal display is composed of a liquid crystal cell supporting liquid crystal between 2 electrode substrates, 2 polarizing elements arranged on both sides thereof, and at least one optical compensation film arranged between the liquid crystal cell and the polarizing element.

A liquid crystal layer of the liquid crystal cell is usually formed by sealing liquid crystal in an interspace formed by inserting a spacer between 2 substrates. A transparent electrode layer is formed on the substrate as a transparent film containing an electroconductive material. The liquid crystal cell may be further provided with a gas barrier layer, a hard coat layer or an under coating layer (used for adhesion of the transparent electrode layer). These layers are usually disposed on the substrate. The substrate of the liquid crystal cell generally has a thickness of 50 μm-2 mm.

(Types of Liquid Crystal Display)

The cellulose acylate film of the invention can be used for liquid crystal cells having various display modes. Various display modes have been proposed, including TN (Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), VA (Vertically Aligned), ECB (Electrically Controlled Birefringence) and HAN (Hybrid Aligned Nematic). In addition, a display mode is also proposed, which is created by alignment-dividing the aforementioned display mode. The cellulose acylate film of the invention is effective for a liquid crystal display of any display mode. Further, it is effective for any liquid crystal display of a transmission type, a reflection type or a semi-transmission type.

(TN Type Liquid Crystal Display)

The cellulose acylate film of the invention may be used as a support of an optical compensation sheet or a protective film of a polarizing plate of a TN type liquid crystal display having a TN mode liquid crystal cell. A TN mode liquid crystal cell and a TN type liquid crystal display have been well known from a long time ago. AS for an optical compensation sheet for use in a TN type liquid crystal display, there are descriptions in JP-A-3-9325, JP-A-6-148429, JP-A-8-50206 and JP-A-9-26572. In addition, descriptions exist in an articles by Mori et al. (Japanese Journal of Applied Physics Vol. 36 (1997) P.143, Japanese Journal of Applied Physics Vol. 36 (1997) p. 1068).

(STN Type Liquid Crystal Display)

The cellulose acylate film of the invention may be also used as a support of an optical compensation sheet or a protective film of a polarizing plate of a STN type liquid crystal display having a STN mode liquid crystal cell. Generally, in an STN type liquid crystal display, bar-shaped liquid crystalline molecules in the liquid crystal cell are twisted in a range of 90-360°, and product (Δnd) of refraction index anisotropy (Δn) of the bar-shaped liquid crystalline molecule and cell gap (d) is in a range of 300-1500 nm. There is description in JP-A-2000-105316 about an optical compensation sheet for use in a STN type liquid crystal display.

(VA Type Liquid Crystal Display)

The cellulose acylate film of the invention may be also used as a support of an optical compensation sheet or a protective film of a polarizing plate of a VA type liquid crystal display having a VA mode liquid crystal cell. An optical compensation sheet for use in a VA type liquid crystal display preferably has the Re retardation of 0-150 nm and the Rth retardation of 70-400 nm. More preferably the Re retardation is 20-70 nm. When two optical anisotropy polymer films are used for a VA type liquid crystal display, the Rth retardation of the film is preferably 70-250 nm. When one optical anisotropy polymer film is used for a VA type liquid crystal display, the Rth retardation of the film is preferably 150-400 nm. An VA type liquid crystal display may have an alignment-divided system as described, for example, in JP-A-10-123576.

(IPS Type Liquid Crystal Display and ECB Type Liquid Crystal Display)

The cellulose acylate film of the invention is also particularly advantageously used as an optical compensation sheet, a support of an optical compensation sheet or a protective film of a polarizing plate of an IPS type and an ECB type liquid crystal displays having, respectively, an IPS mode and an ECB mode liquid crystal cells. These modes have such embodiment that the liquid crystalline materials are aligned approximately parallel with each other at the time of black level of display, wherein the black level is displayed by aligning liquid crystal molecules parallel to the substrate plane in the state of no application of voltage. In these embodiments, the polarizing plate using the cellulose acylate film of the invention contributes to widening of view angle and improvement of contrast.

Particularly, for an IPS type liquid crystal display application, it is preferred to use the cellulose acylate film of the invention having, preferably, Re of 200-330 nm and |Nz| of 0.3-07, more preferably Re of 220-300 nm and |Nz| of 0.4-0.6, more preferably Re of 250-290 nm and |Nz| of 0.4-0.6 as a cell side protective film of the polarizing plate, and to use a film having, preferably, Re of 3 nm or less and absolute value of Rth, |Rth|, of 10 nm or less, more preferably Re of 1 nm or less and |Rth| of 5 nm or less as a cell side protective film of the polarizing plate opposite to the aforementioned polarizing plate via the liquid crystal cell.

(OCB Type Liquid Crystal Display And HAN Type Liquid Crystal Display)

The cellulose acylate film of the invention may be also used as a support of an optical compensation sheet or a protective film of a polarizing plate of an OCB type liquid crystal display having an OCB mode liquid crystal cell or a HAN type liquid crystal display having a HAN mode liquid crystal cell. For an optical compensation sheet used for an OCB type liquid crystal display or a HAN type liquid crystal display, it is preferred that direction in which the absolute value of retardation becomes minimum does not exist in both of plane and normal line direction of the optical compensation sheet. Optical properties of an optical compensation sheet for use in an OCB type liquid crystal display or a HAN type liquid crystal display are also determined by optical properties of an optically anisotropic layer, optical properties of a support, and arrangement of the optically anisotropic layer and the support. As for an optical compensation sheet for use in an OCB type liquid crystal display or a HAN type liquid crystal display, there are descriptions in JP-A-9-197397 and an article of Mori et al. (Japanese Journal of Applied Physics Vol. 38 (1999) p. 2837).

(Reflection Type Liquid Crystal Display)

The cellulose acylate film of the invention may be also used as an optical compensation sheet or a protective film of the polarizing plate of a reflection type liquid crystal display of a TN type, STN type, HAN type or GH (Guest-Host) type. These display modes have been well known from a long time ago.

About a reflection type liquid crystal display of a TN type, there are descriptions in JP-A-10-123478, WO 98/48320 and Japanese Patent 3022477. About an optical compensation sheet for use in a reflection type liquid crystal display, there is a description in WO 00/65384.

(Other Liquid Crystal Display)

The cellulose acylate film of the invention may be also used as a support of an optical compensation sheet or a protective film of a polarizing plate of an ASM type liquid crystal display having a liquid crystal cell of ASM (Axially Symmetric Aligned Microcell) mode. An ASM mode liquid crystal cell has such characteristic that the thickness of the cell is maintained by a resin spacer capable of position control. Other properties are the same as those of a TN mode liquid crystal cell. About an ASM mode liquid crystal cell and an ASM type liquid crystal display, there is a description in an article of Kume et al. (Kume et al. SID 98 Digest 1089 (1998)).

EXAMPLES

Hereinafter, the characteristics of the present invention will be described more specifically on the basis of Examples and Comparative Examples. Material, amount, percentage, treatment content, treatment procedure and the like shown in the following Examples can be arbitrarily changed within a range that does not result in deviation from the purpose of the invention. Accordingly, the scope of the invention should not be construed restrictively by specific examples shown below.

Example 1

(Cellulose Acylate)

As listed in Table 1, various kinds of cellulose acylate differing in kind and substitution degree of acyl group from one another were prepared according to the following procedure.

To cellulose 100 parts by mass, sulfuric acid 7.8 parts by mass was added as a catalyst, and then a carboxylic acid for a raw material of an acyl substituent was added followed by acylation reaction at 40° C. At that time, by controlling kind and amount of the carboxylic acid, the kind and substitution degree of acyl group were controlled as listed in Table 1. After the acylation, ripening was carried out at 40° C. Low molecular weight contents of cellulose acylate in the obtained mixture were removed by washing with acetone. In Table one, CAP is an abbreviation of cellulose acetatepropionate (a cellulose ester derivative in which the acyl group includes an acetyl group and a propionyl group), CAB is an abbreviation of cellulose acetatebutylate (a cellulose ester derivative in which the acyl group includes an acetyl group and a butyl group), and CTA is an abbreviation of cellulose triacetate (a cellulose ester derivative in which the acyl group includes only an acetyl group).

(Preparation of Dope)

1-1> Preparation of a Cellulose Acylate Solution

A following composition was thrown into a mixing tank, stirred to dissolve respective components, further heated at 90° C. for about 10 minutes, and then filtered on a filter paper having an average pore size of 34 μm and a sintered metal filter having an average pore size of 10 μm to prepare a cellulose acylate solution.

| Cellulose acylate solution | |
|---|---|
| Cellulose triacetate (substitution degree 2.85) | 100.0 parts by mass |
| Methylene chloride | 403.0 parts by mass |
| Methanol | 60.2 parts by mass |

<1-2> Preparation of a Matting Agent Dispersion Liquid

A following composition containing the cellulose acylate solution prepared by the aforementioned method was thrown into a dispersing machine to prepare a matting agent dispersion liquid.

| Matting agent dispersion liquid | |
|---|---|
| Silica particles having an average particle size of 16 nm (AEROSIL R972, manufactured by NIPPON AEROSIL CO., LTD.) | 2.0 parts by mass |
| Methylene chloride | 72.4 parts by mass |
| Methanol | 10.8 parts by mass |
| Cellulose acylate solution | 10.3 parts by mass |

<1-3> Preparation of an Re-Developing Agent Solution

A following composition containing a cellulose acylate solution prepared by the aforementioned method was thrown into a mixing tank to be stirred with heating to dissolve components, thereby prepare an Re-developing agent solution.

| Re-developing agent solution | |
|---|---|
| Re-developing agent A-12 | 20.0 parts by mass |
| Methylene chloride | 58.3 parts by mass |
| Methanol | 8.7 parts by mass |
| cellulose acylate solution | 12.8 parts by mass |

The above-described solutions were mixed so that a resultant liquid gave such contents as 0.15 parts by mass of the matting agent and respective percentages of the Re-developing agent as listed in Table 1 relative to 100 parts by mass of cellulose acylate, and then the mixture was thrown into a mixed solvent of dichloromethane/methanol (87/13 parts by mass) with stirring to give a cotton mass concentration of 19% by mass followed by heating and stirring to dissolve the content, thereby preparing a dope for film-forming.

(Casting)

By using a band casting machine, the aforementioned dope was cast at a rate (film-forming rate) of 20 m/min. The film was stripped off the band when a residual solvent amount (wet ratio) was 25-35% by mass, which was stretched in the width direction at a stretch ratio of 80% (refer to Table 1) in a tenter zone at a supply air temperature of 140° C. (an exhaust temperature is in a range of 90° C.-125° C.), thereby preparing cellulose acylate film 1 (thickness 92 μm, width 1.3 m, length 2600 m) whose in-plane slow axis was in the direction perpendicular to the machine direction.

Examples 2-14 and Comparative Examples 1-2

The cellulose acylate films of the invention 2-18 and cellulose acylate films C1 and C2 as Comparative Examples were manufactured by the procedure similar to that in Example 1, while altering kind of the acyl group, substitution degree, kind and addition amount of the Re-developing agent, stretch ration and film thickness as listed in Table 1.

Test Example 1

Table 1 collectively shows measurement results of Re, Rth and |Nz| for respective cellulose acylate films obtained in Examples 1-14 and Comparative Examples 1-2. Re and Rth were measured using KOBRA 21ADH as described above.

TABLE 1

| | Film sample No. | Kind of acyl group | Substitution degree | Kind of retardation developing agent | Addition amount of retardation developing agent (wt % relative to cotton) | Stretching factor (%) | Film thickness (μm) | Re (nm) | Rth (%) | \|Nz\| |
|---|---|---|---|---|---|---|---|---|---|---|
| Example | 1 | CTA | 2.85 | A-12 | 15 | 80 | 92 | 285 | 40 | 0.6 |
| | 2 | CTA | 2.88 | A-12 | 15 | 80 | 92 | 283 | 30 | 0.6 |
| | 3 | CTA | 2.92 | A-12 | 15 | 80 | 92 | 279 | 20 | 0.6 |
| | 4 | CTA | 2.93 | A-12 | 15 | 80 | 92 | 275 | 10 | 0.5 |
| | 5 | CTA | 2.98 | A-12 | 15 | 80 | 92 | 267 | 3 | 0.5 |
| | 6 | CTA | 2.93 | A-62 | 35 | 40 | 80 | 290 | 0 | 0.5 |
| | 7 | CTA | 2.90 | A-60 | 20 | 60 | 60 | 260 | 15 | 0.6 |
| | 8 | CTA | 2.97 | A-33 | 24 | 70 | 100 | 250 | −15 | 0.4 |
| | 9 | CTA | 2.95 | A-48 | 40 | 50 | 40 | 220 | 20 | 0.6 |
| | 10 | CTA | 2.98 | A-14 | 18 | 100 | 80 | 287 | 20 | 0.6 |
| | 11 | CAB | Ac1.2, Bt1.7 | A-38 | 20 | 105 | 80 | 300 | 30 | 0.6 |
| | 12 | CAP | Ac2.26, Pr0.6 | A-49 | 30 | 150 | 200 | 397 | 48 | 0.6 |
| | 13 | CAT | 2.93 | — | 0 | 20 | 120 | 55 | −40 | 0.2 |
| | 14 | CAP | Ac2.26, Pr0.6 | A-12 | 5 | 30 | 200 | 60 | −195 | 2.8 |
| | 15 | CAP | Ac2.26, Pr0.6 | A-12 | 2 | 20 | 300 | 53 | −98 | 1.3 |
| | 16 | CTA | 2.88 | A-12 | 5 | 15 | 92 | 57 | −30 | 0.0 |
| | 17 | CTA | 2.93 | A-12 | 15 | 45 | 92 | 145 | 10 | 0.6 |
| | 18 | CTA | 2.92 | A-12 | 10 | 30 | 92 | 95 | −10 | 0.4 |
| Comp. Example | C1 | CTA | 2.82 | A-12 | 80 | 70 | 92 | 270 | 170 | 1.1 |
| | C2 | CTA | 2.84 | — | 0 | 4 | 92 | 4.3 | 45 | 11.0 |

Examples 101-114 and Comparative Examples 101-102

(Manufacture of Polarizing Plate)

Cellulose acylate film 1 was dipped in a 1.5 mol/L aqueous NaOH solution (saponifying solution) being temperature-controlled at 60° C. for 2 minutes, followed by dipping in a 0.05 mol/L aqueous sulfuric acid solution for seconds, and then washed off sufficiently by being passed through a water washing bath. Finally, the sample was dried sufficiently at 120° C.

According to Example 1 of JP-A-2001-141926, a polarizing film of 20 μm in thickness was manufactured by stretching in length direction using 2 pairs of nip rollers having different circumferential velocities. FUJI TAC (TD-80UF) was stacked on one side of the polarizing film and the saponified cellulose acylate film of the invention 1 was stacked on the other side of the film using a 3% aqueous solution of polyvinyl alcohol (PVA-117H, manufactured by KURARAY CO., LTD) as an adhesive to manufacture a polarizing plate 101 so that the absorption axis of the polarizer crossed orthogonally to the in-plane slow axis of cellulose acylate film 1.

(Manufacture of a Counter Polarizing Plate)

A following composition was thrown into a mixing tank and stirred to dissolve respective components. Silica particles were previously dispersed in a solvent and thrown.

| Cellulose acylate solution A | |
|---|---|
| Cellulose acetate having an average acetylation degree of 2.93 | 100.0 parts by mass |
| Methylene chloride (first solvent) | 517.6 parts by mass |
| Methanol (second solvent) | 77.3 parts by mass |
| Silica particles having an average particle size of 16 nm (AEROSIL R972, manufactured by NIPPON AEROSIL CO., LTD.) | 0.13 parts by mass |
| Compound that lowers an optical anisotropy (formula below) | 11.7 parts by mass |
| Wavelength dispersion adjusting agent (UV-102) | 1.2 parts by mass |
| Citric acid ester | 0.01 parts by mass |

The cellulose acylate solution A was cast using a band casting machine, and a resulting film was stripped off at a residual solvent amount of about 60% and conveyed by a tenter.

An average temperature in a drying zone was determined to be 135° C. The obtained cellulose acylate film L1 had Re=0.3 nm and Rth=1.0 nm.

The film manufactured in this way and TD-80UF were used to manufacture a polarizing plate L101 in the same way as that for the polarizing plate 101.

Compound that Lowers Optical Anisotropy

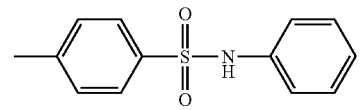

The polarizing plate 101 and the polarizing plate L101 were mounted to a panel of a liquid crystal display to be evaluated.

(Manufacture of an IPS Mode Liquid Crystal Cell)

On electrodes arranged on a glass substrate so that distance between neighboring electrodes became 20 μm, a polyimide film was disposed as an alignment layer, which was subjected to rubbing treatment. A polyimide film was disposed on one surface of a glass substrate prepared separately and subjected to rubbing treatment to form an alignment layer. The 2 glass substrates were set and bonded so that alignment layers were opposed to each other, the gap (d) between the substrates became 3.9 μm and two glass substrates had the same rubbing directions. Then, a nematic liquid crystal composition having a refraction index anisotropy (Δn) of 0.0769 and dielectric constant anisotropy (Δ∈) of positive 4.5 was sealed. d·Δn value of the liquid crystal layer was 300 nm.

An IPS type liquid crystal display 101 was manufactured in such way that the polarizing plate 101 of the invention was stuck to the light source side of the liquid crystal cell with an adhesive agent so that the slow axis of the liquid crystal cell crossed orthogonally to the absorption axis of the polarizing plate 101 and the cellulose acylate film 1 faced the liquid crystal cell side; and that the counter polarizing plate L101 was stuck to the other side of the liquid crystal cell with an adhesive agent in such way that the absorption axis of the plate crossed orthogonally to the axis of the polarizing plate 101 and the cellulose acylate film L1 side faced the liquid crystal cell side.

Examples 102-114 and Comparative Examples 101-102

Cellulose acylate films 2-12, and C1-C2 manufactured in Examples 2-12 and Comparative Example 1-2 were subjected to polarizing plate processing in the same way as Example 101 to manufacture IPS liquid crystal displays 102-112 and C101-C102.

Test Example 2

(Evaluation of Retardation Films and Measurement of Leakage Light of Manufactured Liquid Crystal Displays)

View angle dependence of the transmittance of the manufactured liquid crystal displays were measured. Measurements were carried out for an elevation angle from the transverse plane up to 80° in an oblique direction at 10° intervals, and for an azimuthal angle from horizontal right direction) (0° as the baseline up to 360° at 10° intervals. As for brightness at the time of black level of display, it was recognized that leakage light transmittance increased along with increase in the elevation angle from the front direction and gave the maximum value at around 70°. Degradation of contrast was also recognized as the result of increase in black level transmittance. Consequently, it was determined to evaluate view angle properties on the basis of the black level transmittance of full-frontal plane and the maximum value of the leakage light transmittance at an elevation angle of 60°.

Evaluation of display characteristics
⊙: a very little difference in view angle characteristics and most excellent
○: a little difference in view angle characteristics and excellent
Δ: a small degree of difference in view angle characteristics
x: a large degree of difference in view angle characteristics
Results are shown in Table 2.

TABLE 2

|  | Liquid crystal display sample No. | Film sample No. | IPS Liquid crystal display view angle characteristics |
|---|---|---|---|
| Example | 101 | 1 | ○ |
|  | 102 | 2 | ○ |
|  | 103 | 3 | ⊙ |
|  | 104 | 4 | ⊙ |
|  | 105 | 5 | ⊙ |
|  | 106 | 6 | ⊙ |
|  | 107 | 7 | ⊙ |
|  | 108 | 8 | ⊙ |
|  | 109 | 9 | ○ |
|  | 110 | 10 | ○ |
|  | 111 | 11 | ○ |
|  | 112 | 12 | Δ |
| Comparative Example | C101 | C1 | X |
|  | C102 | C2 | X |

INDUSTRIAL APPLICABILITY

The cellulose acylate film of the invention is excellent in developing an in-plane retardation (Re) and has a small retardation (Rth) in the thickness direction. In addition, the cellulose acylate film of the invention has such characteristics as an excellent optical compensation performance and a high productivity. In particular, a polarizing plate employing the cellulose acylate film of the invention as the protective film of a polarizer is useful in point of capable of giving a liquid crystal display having a little alteration of view angle characteristics. Consequently, the invention has high industrial applicability.

The invention claimed is:

1. A liquid crystal display comprising a liquid crystal cell of an in-plane switching mode and a polarizing plate, wherein:
the polarizing plate comprises a polarizing film and two films disposed on both surfaces thereof,
at least one of the films is composed of a cellulose acylate film satisfying the following formulae:

$50 \text{ nm} < Re < 400 \text{ nm}$ $-200 \text{ nm} \leq Rth \leq 20 \text{ nm}$ $|Nz| \leq 10$ wherein Re represents retardation of the cellulose acylate film in the plane direction, Rth represents retardation of the cellulose acylate film in the thickness direction, and Nz represents (Rth/Re) +0.5.

2. The liquid crystal display according to claim 1, wherein the cellulose acylate contained in the cellulose acylate film has a substitution degree of 2.85-3.00.

3. The liquid crystal display according to claim 1, wherein the cellulose acylate film comprises a rod-shaped compound or a discotic compound.

4. The liquid crystal display according to claim 1, wherein the cellulose acylate film has a width of 0.5-3 m.

5. The liquid crystal display according to claim 1, wherein the cellulose acylate film has a thickness of 40-200 μm.

6. The liquid crystal display according to claim 1, wherein the slow axis in the plane of the cellulose acylate film crosses orthogonally to a machine direction.

7. The liquid crystal display according to claim 1, wherein ΔRe of the cellulose acylate film is 0-50 nm, wherein ΔRe=Re(at 25° C., 10%RH)-Re(at 25° C., 80%RH).

8. The liquid crystal display according to claim 1, wherein ΔRth of the cellulose acylate film is 0-30 nm, wherein ΔRth=Rth(at 25° C., 10%RH)-Rth(at 25° C., 80%RH).

9. The liquid crystal display according to claim 1, wherein a film thickness distribution R of the cellulose acylate film is 0-8%, wherein R is defined by the following formula:

$R(\%)=(Rmax-Rmin)/Rave \times 100$, wherein Rmax represents the maximum value in the width direction, Rmin represents the minimum value in the width direction, and Rave represents the average value in the width direction.

10. The liquid crystal display according to claim 1, wherein the cellulose acylate film satisfies the following formulae:

$200 \leq Re \leq 330 \text{ nm}$ $0.3 \leq |Nz| 0.7$.

11. The liquid crystal display according to claim 10, wherein the cellulose acylate film satisfies the following formulae:

$220 \leq Re \leq 300 \text{ nm}$ $0.4 \leq |Nz| \leq 5\ 0.6$.

12. The cellulose acylate film according to claim 11, wherein a film thickness distribution R of the cellulose acylate film is 0-8%, wherein R is defined by the following formula:

$R(\%)=(Rmax-Rmin)/Rave \times 100$, wherein Rmax represents the maximum value in the width direction, Rmin represents the minimum value in the width direction, and Rave represents the average value in the width direction.

13. A method for producing the liquid crystal display according to claim 1, the method comprising casting a solution containing cellulose acylate having a substitution degree of 2.85-3.00 and at least one kind of rod-shaped compounds or discotic compounds on a substrate, and striping and stretching the formed film to form a cellulose acylate film,
wherein the liquid crystal display comprises a liquid crystal cell of an in-plane switching mode and a polarizing plate, wherein the polarizing plate comprises a polarizing film and two films disposed on both surface thereof and at least one of the films is composed of the cellulose acylate film.

14. The method for producing a liquid crystal display according to claim 13, wherein a cellulose acylate film-forming rate is 5-300 m/min.

* * * * *